United States Patent
Han et al.

(10) Patent No.: US 10,591,589 B2
(45) Date of Patent: Mar. 17, 2020

(54) APPARATUS AND METHOD FOR MEASURING WIRELESS RANGE

(71) Applicant: Samsung Electronics Co., Ltd., Suwon-si, Gyeonggi-do (KR)

(72) Inventors: Kwang-Hoon Han, Suwon-si (KR); Gi-Beom Kim, Seongnam-si (KR); Seong-Hee Park, Seoul (KR); Chil-Youl Yang, Anyang-si (KR); Myoung-Hwan Lee, Suwon-si (KR); Tae-Young Lee, Seoul (KR); Dohy Hong, Seoul (KR)

(73) Assignee: Samsung Electronics Co., Ltd., Suwson-si (KR)

( * ) Notice: Subject to any disclaimer, the term of this patent is extended or adjusted under 35 U.S.C. 154(b) by 142 days.

(21) Appl. No.: 15/513,069

(22) PCT Filed: Sep. 24, 2015

(86) PCT No.: PCT/KR2015/010046
§ 371 (c)(1),
(2) Date: Jul. 18, 2017

(87) PCT Pub. No.: WO2016/048049
PCT Pub. Date: Mar. 31, 2016

(65) Prior Publication Data
US 2018/0239008 A1 Aug. 23, 2018

(30) Foreign Application Priority Data

Sep. 25, 2014 (KR) .................. 10-2014-0128381
Sep. 21, 2015 (KR) .................. 10-2015-0133194

(51) Int. Cl.
*H04W 4/02* (2018.01)
*G01S 11/02* (2010.01)
(Continued)

(52) U.S. Cl.
CPC ............ *G01S 11/02* (2013.01); *G01S 11/16* (2013.01); *G01S 13/82* (2013.01); *G01S 19/38* (2013.01);
(Continued)

(58) Field of Classification Search
None
See application file for complete search history.

(56) References Cited

U.S. PATENT DOCUMENTS

| 6,680,688 | B1 | 1/2004 | Jiang et al. |
| 8,386,620 | B2 * | 2/2013 | Chatterjee ............ G06Q 30/02 709/228 |

(Continued)

FOREIGN PATENT DOCUMENTS

| CA | 2570029 A1 | 12/2005 |
| CN | 103425451 A | 12/2013 |

(Continued)

OTHER PUBLICATIONS

European Search Report dated Dec. 19, 2017, issued in European Patent Application No. 15844621.1-1812.

(Continued)

*Primary Examiner* — Tuan A Tran
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies. According to various embodiments of the present disclosure, an apparatus of a first electronic device in a wireless communication system comprises at least one transceiver and at least one processor operatively coupled to the at least one transceiver. The at least one processor is configured to negotiate with a second
(Continued)

electronic device, determine a measurement scheme selected from a plurality of measurement schemes using at least one of a wireless signal and a sound signal, based on a result of the negotiation with the second electronic device, and determine a distance between the first electronic device and the second electronic device according to the measurement scheme.

12 Claims, 68 Drawing Sheets

(51) Int. Cl.
*G01S 11/16* (2006.01)
*G01S 13/82* (2006.01)
*G01S 19/38* (2010.01)
*G06F 21/60* (2013.01)
*H04W 64/00* (2009.01)

(52) U.S. Cl.
CPC ............ *G06F 21/60* (2013.01); *H04W 4/023* (2013.01); *H04W 64/006* (2013.01)

(56) References Cited

U.S. PATENT DOCUMENTS

| | | | | |
|---|---|---|---|---|
| 8,588,803 B2* | 11/2013 | Hakola | ............... | H04W 72/085 |
| | | | | 455/452.2 |
| 8,612,172 B2* | 12/2013 | Wirola | ..................... | G01C 5/06 |
| | | | | 702/144 |
| 9,161,330 B2* | 10/2015 | Homchaudhuri | ..... | H04W 64/00 |
| 9,226,260 B2* | 12/2015 | Steiner | .................. | H04W 64/00 |
| 9,288,792 B2* | 3/2016 | Hori | ....................... | H04W 76/22 |
| 9,696,431 B2* | 7/2017 | Wirola | .................. | G01S 5/0289 |
| 2002/0014990 A1 | 2/2002 | Kimura | | |
| 2006/0074494 A1 | 4/2006 | McFarland | | |
| 2010/0061186 A1 | 3/2010 | Carotenuto | | |
| 2012/0214546 A1* | 8/2012 | Osaka | ................. | H04M 1/0272 |
| | | | | 455/556.1 |
| 2013/0030684 A1 | 1/2013 | Wirola | | |
| 2013/0207806 A1* | 8/2013 | Lehmann | ............. | H04B 1/3838 |
| | | | | 340/600 |
| 2013/0337849 A1* | 12/2013 | Wan | ...................... | G01S 5/0072 |
| | | | | 455/456.6 |
| 2014/0335885 A1* | 11/2014 | Steiner | .................. | H04W 64/00 |
| | | | | 455/456.1 |
| 2015/0049679 A1* | 2/2015 | Homchaudhuri | ..... | H04W 64/00 |
| | | | | 370/329 |
| 2015/0247916 A1* | 9/2015 | Bartov | .................. | G01S 5/0257 |
| | | | | 455/456.6 |

FOREIGN PATENT DOCUMENTS

| | | |
|---|---|---|
| JP | 2014-086990 A | 5/2014 |
| KR | 10-2001-0111627 A | 12/2001 |
| KR | 10-0974044 B1 | 8/2010 |
| KR | 10-1404085 B1 | 6/2014 |
| WO | 2014/139152 A1 | 9/2014 |

OTHER PUBLICATIONS

European Search Report dated Feb. 26, 2019; European Appln. No. 15 844 621.1-1206.

Chinese Office Action with English translation dated Oct. 31, 2019; Chinese Appln. No. 201580058063.5.

* cited by examiner

| Distance measurement scheme | | Description |
|---|---|---|
| DualSync | | -Reception end can know distance through one transmission by transmission end<br>-Suitable for both 1:n and 1:1 |
| SyncSound | | -Reception end can continuously measure distance through periodic sound transmission by transmission end between devices synchronized through one time (or periodic) wireless signal transmission<br>-Suitable for 1:n and 1:1<br>-Reception end can measure absolute distance change from transmission end |
| DualSeq SE | | -Transmission end can know distance through wireless signal feedback for sound signal of receiver<br>-Suitable for 1:n and for case where transmission end has no microphone<br>-For example, suitable for case where beacon transmits sound |
| DualSeq ES | | -Transmission end can know distance through sound signal feedback for wireless signal of receiver<br>-Suitable for 1:1 and for case where reception end has no microphone |
| ASyncSound | | -Transmission end transmits periodic sound even though terminals are not synchronized<br>-Suitable for 1:n<br>-Can measure change in relatively distance<br>-For example, suitable for beacon/speaker |

FIG.10A

| | DualSync | DualSeq ES | DualSeq SE | SyncSound | ASyncSound |
|---|---|---|---|---|---|
| TV screen mirroring | | | | Grasp intention by measuring distance change, both TV to phone and phone to TV are possible (TV needs to transmit feedback to smart phone) | Grasp intention by measuring relative change, more suitable for TV to phone, smart phone can make determination without feedback |
| Speaker music streaming | | | | Grasp intention by measuring distance change, both speaker to phone and phone to speaker are possible (speaker needs to transmit feedback to smart phone | Grasp intention by measuring relative change, more suitable for speaker to phone, smart phone can make determination without feedback |
| Room speaker installation | Measure distance, 1:1, speaker to phone | Measure distance, 1:1, phone to speaker | Measure distance, 1:n, phone to speaker | | |
| TV/home theater settings | Measure distance, 1:n, speaker (TV) to phone | Measure distance, 1:1, phone to speaker (TV) | Measure distance, 1:1, phone to speaker (TV)Measure distance, 1:n, phone to speaker (TV) | | |
| Payment trigger service | Measure accurate distance (resolution in short distance is important), bilateral measurement | | | | |
| Location-based service | Phone measures distance from beacon, 1:n, beacon to phone | | Beacon collects distance of phone, 1:n, beacon to phone | Phone measures absolute distance change from beacon 1:n, beacon to phone | Phone measures relative distance change from beacon 1:n, beacon to phone |

Suitable for one time distance measurement

Suitable for grasping intention

FIG. 10B

APPARATUS AND METHOD FOR MEASURING WIRELESS RANGE

TECHNICAL FIELD

The present disclosure relates to a wireless communication system, and more particularly, to an apparatus and a method for measuring a distance in a wireless communication system.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

According to the recent development of wireless communication technologies, signal transmission and reception through a wireless device has increased. Users may receive various services through transmission and reception of various types of data (for example, multimedia data such as dynamic image, music, photo, and document) while transmitting and receiving signals through a wirelessly accessible wireless device such as a smart phone (or an electronic device).

SUMMARY

According to various embodiments, a method for operating a first electronic device in a wireless communication system comprises negotiating with a second electronic device, determining a measurement scheme among a plurality of measurement schemes using at least one of a wireless signal and a sound signal, based on a result of the negotiation with the second electronic device, and determining a distance between the first electronic device and the second electronic device according to the measurement scheme.

According to various embodiments, an apparatus of a first electronic device in a wireless communication system comprises at least one transceiver and at least one processor operatively coupled to the at least one transceiver. The at least one processor is configured to negotiate with a second electronic device, determine a measurement scheme among a plurality of measurement schemes using at least one of a wireless signal and a sound signal, based on a result of the negotiation with the second electronic device; and determine a distance between the first electronic device and the second electronic device according to the measurement scheme.

According to various embodiments, a method for operating a second electronic device in a wireless communication system comprises negotiating with a first electronic device, and determining a distance between the first electronic device and the second electronic device according to a measurement scheme determined by the first electronic device from a plurality of measurement schemes using at least one of a wireless signal and a sound signal, based on a result of the negotiation with the second electronic device.

According to various embodiments, an apparatus of a second electronic device in a wireless communication system comprises at least one transceiver and at least one processor operatively coupled to the at least one transceiver. The at least one processor configured to negotiate with a first electronic device, and determine a distance between the first electronic device and the second electronic device according to a measurement scheme determined by the first electronic device from a plurality of measurement schemes using at least one of a wireless signal and a sound signal, based on a result of the negotiation with the second electronic device.

BRIEF DESCRIPTION OF THE DRAWINGS

The following description is made with reference to the accompanying drawings for a more complete understanding of the present invention and effects thereof, and the same reference numerals indicate the same parts.

FIG. 10A illustrates wireless distance measurement schemes in terms of characteristics of electronic devices and distance measurement types according to embodiments of the present disclosure;

FIG. 10B illustrates wireless distance measurement schemes in terms of a distance measurement scenario according to embodiments of the present disclosure;

DETAILED DESCRIPTION

Figure 1A:
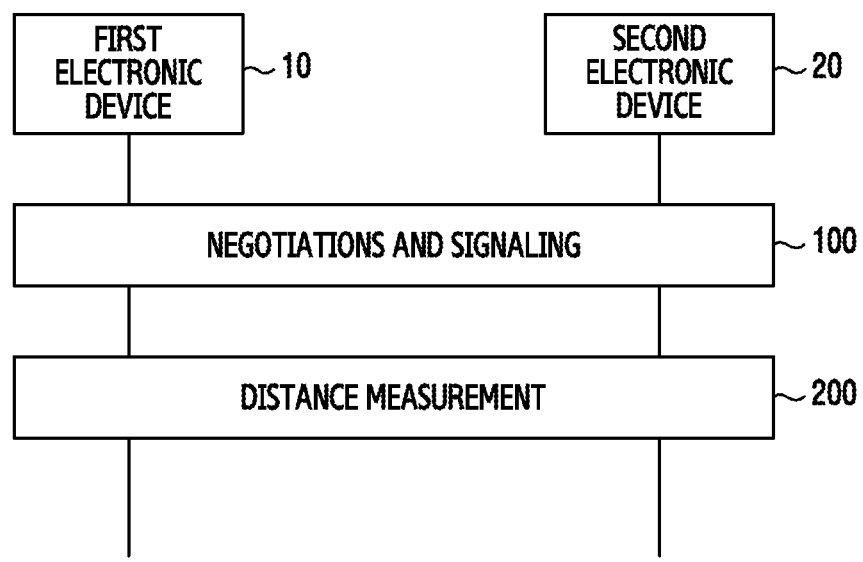
FIGS. 1A and 1B illustrate flows of processing of a wireless distance measurement operation between electronic devices according to embodiments of the present disclosure.
Figure 58:
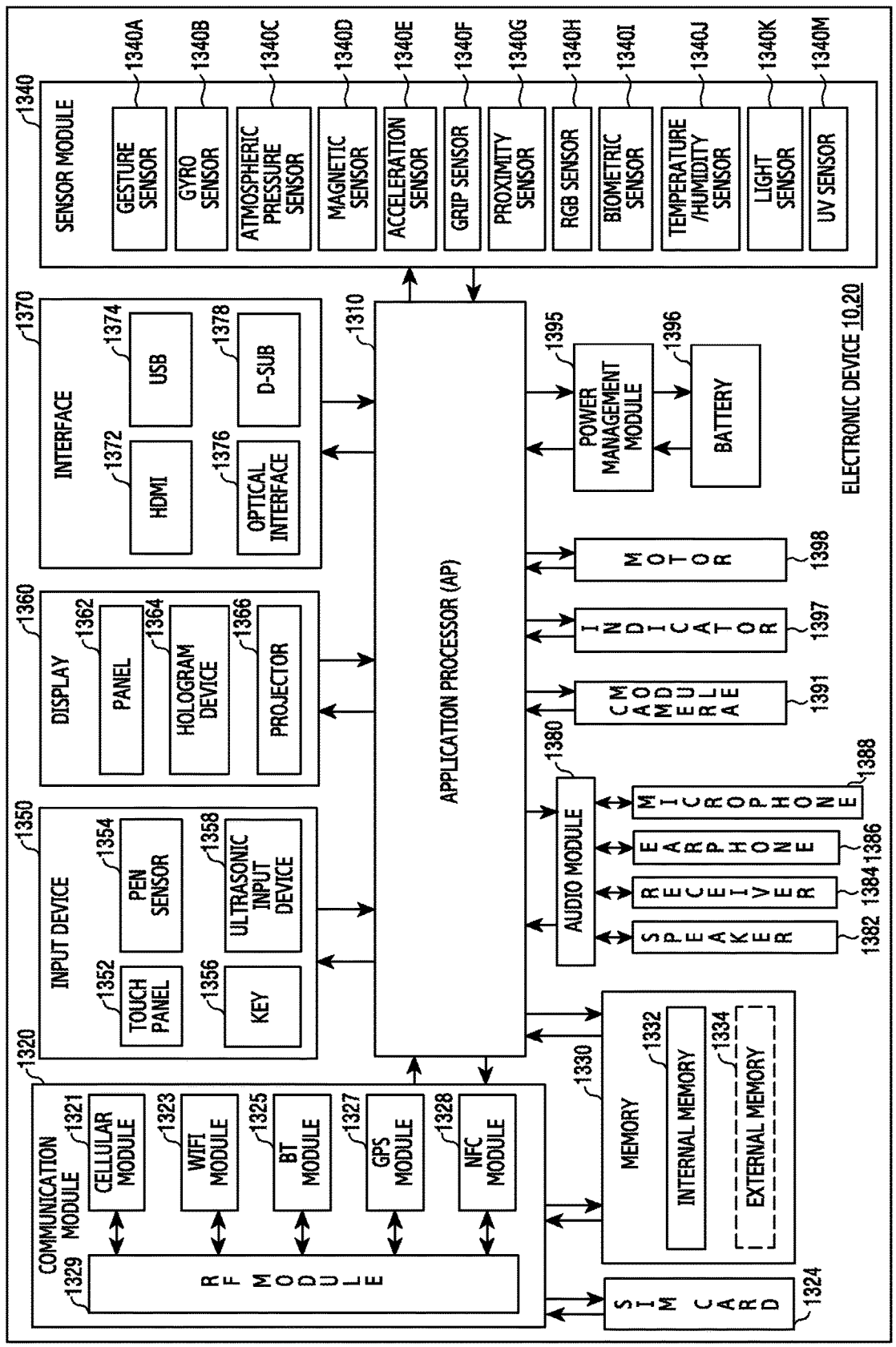
FIG. 58 is a block diagram illustrating an electronic device for a wireless distance measurement operation according to embodiments of the present disclosure.

In this patent specification, FIGS. 1A to 58 used for describing principles of the present disclosure are merely for examples and should not be interpreted to limit the scope of the disclosure.

Embodiments of the present disclosure described below propose an apparatus and a method for measuring a distance through transmission/reception of signals between wireless devices in a wireless communication system. The distance measurement device transmits and receives a signal through two wireless devices (or electronic devices) and measures a distance between the wireless devices (or electronic devices).

Accordingly, embodiments of the present disclosure provide an apparatus and a method for measuring a distance between wireless devices by using signals transmitted and received between the wireless devices in a wireless communication system.

Embodiments of the present disclosure provide an apparatus and a method for measuring a distance between wireless devices within an effective error range by using a wireless signal and a sound signal transmitted and received between the wireless devices in a wireless communication system.

Embodiments of the present disclosure provide an apparatus and a method for measuring a distance between wireless devices by selecting the best distance measurement scheme from a plurality of distance measurement schemes in a wireless communication system.

Embodiments of the present disclosure provide an apparatus and a method for measuring a distance between wireless devices in consideration of characteristics between the wireless devices in a wireless communication system.

Embodiments of the present disclosure provide an apparatus and a method for measuring a distance between wireless devices and performing the following operations according to a user's intention in a wireless communication system.

For example, the wireless device may be a portable electronic device having a wireless access function such as a smart phone. In another example, the wireless device may be one of a portable terminal, a mobile phone, a mobile pad, a tablet computer, a handheld computer, and a Personal Digital Assistant (PDA). In another example, the wireless device may be one of media devices such as a wirelessly accessible media player, a camera, a speaker, and a smart television. In another example, the wireless device may be a wearable electronic device such as a smart watch or smart glasses. In another example, the wireless device may be Point Of Sales (POS) device or a beacon device. In another example, the wireless device may be a device having a combination of two or more functions of the above described devices. Although a distance measurement operation between two electronic devices is representatively described below for convenience of the description, the electronic devices may be called other names such as a user mobile phone, a speaker, a TV, a user computer, a POS terminal, a beacon terminal, and a smart watch.

According to an embodiment, a wireless communication system may be a Device to Device (D2D) network or a Local Area Network (LAN) that supports wireless access between electronic devices, such as Bluetooth, Wi-Fi, and the like.

Figure 1B:
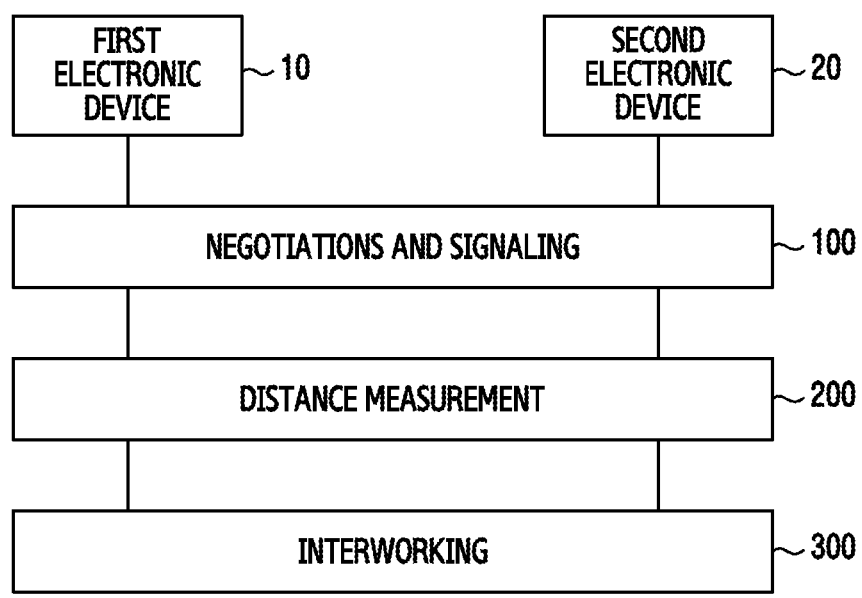

FIGS. 1A and 1B illustrate flows of processing of a wireless distance measurement operation between electronic devices according to embodiments of the present disclosure.

Referring to FIG. 1A, in step 100, a first electronic device 10 and a second electronic device 20 perform negotiations and a signaling operation for a distance measurement operation. In step 200, the first electronic device 10 and the second electronic device 20 select a measurement scheme from a plurality of measurement schemes based on a result of the negotiations, and measure a distance between the first electronic device 10 and the second electronic device 20 according to the measurement scheme selected from the plurality of measurement schemes.

Referring to FIG. 1B, in step 100, the first electronic device 10 and the second electronic device 20 perform negotiations and a signaling operation for a distance measurement operation. In step 200, the first electronic device 10 and the second electronic device 20 select a measurement scheme from a plurality of measurement schemes based on a result of the negotiations, and measure a distance between the first electronic device 10 and the second electronic device 20 according to the measurement scheme selected from the plurality of measurement schemes. In step 300, the first electronic device 10 and the second electronic device 20 interwork with each other based on a result of the distance measurement.

According to an embodiment, the process in which the first electronic device 10 and the second electronic device 20 perform the negotiations and the signaling operation includes a process in which the first electronic device 10 and the second electronic device 20 exchange characteristics.

According to an embodiment, the process in which the first electronic device 10 and the second electronic device 20 perform the negotiations and the signaling operation include a process in which the first electronic device 10 transfers a distance measurement-related parameter to the second electronic device 20. According to an embodiment, the distance measurement-related parameter includes at least one of a distance measurement period, a distance measurement start offset, the number of available speakers/microphones, a required measurement accuracy, a required distance measurement time, a recording time of a sound signal, identification information of the first electronic device, and a generation scheme of a sound signal.

According to an embodiment, one measurement scheme selected from the plurality of measurement schemes is selected based on at least one of characteristics of the first and second electronic devices, distance measurement schemes, and distance measurement scenarios.

According to an embodiment, one measurement scheme selected from the plurality of measurement schemes includes a scheme of measuring a distance between the first electronic device 10 and the second electronic device 20 by using at least one wireless signal and at least one sound signal generated by the first electronic device 10. According to another embodiment, one measurement scheme selected from the plurality of measurement schemes includes a scheme of measuring a distance between the first electronic device 10 and the second electronic device 20 by using one of a wireless signal and a sound signal generated by the first electronic device 10.

According to an embodiment, the process in which the first electronic device 10 and the second electronic device 20 interwork with each other includes a process of providing data related to a service performed by the first electronic device 10 to the second electronic device 20. According to another embodiment, the process in which the first electronic device 10 and the second electronic device 20 interwork with each other includes a process of providing data related to a service performed by the second electronic device 20 to the first electronic device 10.

According to an embodiment, the first and second electronic devices 10 and 20 include at least one of a portable electronic device having a wireless access function, a media device, a wearable electronic device, a POS device, and a beacon device.

According to an embodiment, the wireless signal includes a signal of a low power wireless communication scheme such as Bluetooth Low Energy (BLE).

Figure 2A:
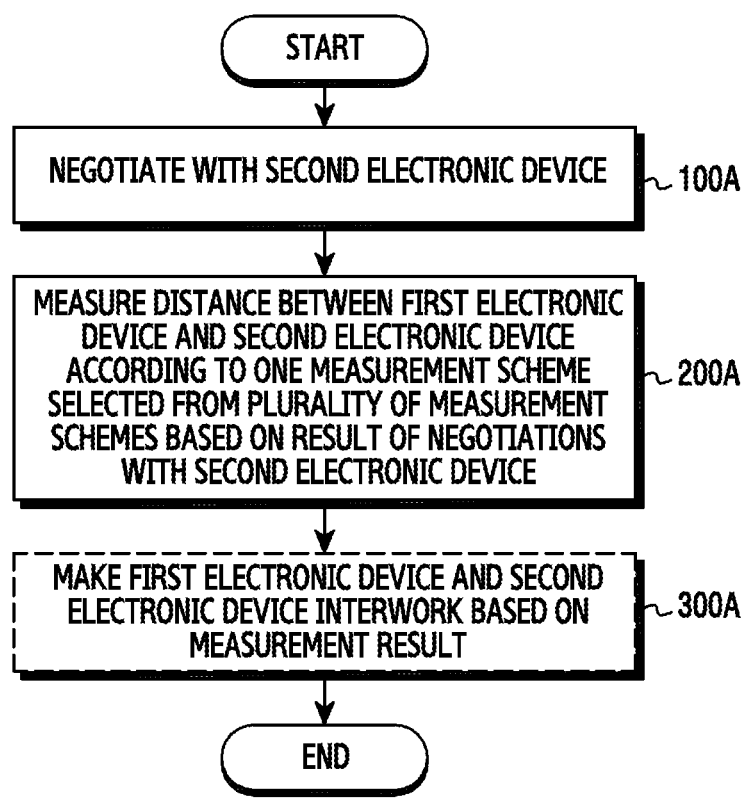
FIG. 2A illustrates a flow of processing by a first electronic device for a wireless distance measurement operation according to embodiments of the present disclosure.

FIG. 2A illustrates a flow of processing by the first electronic device for a wireless distance measurement operation according to embodiments of the present disclosure. The processing flow may be performed by the first electronic device 10 and the second electronic device 20 illustrated in FIGS. 1A and 1B.

Referring to FIG. 2A, the first electronic device 10 performs step 100A and step 200A. In step 100A, the first electronic device 10 negotiates with the second electronic device 20. In step 200A, the first electronic device 10 selects one measurement scheme from a plurality of measurement schemes based on a result of the negotiations with the second electronic device 20 and measures a distance between the first electronic device 10 and the second electronic device 20 according to the one measurement scheme selected from the plurality of measurement schemes.

According to an embodiment, the process of negotiating with the second electronic device 20 includes a process of exchanging characteristics of the first and second electronic devices 10 and 20.

According to an embodiment, one measurement scheme of the plurality of measurement schemes is selected based on at least one of characteristics of the first and second electronic devices 10 and 20, distance measurement types, and distance measurement scenarios. According to an embodiment, the characteristics of the first and second electronic devices 10 and 20 include at least one of a type of the electronic device, whether a microphone/speaker is installed and the number of microphones/speakers, a type of wireless connectivity, and the existence/non-existence of a power source. According to an embodiment, the distance measurement type includes at least one of a 1:1 distance measurement, a 1:n distance measurement, a one-time distance measurement, and a periodic distance measurement. According to an embodiment, the distance measurement scenario includes at least one of TV screen mirroring, speaker music streaming, room speaker installation, TV/home theater settings, a payment trigger service, and a location-based service.

According to an embodiment, the process of negotiating with the second electronic device 20 further includes a process of transferring a distance measurement-related parameter to the second electronic device 20. According to an embodiment, the distance measurement-related parameter includes at least one of a distance measurement period, a distance measurement start offset, the number of available speakers/microphones, a required measurement accuracy, a required distance measurement time, a recording time of a sound signal, identification information of the first electronic device, and a generation scheme of a sound signal.

According to an embodiment, one measurement scheme selected from the plurality of measurement schemes includes a scheme of measuring a distance between the first electronic device 10 and the second electronic device 20 by using at least one wireless signal and at least one sound signal generated by the first electronic device 10.

According to another embodiment, one measurement scheme selected from the plurality of measurement schemes includes a scheme of measuring a distance between the first electronic device 10 and the second electronic device 20 by using one of a wireless signal and a sound signal generated by the first electronic device 10.

According to an embodiment, the first and second electronic devices 10 and 20 include at least one of a portable electronic device having a wireless access function, a media device, a wearable electronic device, a POS device, and a beacon device.

According to an embodiment, the wireless signal includes a signal of a low power wireless communication scheme such as Bluetooth Low Energy (BLE).

Further, the first electronic device 10 may further perform process 300A in which the first electronic device 10 and the second electronic device 20 interwork with each other based on a result of the measurement.

According to an embodiment, the process in which the first electronic device 10 and the second electronic device 20 interwork with each other includes a process of providing data related to a service performed by the first electronic device 10 to the second electronic device 20. According to another embodiment, the process in which the first electronic device 10 and the second electronic device 20 interwork with each other includes a process of providing data related to a service performed by the second electronic device 20 to the first electronic device 10.

Figure 2B:
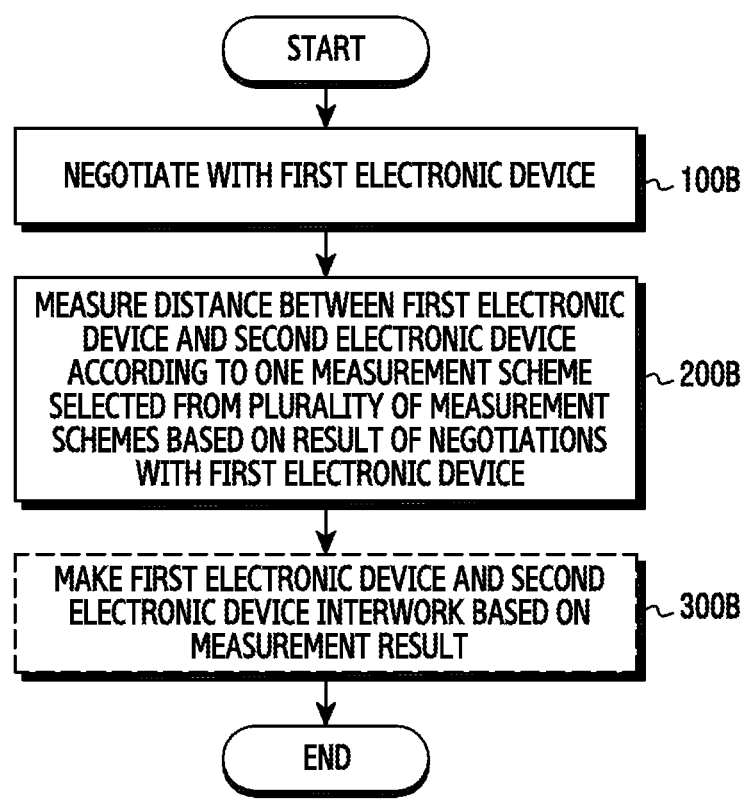
FIG. 2B illustrates a flow of processing by a second electronic device for a wireless distance measurement process according to embodiments of the present disclosure.

FIG. 2B illustrates a flow of processing by the second electronic device for a wireless distance measurement process according to embodiments of the present disclosure.

Referring to FIG. 2B, the second electronic device 20 performs steps 100B and 200B. In step 100B, the second electronic device 20 negotiates with the first electronic device 10. In step 200B, the second electronic device 20 selects one measurement scheme from a plurality of measurement schemes based on a result of the negotiations with the first electronic device 10 and measures a distance between the first electronic device 10 and the second electronic device 20 according to the one measurement scheme selected from the plurality of measurement schemes.

According to an embodiment, the process of negotiating with the first electronic device 10 includes a process of exchanging characteristics of the first and second electronic devices 10 and 20.

According to an embodiment, one measurement scheme of the plurality of measurement schemes is selected based on at least one of characteristics of the first and second electronic devices 10 and 20, distance measurement types, and distance measurement scenarios. According to an embodiment, the characteristics of the first and second electronic devices 10 and 20 include at least one of a type of the electronic device, whether a microphone/speaker is installed and the number of microphones/speakers, a type of wireless connectivity, and the existence/non-existence of a power source. According to an embodiment, the distance measurement type includes at least one of a 1:1 distance measurement, a 1:n distance measurement, a one-time distance measurement, and a periodic distance measurement. According to an embodiment, the distance measurement scenario includes at least one of TV screen mirroring, speaker music streaming, room speaker installation, TV/home theater settings, a payment trigger service, and a location-based service.

According to an embodiment, the process of negotiating with the first electronic device 10 further includes a process of transferring a distance measurement-related parameter to the first electronic device 10. According to an embodiment, the distance measurement-related parameter includes at least one of a distance measurement period, a distance measurement start offset, the number of available speakers/microphones, a required measurement accuracy, a required distance measurement time, a recording time of a sound signal, identification information of the first electronic device, and a generation scheme of a sound signal.

According to an embodiment, one measurement scheme selected from the plurality of measurement schemes includes a scheme of measuring a distance between the first electronic device 10 and the second electronic device 20 by using at least one wireless signal and at least one sound signal generated by the first electronic device 10.

According to another embodiment, one measurement scheme selected from the plurality of measurement schemes includes a scheme of measuring a distance between the first electronic device 10 and the second electronic device 20 by using one of a wireless signal and a sound signal generated by the first electronic device 10.

According to an embodiment, the first and second electronic devices 10 and 20 include at least one of a portable electronic device having a wireless access function, a media device, a wearable electronic device, a POS device, and a beacon device.

According to an embodiment, the wireless signal includes a signal of a low power wireless communication scheme such as Bluetooth Low Energy (BLE).

Further, the second electronic device 20 may further perform process 300B in which the first electronic device 10 and the second electronic device 20 interwork with each other based on a result of the measurement.

According to an embodiment, the process in which the first electronic device 10 and the second electronic device 20 interwork with each other includes a process of providing data related to a service performed by the second electronic device 20 to the first electronic device 10. According to another embodiment, the process in which the first electronic device 10 and the second electronic device 20 interwork with each other includes a process in which the second electronic device 20 receives data related to a service performed by the first electronic device 10.

Figure 3A:
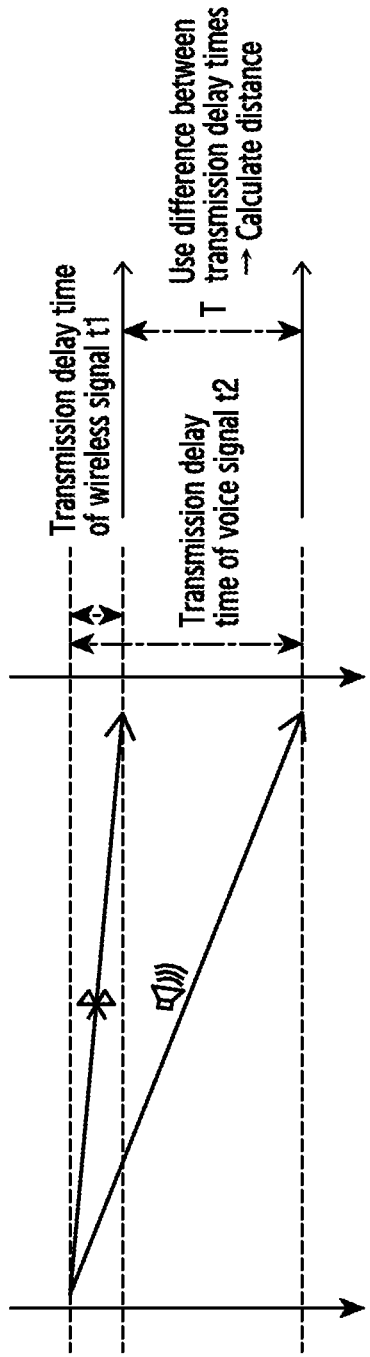
FIGS. 3A to 3C illustrate principles of a wireless distance measurement operation according to embodiments of the present disclosure.
Figure 3B:
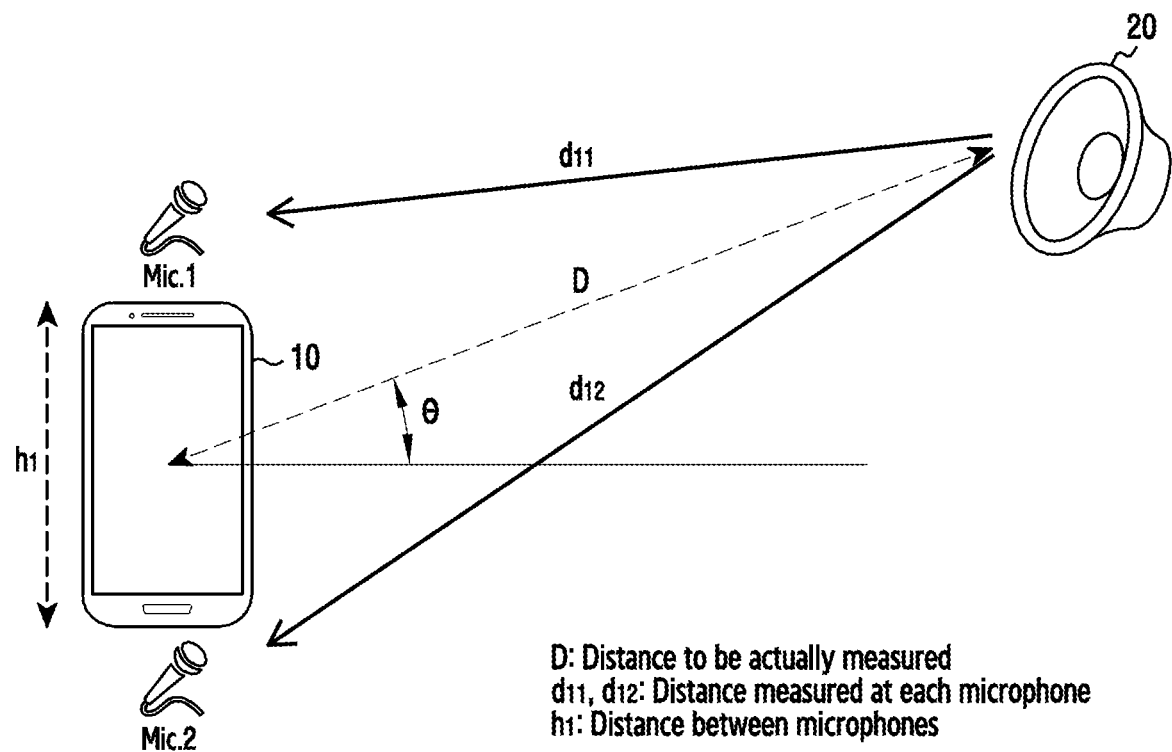
Figure 3C:
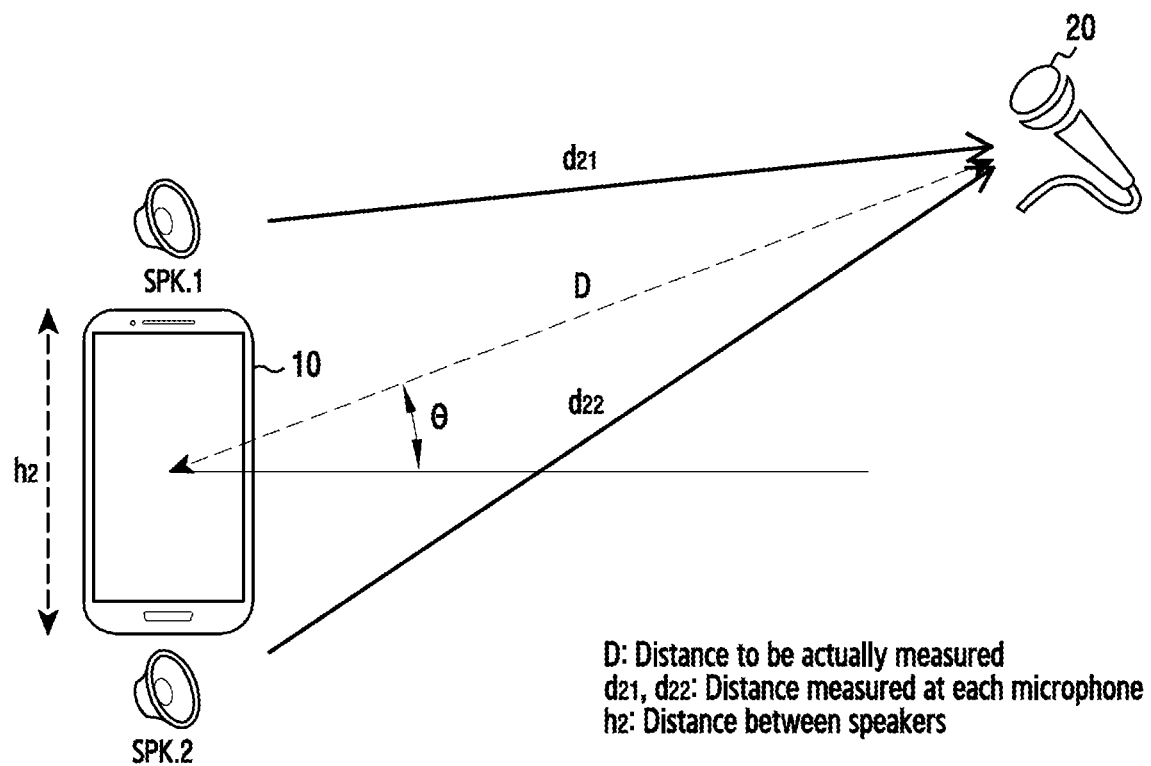

FIGS. 3A to 3C illustrate principles of a wireless distance measurement operation according to embodiments of the present disclosure. FIG. 3A illustrates an operation of measuring a distance between electronic devices, and FIGS. 3B and 3C illustrate operations of measuring a direction between electronic devices. The distance measurement operation may be performed the first electronic device 10 or the second electronic device 20 illustrated in FIGS. 1A and 1B.

Referring to FIG. 3A, the first electronic device 10 or the second electronic device 20 measure a distance between the first electronic device 10 and the second electronic device 20 by using a sound signal (or a voice signal) and a wireless signal (or an electric signal). The first electronic device 10 or the second electronic device 20 measure a distance between transmission and reception devices based on a transmission delay time difference generated due to a transmission speed difference between the wireless signal and the sound signal on the air. When a transmission delay time of the wireless signal is t1 and a transmission delay time of the sound signal is t2, the distance between the first electronic device 10 and the second electronic device 20 can be calculated using a transmission delay time difference T.

According to various embodiments of the present disclosure, the distance is measured using elements (for example, a speaker, a microphone, and a wireless module) existing in most electronic devices. The distance measurement can be performed within a particular accuracy level, so that embodiments of the present disclosure may provide various effects based on the distance measurement. For example, according to embodiments of the present disclosure, a user's intension is grasped based on a measured distance or a distance change and operations (for example, video screen mirroring, music streaming, TV or camera viewing angle adjustment, TV booting, PC unlock, function of sharing a screen/data between devices, and a dual screen/sound service) according to the grasped intention may be performed. In another example, according to various embodiments, a payment service function may be enhanced by measuring proximity based on an accurate distance measurement result. In another example, according to embodiments of the present disclosure, an accurate location-based service may be provided through clear geofencing based on an accurate distance measurement result. In another example, according to embodiments of the present disclosure, an environment of a media device (for example, room speaker installation and a home theater environment) may be set based on an accurate distance measurement result.

Referring to FIG. 3B, the second electronic device 20 is a sound source and the first electronic device 10 is a direction measurement end of the sound source. The first electronic device 10 receives a sound signal transmitted from a speaker of the second electronic device 20 through two microphones Mic.1 and Mic.2. The first electronic device 10 predicts a direction θ of a sound source based on a distance D between the measurement end 10 and the sound source 20 and the measurement end 10 by using a distance h between the first microphone Mic.1 and the second microphone Mic.2, a distance $d_{11}$ measured between the first microphone Mic.1 and the sound source 20, and a distance $d_{12}$ measured between the second microphone Mic.2 and the sound source 20.

Referring to FIG. 3C, the first electronic device 10 is a sound source, and the second electronic device 20 is a direction measurement end of the sound source. The second electronic device 20 receives sound signals transmitted from two speakers SPK.1 and SPK.2 of the first electronic device 10 through a microphone. The second electronic device 20 receives sound signals simultaneously transmitted through the first speaker SPK.1 and the second speaker SPK.2 through the microphone and measures a distance $d_{21}$ between the microphone and the first speaker SPK.1 and a distance $d_{22}$ between the microphone and the second speaker SPK.2. When the second electronic device 20 knows the distance h between the first speaker SPK.1 and the second speaker SPK.2, the second electronic device 20 predicts a direction θ of the sound source 10 based on the distance D between the measurement end 20 and the sound source 10 and the measurement end 20 by using the distance h between the first speaker SPK.1 and the second speaker SPK.2, the distance $d_{21}$ measured between the microphone and the speaker SPK.1, and the distance $d_{22}$ measured between the microphone and the second speaker SPK.2.

Figure 4:
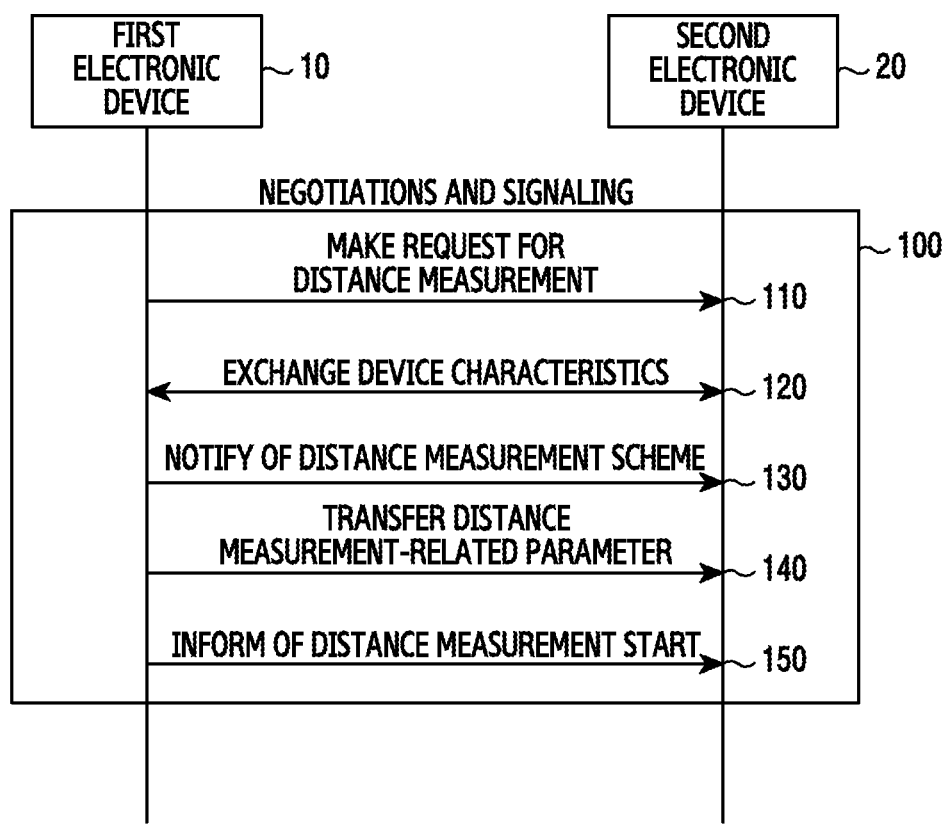
FIG. 4 illustrates a flow of processing of negotiations and a signaling operation according to various embodiments of the present disclosure.

FIG. 4 illustrates a flow of processing of negotiations and a signaling operation according to various embodiments of the present disclosure. The distance measurement operation may be performed between the first electronic device 10 and the second electronic device 20 illustrated in FIGS. 1A and 1B.

Referring to FIG. 4, in step 110, the first electronic device 10 transmits a distance measurement request to the second electronic device 20. In step 120, the first electronic device 10 and the second electronic device 20 exchange device characteristics. According to an embodiment, the device characteristics include at least one of a type of the electronic device, whether a microphone/speaker is installed and the number of microphones/speakers, a type of wireless connectivity, and the existence or non-existence of a power source. The type of the electronic device may include at least one of a portable electronic device, a media device, a wearable electronic device, a POS device, and a beacon device. Whether the microphone/speaker is installed and the number of microphones/speakers indicate whether a microphone or a speaker installed in the electronic device exists and, when the microphone or the speaker exists, the number of microphones or speakers. The wireless connectivity may include a scheme that supports transmission/reception of a low power wireless signal such as Bluetooth. The existence or non-existence of the power source indicates whether a power source that may continuously transmit a wireless signal exists.

Next, the first electronic device 10 selects the best distance measurement scheme from the plurality of distance measurement schemes. The plurality of distance measurement schemes will be described with reference to FIGS. 5 to 9 and FIGS. 10A and 10B.

According to an embodiment, the distance measurement scheme is selected based on at least one of characteristics of the first and second electronic devices 10 and 20, distance measurement types, and distance measurement scenarios. According to an embodiment, the distance measurement type includes at least one of a 1:1 distance measurement, a 1:n distance measurement, a one-time distance measurement, and a periodic distance measurement.

According to an embodiment, the distance measurement scenario includes at least one of TV screen mirroring, speaker music streaming, room speaker installation, TV/home theater settings, a payment trigger service, and a location-based service.

In step 130, the first electronic device 10 notifies the second electronic device 20 of the selected distance measurement scheme.

In step 140, the first electronic device 10 transfers a distance measurement-related parameter to the second electronic device 20. According to an embodiment, the distance measurement-related parameter includes at least one of a distance measurement period, a distance measurement start offset, the number of available speakers/microphones, a required measurement accuracy, a required distance measurement time, a recording time of a sound signal, identification information of the first electronic device, and a generation scheme of a sound signal. The distance measurement period indicates whether the distance measurement is periodic (single distance measurement or periodic distance measurement) and, when the distance measurement is periodic, indicates a value of the period. The distance measurement period may be determined according to the distance measurement scenario. The distance measurement start offset indicates an actual distance measurement start offset value that considers a time during which the electronic device prepares the measurement such as an on/off time of the microphone/speaker. The number of speakers/microphones indicates how many speakers and microphones can be used in the electronic device. The required measurement accuracy indicates accuracy (for example, error lower than 10 cm) of measurement required by the distance measurement scenario and influences complexity. The required distance measurement time indicates a required time spent to measure the distance. The required time spent to measure the distance may vary depending on the distance measurement scenario, and influences complexity and required accuracy. The performance of the electronic device indicates the electronic device performance to measure the distance. The performance may determine a calculation time for an operation to measure the distance and, accordingly, influence required measurement accuracy and required time. The recording time of the sound signal indicates a time during which the sound signal is recorded. The recording time may be set in consideration of a deviation of the time during which the speaker/microphone can be turned on. ID information of the electronic device indicates a user identification (ID) value for identifying a plurality of electronic devices. The generation scheme of the transmitted sound signal according to the ID indicates a scheme of determining a sound signal through the user ID value.

In step 150, the first electronic device 10 informs the second electronic device 20 of a distance measurement start.

According to the flow illustrated in FIG. 4, an example in which the first electronic device 10 and the second electronic device 20 perform the negotiations and the signaling process will be described.

According to an embodiment, both the first electronic device 10 and the second electronic device 20 are portable electronic devices (for example, smart phones).

First, the first electronic device 10, which is an initiator of the distance measurement, starts the negotiation process by expressing intention to measure a distance to the second electronic device 20.

Second, the first electronic device 10 and the second electronic device 20 exchange information with each other or the second electronic device 20 transmits information to the first electronic device 10. For example, whether a speaker/microphone is installed or available wireless connectivity information may be exchanged. In another example, a signal processing speed and capability information may be exchanged.

Third, the first electronic device 10 transfers the intention to measure the distance one time to the second electronic device 20 based on the mutual information exchange. For example, the first electronic device 10 transfers required accuracy, and selects and notifies of a DualSync scheme illustrated in FIG. 5 described below.

In another embodiment, the first electronic device 10 is a portable electronic device (for example, a smart phone), and the second electronic device 20 is a media device (for example, a TV).

First, the first electronic device 10 starts the negotiation process by expressing the intention to measure the distance to the second electronic device 20.

Second, the first electronic device 10 and the second electronic device 20 exchange information with each other or the second electronic device 20 transmits information to the first electronic device 10. For example, whether a speaker/microphone is installed or available wireless connectivity information may be exchanged. In another example, a signal processing speed and capability information may be exchanged.

Third, the first electronic device 10 transfers the intention to measure a distance change through periodic distance measurement to the second electronic device 20 based on the mutual information exchange. For example, the first electronic device 10 transfers a measurement period value, required accuracy, and a sound recording time value calculated based on the performance of the TV to the TV, and selects and notifies of a SyncScound scheme illustrated in FIG. 6 described below.

In FIG. 4, the example has been described in which the first electronic device 10 and the second electronic device 20 exchange device characteristics, the first electronic device 10 selects the distance measurement scheme based on the device characteristics and notifies the second electronic device 20 of the selected distance measurement scheme, and then transfers the distance measurement-related parameter to the second electronic device 20. However, the example is only for an example and can be modified without departing from the scope of the present disclosure. In an alternative example, the distance measurement-related parameter may be also exchanged in the process of exchanging the device characteristics.

FIGS. 5 to 9 illustrate wireless distance measurement schemes according to embodiments of the present disclosure. The distance measurement operation may be performed between the first electronic device 10 and the second electronic device 20 illustrated in FIGS. 1A and 1B.

Figure 5:
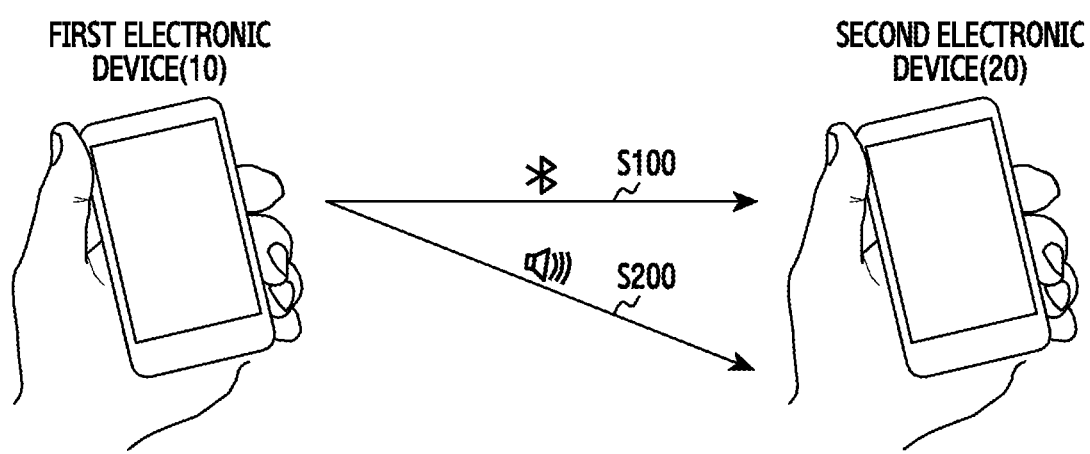
FIGS. 5 to 9 illustrate wireless distance measurement schemes according to embodiments of the present disclosure.

Referring to FIG. 5, the first electronic device 10 which is a transmission end transmits a wireless signal in S100 and transmits a sound signal in S200. The second electronic device 20 which is a reception end may receive the sound signal and the wireless signal transmitted from the first electronic device 10 and measure a distance between the first electronic device 10 and the second electronic device 20.

Figure 6:
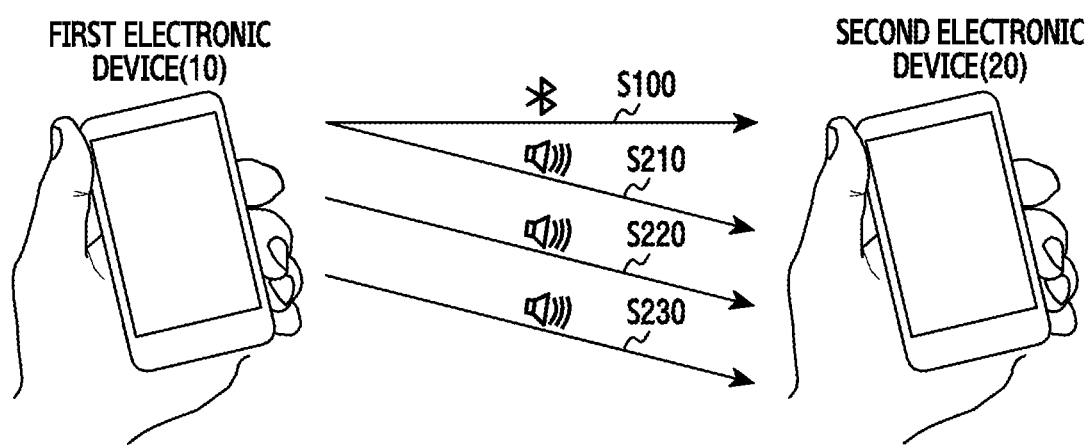

Referring to FIG. 6, the first electronic device 10 transmits the wireless signal in S100. The second electronic device 20 receives the wireless signal transmitted from the first electronic device 10. The first electronic device 10 and the second electronic device 20 are synchronized with each other through the transmission and reception of the wireless signal.

Next, the first electronic device 10 periodically transmits the sound signal in S210, S220, and S230. The second electronic device 20 receives the sound signal periodically transmitted from the first electronic device 10. The second electronic device 20 may measure the distance between the first electronic device 10 and the second electronic device 20 by receiving the wireless signal and the sound signal. Thereafter, the second electronic device 20 may measure an absolute distance change from the first electronic device 10 by periodically receiving the sound signal.

Figure 7:
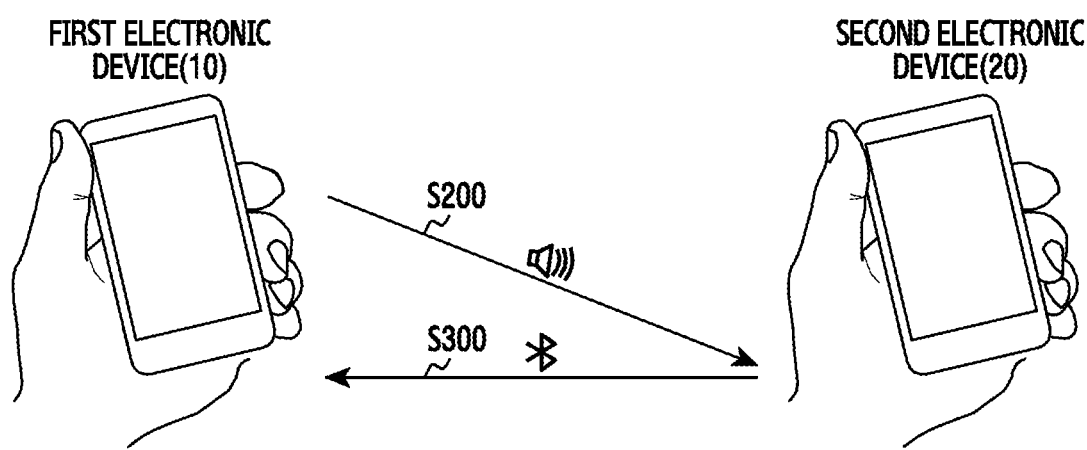

Referring to FIG. 7, the first electronic device 10 transmits the sound signal in S200. The second electronic device 20 receives the sound signal transmitted from the first electronic device 10 and transmits the wireless signal in response to the received sound signal in S300. The first electronic device 10 may measure the distance between the first electronic device 10 and the second electronic device 20 by transmitting the sound signal and receiving the wireless signal.

Figure 8:
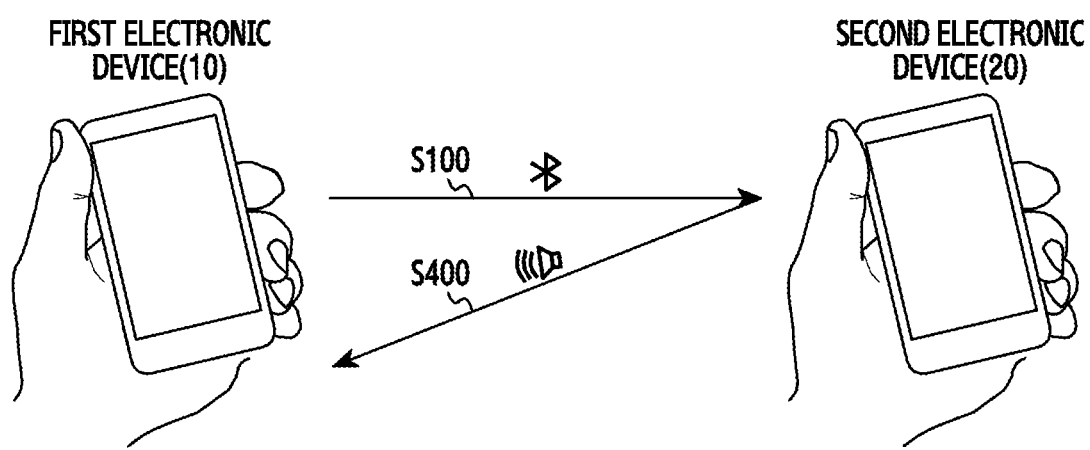

Referring to FIG. 8, the first electronic device 10 transmits the wireless signal in S100. The second electronic device 20 receives the wireless signal transmitted from the first electronic device 10 and transmits the sound signal in response to the received wireless signal in S400. The first electronic device 10 may measure the distance between the first electronic device 10 and the second electronic device 20 by transmitting the wireless signal and receiving the sound signal.

Figure 9:
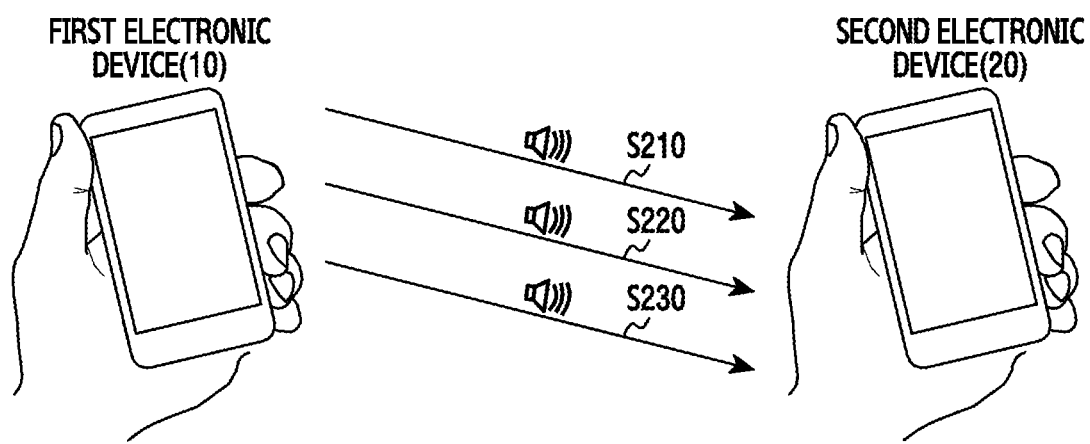

Referring to FIG. 9, the first electronic device 10 periodically transmits the sound signal in S210, S220, and S230. The second electronic device 20 receives the sound signal periodically transmitted from the first electronic device 10. The second electronic device 20 may measure a relative distance change between the first electronic device 10 and the second electronic device 20 by periodically receiving the sound signal.

FIG. 10A illustrates wireless distance measurement schemes in terms of characteristics of electronic devices and distance measurement types according to embodiments of the present disclosure.

Referring to FIG. 10A, a DualSync scheme corresponds to a distance measurement scheme according to the scheme illustrated in FIG. 5. In the scheme, the reception end (second electronic device 20) may measure the distance through the one transmission by the transmission end (first electronic device 10). The scheme is suitable for all of the distance measurement types of 1:n and 1:1.

A SyncSound scheme corresponds to a distance measurement scheme according to the scheme illustrated in FIG. 6. In the scheme, the reception end may continuously measure the distance through periodic sound signal transmission by the transmission end in a state where the transmission end and the reception end are synchronized through one time (or periodic) wireless signal transmission. The scheme is suitable for all of the distance measurement types of 1:n and 1:1. In the scheme, the reception end can measure an absolute distance change from the transmission end.

A DualSeq SE scheme corresponds to a distance measurement scheme according to the scheme illustrated in FIG. 7. The transmission end may measure the distance through feedback of the wireless signal for the sound signal of the reception end. The scheme is suitable for the distance measurement type of 1:n in which the transmission end does not have a microphone. For example, the scheme may be suitable for a case where a beacon terminal transmits the sound signal.

A DualSeq ES scheme corresponds to a distance measurement scheme according to the scheme illustrated in FIG. 8. The transmission end may measure the distance through feedback of the sound signal for the wireless signal of the reception end. The scheme is suitable for the distance measurement type of 1:1 in which the reception end does not have a microphone.

An ASyncSound scheme corresponds to a distance measurement scheme according to the scheme illustrated in FIG. 9. According to the scheme, the transmission end periodically transmits the sound signal even when the electronic devices are not synchronized. The scheme is suitable for the distance measurement type of 1:n and enables the measurement of a relative distance change between the transmission end and the reception end. For example, the scheme may be suitable for a case where a beacon terminal/speaker transmits the sound signal.

FIG. 10B illustrates wireless distance measurement schemes in terms of a distance measurement scenario according to embodiments of the present disclosure.

Referring to FIG. 10B, the wireless distance measurement schemes are divided in terms of a scenario using a distance measurement result. For example, it is described that the distance measurement scenario includes TV screen mirroring, speaker music streaming, room speaker installation, TV/home theater settings, a payment trigger service, and a location-based service, but the scope of the present disclosure is not limited thereto.

For the TV screen mirroring, the SyncSound scheme or the ASyncSound scheme may be used. In the SyncSound scheme, a distance change may be measured and a user's intention may be grasped. The scheme can be applied to all types of the electronic devices such as TV→phone and phone→TV. In this case, feedback from the TV to the smart phone is required. In the ASyncSound scheme, a relative distance change may be measured and a user's intention may be grasped. The scheme is more suitable for the type of the electronic devices such as TV→phone. In this case, the determination by the smart phone without feedback is possible.

For the speaker music streaming, the SyncSound scheme or the ASyncSound scheme may be used. In the SyncSound scheme, a distance change may be measured and a user's intention may be grasped. The scheme can be applied to all types of the electronic devices such as speaker→phone and phone→speaker. In this case, feedback from the speaker to the smart phone is required. In the ASyncSound scheme, a relative distance change may be measured and a user's intention may be grasped. The scheme is more suitable for the type of the electronic devices such as speaker→phone. In this case, the determination by the smart phone without feedback is possible.

For the room speaker installation, the DualSync scheme, the DualSeq ES scheme, or the DualSeq SE scheme may be used. In the DualSync scheme, the distance between the electronic devices is measured. The scheme can be applied to the type of the electronic devices such as speaker→phone in a manner of 1:1. In the DualSeq ES scheme, the distance between the electronic devices is measured. The scheme can be applied to the type of the electronic devices such as phone→speaker in a manner of 1:1. In the DualSeq SE scheme, the distance between the electronic devices is measured. The scheme can be applied to the type of the electronic devices such as phone→speaker in a manner of 1:n.

For the TV/home theater settings, the DualSync scheme, the DualSeq ES scheme, or the DualSeq SE scheme may be used. In the DualSync scheme, the distance between the electronic devices is measured. The scheme can be applied to the type of the electronic devices such as speaker (TV)→phone in a manner of 1:n. In the DualSeq ES scheme, the distance between the electronic devices is measured. The scheme can be applied to the type of the electronic devices such as phone→speaker (TV) in a manner of 1:1. In the DualSeq SE scheme, the distance between the electronic devices is measured. The scheme can be applied to the type of the electronic devices such as phone→speaker (TV) in a manner of 1:n.

For the payment trigger service, the DualSync scheme may be used. The DualSync scheme is to measure an accurate distance and may be used when resolution in a short range is important. The measurement is bi-directionally possible by electronic devices.

For the location-based service, the DualSync scheme, the DualSeq SE scheme, the SyncSound scheme, or the ASyncSound scheme may be used. The DualSync scheme may be used when the phone measures a distance from the beacon. The scheme can be applied to the type of the electronic devices such as beacon→phone in a manner of 1:n. The DualSeq SE scheme may be used when the beacon collects the distance to the phone. The scheme can be applied to the type of the electronic devices such as beacon→phone in a manner of 1:n. The SyncSound scheme may be used when the phone measures an absolute distance from the beacon. The scheme can be applied to the type of the electronic devices such as beacon→phone in a manner of 1:n. The ASyncSound scheme may be used when the phone measures a relative distance from the beacon. The scheme can be applied to the type of the electronic devices such as beacon→phone in a manner of 1:n.

The DualSync scheme, the DualSeq ES scheme, and the DualSeq SE scheme may be used for one time distance measurement. In contrast, the SyncSound scheme and the ASyncSound scheme may be used when the user's intention is grasped through the distance measurement.

Figure 11:
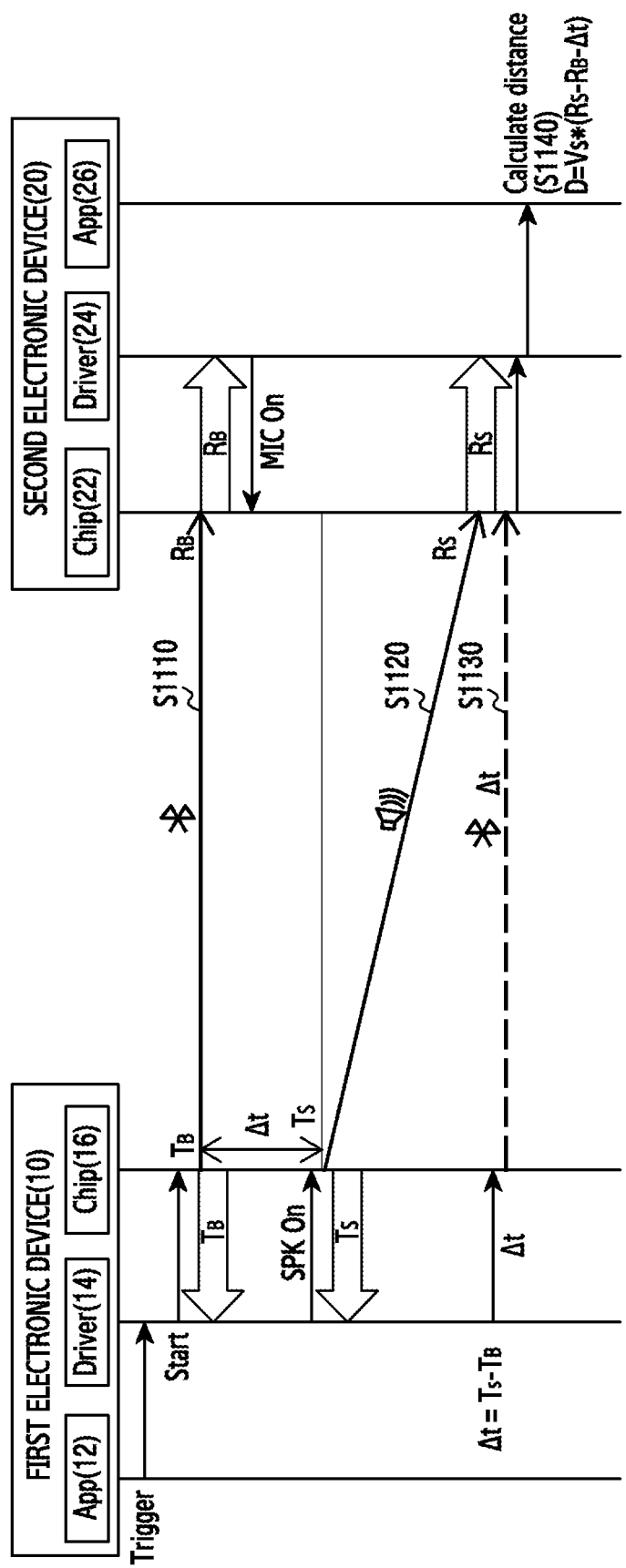
FIG. 11 illustrates a flow of processing of a wireless distance measurement scheme according to a first embodiment of the present disclosure.

FIG. 11 illustrates a flow of processing of a wireless distance measurement scheme according to a first embodiment of the present disclosure. The processing flow corresponds to a processing flow of the wireless distance measurement scheme according to the DualSync scheme. Here, the illustrated matters are only for an example for describing the present disclosure and should be not construed to limit the protection range of the present disclosure since modified embodiments can be made.

Referring to FIG. 11, the first electronic device 10 includes an application 12, a driver 14, and a chip 16. The second electronic device 20 includes an application 22, a driver 24, and a chip 26. The chips 16 and 26 are elements for generating a wireless signal or a sound signal. For example, the chips 16 and 26 include a module (for example, a BT module 1325 or a communication module 1320 of FIG. 53) for generating a wireless signal such as a Bluetooth Low Energy (BLE) signal. In another example, the chips 16 and 26 include a module (for example, an audio module 1380 of FIG. 53) for generating a sound signal. The applications 12 and 22 are elements for performing a service of the electronic device. The drivers 14 and 24 are elements for controlling driving of the chips 16 and 26. The first electronic device 10 includes a speaker, and the second electronic device 20 includes a microphone.

The application 12 of the first electronic device 10 generates a trigger signal for measuring a distance, and the driver 14 generates a distance measurement start signal in response to the trigger signal. The chip 16 generates a wireless signal (for example, Bluetooth Low Energy (BLE) signal) in response to the distance measurement start signal at a $T_B$ time point in S1110. According to an embodiment, the negotiation process 100 illustrated in FIGS. 1A and 1B may be performed in response to a trigger signal, and the distance measurement start signal may be executed after the negotiation process 100 is finished.

The second electronic device 20 receives a wireless signal from the first electronic device 10 at an $R_B$ time point and activates the microphone in response to the wireless signal. The driver 24 of the second electronic device 20 activates the microphone after a predetermined time (for example, $\Delta t$) from the $R_B$ time point. Then, the microphone connected to the chip 22 starts recording. Thereafter, the recording through the microphone is made for a predetermined time from a ($R_B+\Delta t$) time point because the second electronic device 20 does not know when the sound signal transmitted from the first electronic device 10 is received. Here, the predetermined time may be set as a proper and sufficient time after a time point when it is expected to receive the sound signal. For example, the predetermined time may be determined in consideration of a time difference ($\Delta t=T_S-T_B$) between a $T_B$ time point and a $T_S$ time point and a time when the sound signal transmitted from the first electronic device 10 reaches the second electronic device 20.

The driver 14 of the first electronic device 10 generates the sound signal through the speaker connected to the chip 16 by activating the speaker at the $T_S$ time point after the $T_B$ time point in S1200.

The second electronic device 20 receives the sound signal from the first electronic device 10 through the microphone at the $R_S$ time point. The microphone of the second electronic device 20 performs recording for a predetermined time from a ($R_B+\Delta t$) time point and receives the sound signal from the first electronic device 10 while the recording operation is performed.

The first electronic device 10 transfers information on the time difference ($\Delta t=T_S-T_B$) between the $T_B$ time point and the $T_S$ time point to the second electronic device 20 in S1130.

The second electronic device 20 calculates a distance D between the first electronic device 10 and the second electronic device 20 based on the time difference between the reception time point ($R_B$) of the wireless signal and the reception time point ($R_S$) of the sound signal and the information on the time difference ($\Delta t=T_S-T_B$) between the $T_B$ time point and the $T_S$ time point received from the first electronic device 10 in S1140. The distance D between the first electronic device 10 and the second electronic device 20 is calculated as shown in equation (1) below. The application 26 of the second electronic device 20 derives the reception time point ($R_S$) of the sound signal by using a result of the recording through the microphone. That is, the application 26 may derive the reception time point ($R_S$) of the sound signal since the time point $R_B$ when the wireless signal is received from the first electronic device 10, the time point ($R_B+\Delta t$) when the recording is started through the microphone, and the time during which the recording is performed from the time point ($R_B+\Delta t$) are known.

$$D=V_s*(R_S-R_B-\Delta t) \quad \text{equation (1)}$$

Here, $V_S$ denotes a transmission speed (340 m/s) of the sound signal, $R_S$ denotes a time point when the second electronic device 20 receives the sound signal, $R_B$ denotes a time point when the second electronic device 20 receives the wireless signal, and $\Delta t$ denotes a time difference between the time point ($T_B$) when the first electronic device 10 transmits the wireless signal and the time point ($T_S$) when the first electronic device 10 transmits the sound signal.

According to another embodiment, when the first electronic device 10 simultaneously transmits the wireless signal and the sound signal, the first electronic device 10 does not need to transmit information on the time difference ($\Delta t=T_S-T_B$) between the $T_B$ time point and the $T_S$ time point to the second electronic device 20. In this case, the second electronic device 20 may measure the distance D between the first electronic device 10 and the second electronic device 20 by applying $\Delta t=0$ to equation (1).

Information on the distance D between the first electronic device 10 and the second electronic device 20 measured by the second electronic device 20 may be fed back to the first electronic device 10.

Figure 12:
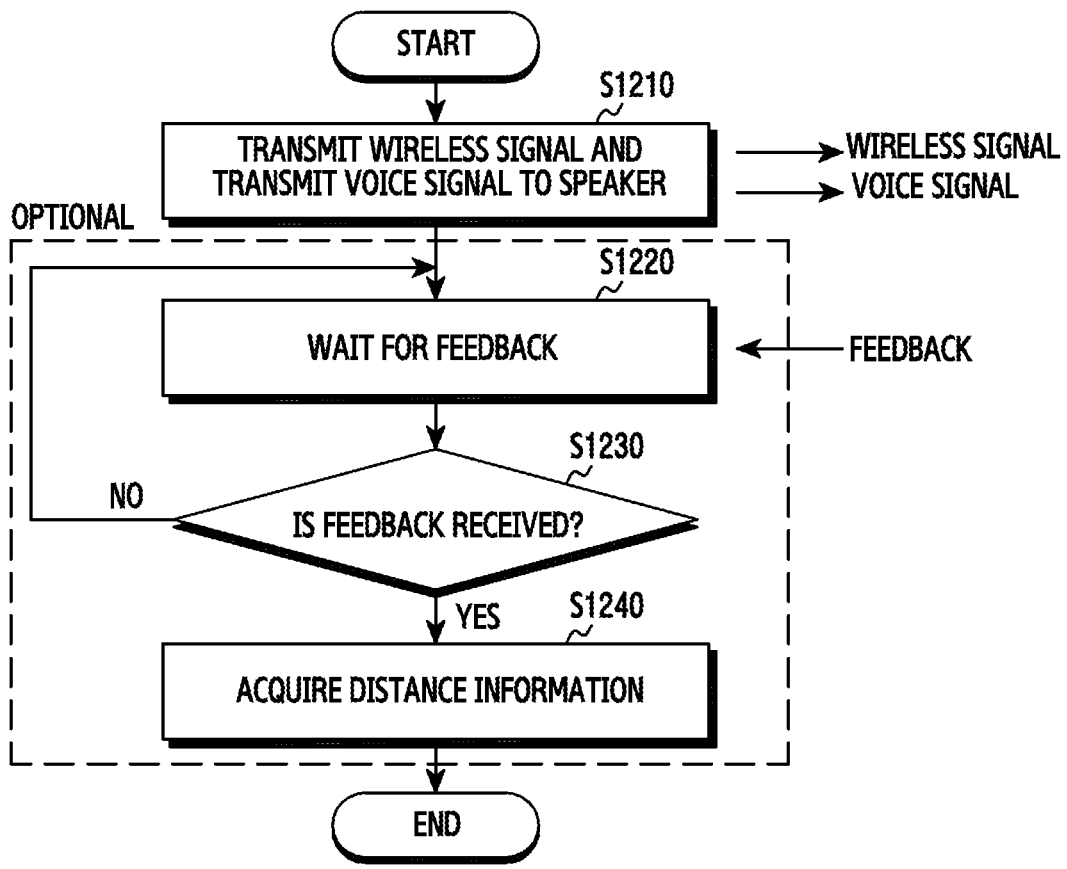
FIG. 12 illustrates a flow of processing of the first electronic device for wireless distance measurement according to the first embodiment of the present disclosure.

FIG. 12 illustrates a flow of processing for wireless distance measurement by the first electronic device according to the first embodiment of the present disclosure. The processing flow may be performed by the first electronic device 10 illustrated in FIG. 11. Here, the illustrated matters are only for an example for describing the present disclosure and should be not construed to limit the protection range of the present disclosure since modified embodiments can be made.

Referring to FIG. 12, in step S1210, the first electronic device 10 transmits the wireless signal and transmits the sound signal through the speaker.

The first electronic device 10 waits for feedback from the second electronic device 20 in step S1220, and determines whether the feedback is received from the second electronic device 20 in step S1230.

When the feedback is received from the second electronic device 20, the first electronic device 10 acquire information on the distance between the first electronic device 10 and the second electronic device 20 from the received feedback information in S1240.

The operations of steps S1220 to S1240 may be selectively performed.

According to another embodiment, the first electronic device 10 determines whether a preset timer expires in step S1230 and, when the timer expires, proceeds to step S1240.

Figure 13:
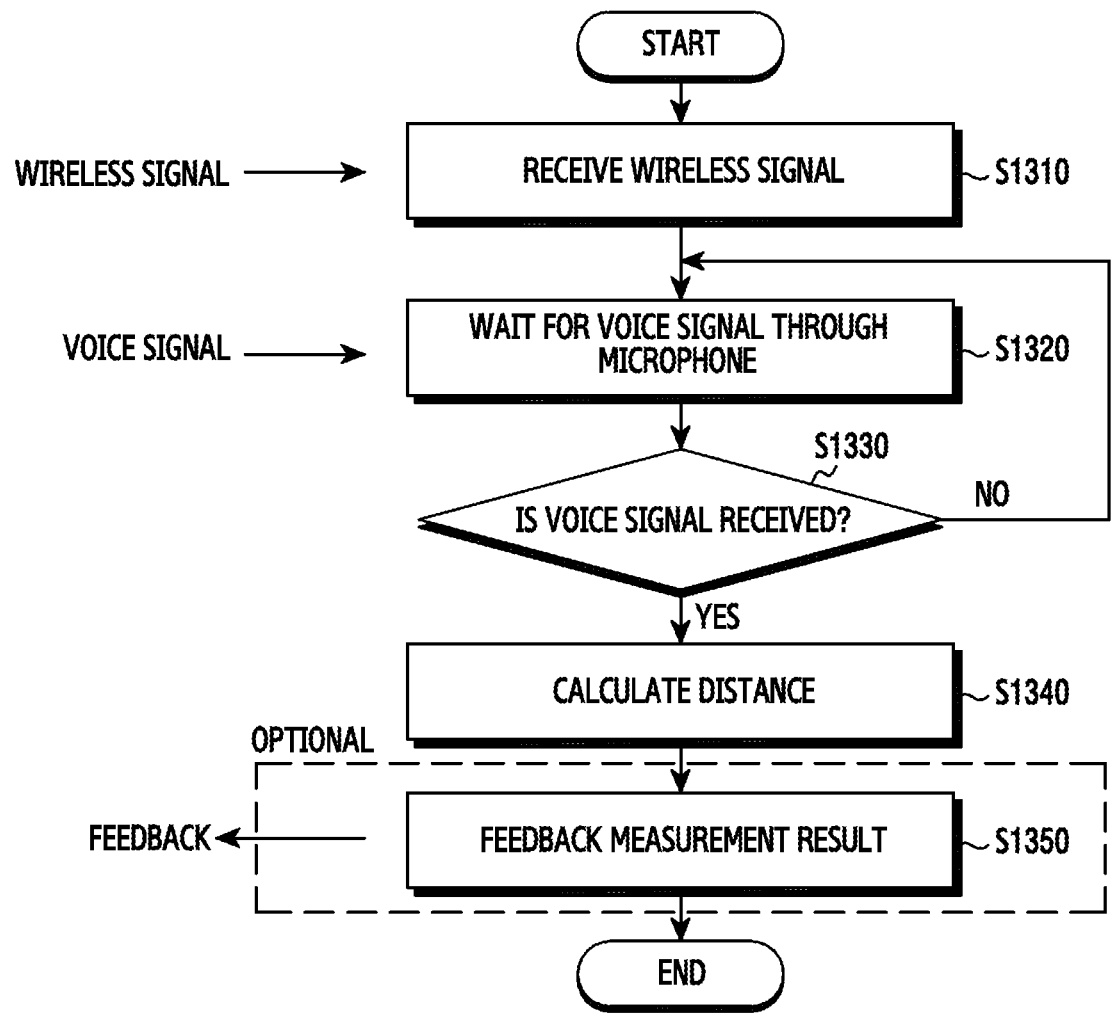
FIG. 13 illustrates a flow of processing for wireless distance measurement by the second electronic device according to the first embodiment of the present disclosure.

FIG. 13 illustrates a flow of processing for wireless distance measurement by the second electronic device according to the first embodiment of the present disclosure. The processing flow may be performed by the second electronic device 20 illustrated in FIG. 11. Here, the illustrated matters are only for an example for describing the present disclosure and should be not construed to limit the protection range of the present disclosure since modified embodiments can be made.

Referring to FIG. 13, in step S1310, the second electronic device 20 receives the wireless signal from the first electronic device 10. In step S1320, the second electronic device 20 waits for receiving the sound signal from the first electronic device 10 through the microphone. In step S1330, the second electronic device 20 determines whether the sound signal is received from the first electronic device 10 through the microphone.

When the sound signal is received through the microphone, the second electronic device 20 calculates a distance between the first electronic device 10 and the second electronic device 20 based on a time point when the wireless signal is received and a time point when the sound signal is received in step S1340. The second electronic device 20 calculates the distance between the first electronic device 10 and the second electronic device 20 according to equation (1).

In step S1350, the second electronic device 20 feeds back measurement result information of the distance between the first electronic device 10 and the second electronic device 20 to the first electronic device 10. Operation of step S1350 may be selectively performed.

In another embodiment, the second electronic device 20 may determine whether a preset timer expires in step S1330 and, when the time expires, feedback failure of the distance measurement in step S1350.

Figure 14:
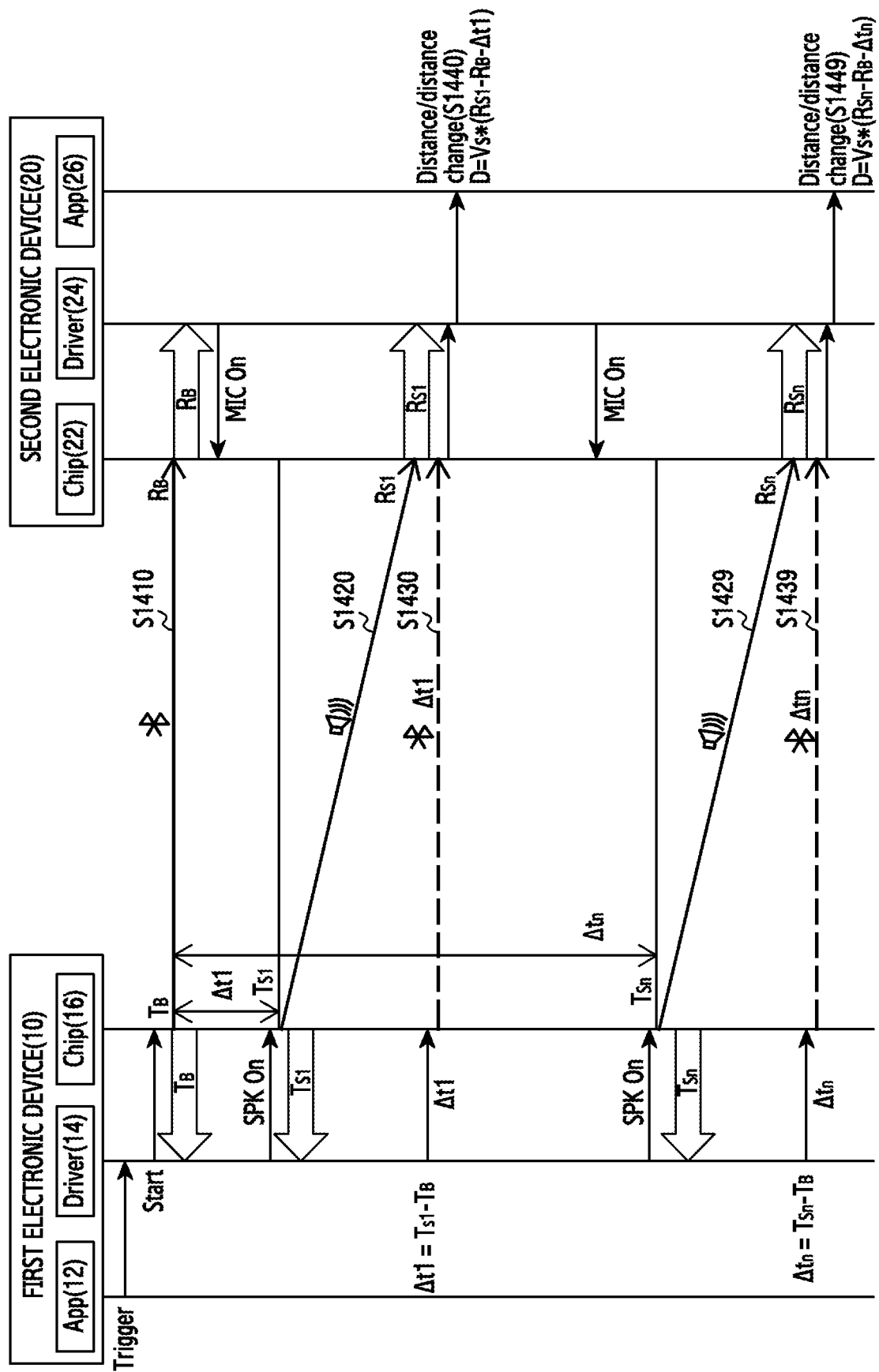
FIG. 14 illustrates a flow of processing of a wireless distance measurement scheme according to a second embodiment of the present disclosure.

FIG. 14 illustrates a flow of processing of a wireless distance measurement scheme according to a second embodiment of the present disclosure. The processing flow corresponds to a processing flow of the wireless distance measurement scheme according to the SyncSound scheme. Here, the illustrated matters are only for an example for describing the present disclosure and should be not construed to limit the protection range of the present disclosure since modified embodiments can be made.

Referring to FIG. 14, the first electronic device 10 includes an application 12, a driver 14, and a chip 16. The second electronic device 20 includes an application 22, a driver 24, and a chip 26. The chips 16 and 26 are elements for generating a wireless signal or a sound signal. For example, the chips 16 and 26 include a module (for example, a BT module 1325 or a communication module 1320 of FIG. 53) for generating a wireless signal such as a Bluetooth Low Energy (BLE) signal. In another example, the chips 16 and 26 include a module (for example, an audio module 1380 of FIG. 53) for generating a sound signal. The applications 12 and 22 are elements for performing a service of the electronic device. The drivers 14 and 24 are elements for controlling driving of the chips 16 and 26. The first electronic device 10 includes a speaker, and the second electronic device 20 includes a microphone.

The application 12 of the first electronic device 10 generates a trigger signal for measuring a distance, and the driver 14 generates a distance measurement start signal in response to the trigger signal. The chip 16 generates a wireless signal (for example, Bluetooth Low Energy (BLE) signal) in response to the distance measurement start signal at a time point $T_B$ in S1410. According to an embodiment, the negotiation process 100 illustrated in FIGS. 1A and 1B may be performed in response to a trigger signal, and the distance measurement start signal may be executed after the negotiation process 100 is finished.

The second electronic device 20 receives a wireless signal from the first electronic device 10 at a time point $R_B$ and activates the microphone in response to the wireless signal. The driver 24 of the second electronic device 20 activates the microphone after a predetermined time (for example, $\Delta t$) from the time point $R_B$. Then, the microphone connected to the chip 22 starts recording. Thereafter, the recording through the microphone is made for a predetermined time from a time point $(R_B+\Delta t)$ because the second electronic device 20 does not know when the sound signal transmitted from the first electronic device 10 is received. Here, the predetermined time may be set as a proper and sufficient time after a time point when it is expected to receive the sound signal. For example, the predetermined time may be determined in consideration of a time difference ($\Delta t1=T_S-T_B$) between a time point $T_B$ and a time point $T_S$ and a time during which the sound signal transmitted from the first electronic device 10 reaches the second electronic device 20.

The driver 14 of the first electronic device 10 generates the sound signal through the speaker connected to the chip 16 by activating the speaker at one or more time points after the $T_B$ time point in S1420 to S1429.

More specifically, the first electronic device 10 generates the sound signal through the speaker connected to the chip 16 by activating the speaker at a time point $T_{S1}$ after the time point $T_B$ in S1420.

The second electronic device 20 receives the sound signal from the first electronic device 10 through the microphone at a time point $R_{S1}$. The microphone of the second electronic device 20 performs recording for a predetermined time from a time point $(R_B+\Delta t)$ and receives the sound signal from the first electronic device 10 while the recording operation is performed.

The first electronic device 10 transfers information on the time difference ($\Delta t1=T_{S1}-T_B$) between the time point $T_B$ and the time point $T_{S1}$ to the second electronic device 20 in S1430.

The second electronic device 20 calculates a distance D between the first electronic device 10 and the second electronic device 20 based on the time difference between the reception time point ($R_B$) of the wireless signal and the reception time point ($R_{S1}$) of the sound signal and the information on the time difference ($\Delta t=T_{S1}-T_B$) between the time point $T_B$ and the time point $T_S$ received from the first electronic device 10 in S1440. The distance D between the first electronic device 10 and the second electronic device 20 is calculated as equation (2) below. The application 26 of the second electronic device 20 derives the reception time point ($R_{S1}$) of the sound signal by using a result of the recording through the microphone. That is, the application 26 may derive the reception time point ($R_{S1}$) of the sound signal since the time point $R_B$ when the wireless signal is received from the first electronic device 10, the time point ($R_B+\Delta t$) when the recording is started through the microphone, and the time during which the recording is performed from the time point ($R_B+\Delta t$) are known.

$$D=V_S*(R_{S1}-R_B-\Delta t1) \quad \text{equation (2)}$$

Here, $V_S$ denotes a transmission speed (340 m/s) of the sound signal, $R_{S1}$ denotes a time point when the second electronic device 20 receives the sound signal, $R_B$ denotes a time point when the second electronic device 20 receives the wireless signal, and $\Delta t1$ denotes a time difference between the time point ($T_B$) when the first electronic device 10 transmits the wireless signal and the time point ($T_{S1}$) when the first electronic device 10 transmits the sound signal.

According to another embodiment, when the first electronic device 10 simultaneously transmits the wireless signal and the sound signal, the first electronic device 10 does not need to transfer information on the time difference ($\Delta t1=T_{S1}-T_B$) between the time point $T_B$ and the time point $T_{S1}$ to the second electronic device 20. In this case, the second electronic device 20 may measure the distance D between the first electronic device 10 and the second electronic device 20 by applying $\Delta t1=0$ to equation (2).

Further, the driver 14 of the first electronic device 10 generates the sound signal through the speaker connected to the chip 16 by activating the speaker at a time point $T_{Sn}$ after the $T_B$ time point in S1429.

The second electronic device 20 receives the sound signal from the first electronic device 10 through the microphone at a time point $R_{Sn}$. The microphone of the second electronic device 20 performs recording for a predetermined time from a time point when the microphone is turned on, and receives the sound signal from the first electronic device 10 while the recording operation is performed.

The first electronic device 10 transfers information on the time difference $\Delta tn=T_{Sn}-T_B$) between the time point $T_B$ and the time point $T_{Sn}$ to the second electronic device 20 in S1439.

The second electronic device 20 calculates the distance D between the first electronic device 10 and the second electronic device 20 based on the time difference between the time point when the microphone is turned on and the reception time point ($R_{Sn}$) of the sound signal and the information on the time difference ($\Delta tn=T_{Sn}-T_B$) between the time point $T_B$ and the time point $T_{Sn}$ received from the first electronic device 10 in S1449. The distance D between the first electronic device 10 and the second electronic device 20 is calculated as shown in equation (3) below. The application 26 of the second electronic device 20 derives the reception time point ($R_{Sn}$) of the sound signal by using a result of the recording through the microphone. That is, the application 26 may derive the reception time point ($R_{Sn}$) of the sound signal because the microphone turned on time point when the recording is started through the microphone and the time during which the recording is performed from the microphone turned on time point are known.

$$D=V_S*(R_{Sn}-R_B-\Delta tn) \quad \text{equation (3)}$$

Here, $V_S$ denotes a transmission speed (340 m/s) of the sound signal, $R_S$ denotes a time point when the second electronic device 20 receives the sound signal, $R_B$ denotes a time point when the second electronic device 20 receives the wireless signal, and $\Delta tn$ denotes a time difference between the time point ($T_B$) when the first electronic device 10 transmits the wireless signal and the time point ($T_{Sn}$) when the first electronic device 10 transmits the sound signal.

According to another embodiment, when the first electronic device 10 simultaneously transmits the wireless signal and the sound signal, the first electronic device 10 does not need to transfer information on the time difference ($\Delta tn=T_{Sn}-T_B$) between the time point $T_B$ and the time point $T_{Sn}$ to the second electronic device 20. In this case, the second electronic device 20 may measure the distance D between the first electronic device 10 and the second electronic device 20 by applying $\Delta tn=0$ to equation (2).

Further, the second electronic device 20 may measure an absolute change amount of the distance D between the first electronic device 10 and the second electronic device 20 by using the distance measurement result in step S1440 and the distance measurement result in step S1449.

Information on the distance D between the first electronic device 10 and the second electronic device 20 and information on the absolute change amount of the distance measured by the second electronic device 20 may be fed back to the first electronic device 10.

Figure 15:
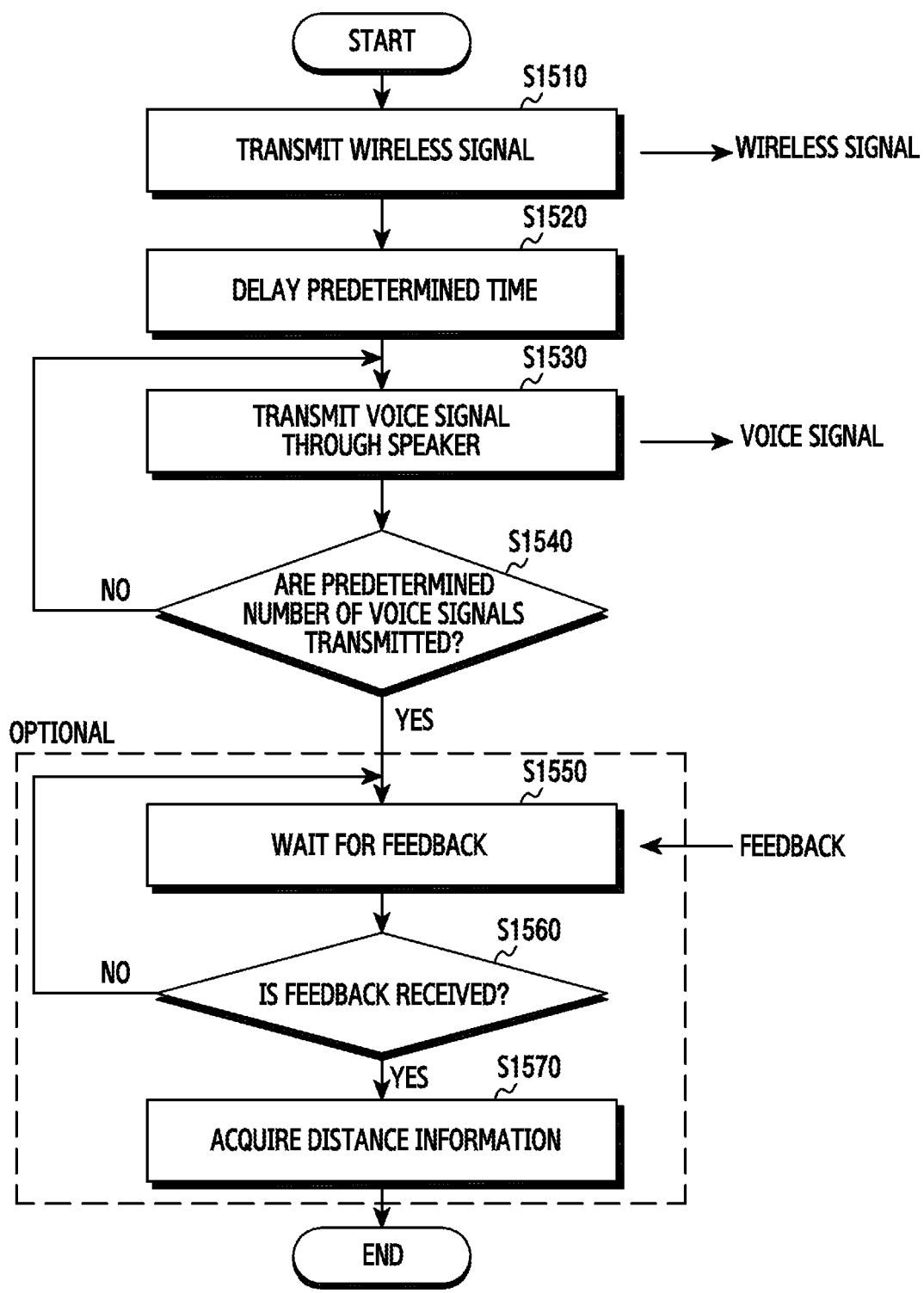
FIG. 15 illustrates a flow of processing for wireless distance measurement by the first electronic device according to the second embodiment of the present disclosure.

FIG. 15 illustrates a flow of processing for wireless distance measurement by the first electronic device according to the second embodiment of the present disclosure. The processing flow may be performed by the first electronic device 10 illustrated in FIG. 14. Here, the illustrated matters are only for an example for describing the present disclosure and should be not construed to limit the protection range of the present disclosure since modified embodiments can be made.

Referring to FIG. 15, the first electronic device 10 transmits the wireless signal in step S1510, delays a predetermined time in step S1520, and transmits the sound signal through the speaker in step S1530. The transmission of the sound signal through the speaker is performed until it is determined that a predetermined number of sound signals have been transmitted in step S1540.

The first electronic device 10 waits for feedback from the second electronic device 20 in step S1550, and determines whether the feedback is received from the second electronic device 20 in step S1560.

When the feedback is received from the second electronic device 20, the first electronic device 10 acquires information on the distance between the first electronic device 10 and the second electronic device 20 from the received feedback information in step S1570. Further, the first electronic device 10 may acquire information on an absolute distance change amount between the first electronic device 10 and the second electronic device 20 from the received feedback information.

Operations of steps S1550 to S1570 may be selectively performed.

According to another embodiment, the first electronic device 10 may determine whether a preset timer expires in step S1540 and, when the timer expires, proceeds to step S1530. Further, the first electronic device 10 may determine whether a preset timer expires in step S1560 and, when the timer expires, proceeds to step S1550.

Figure 16:
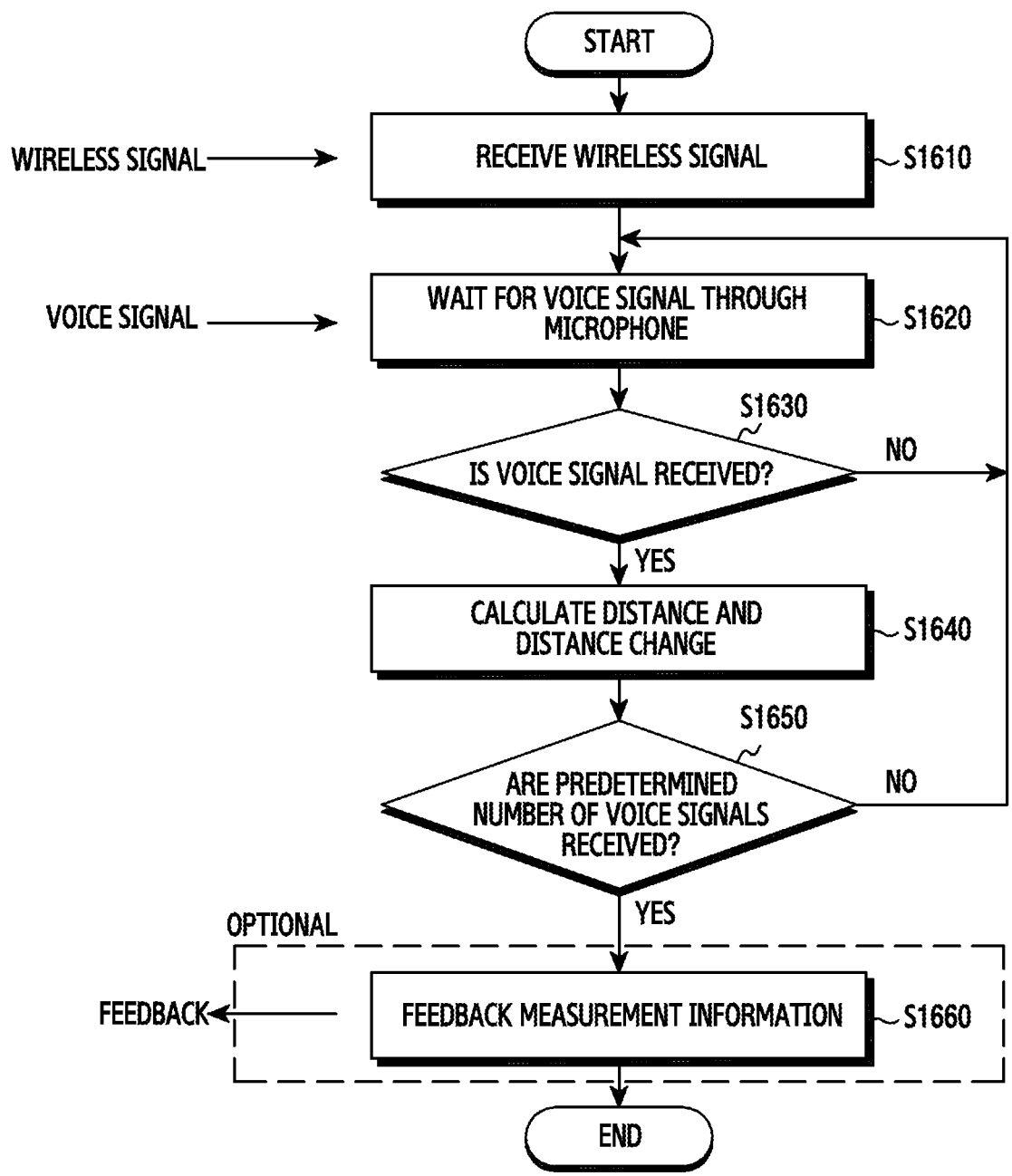
FIG. 16 illustrates a flow of processing for wireless distance measurement by the second electronic device according to the second embodiment of the present disclosure.

FIG. 16 illustrates a flow of processing for wireless distance measurement by the second electronic device according to the second embodiment of the present disclosure. The processing flow may be performed by the second electronic device 20 illustrated in FIG. 14. Here, the illustrated matters are only for an example for describing the present disclosure and should be not construed to limit the protection range of the present disclosure since modified embodiments can be made.

Referring to FIG. 16, in step S1610, the second electronic device 20 receives the wireless signal from the first electronic device 10. In step S1620, the second electronic device 20 waits for receiving the sound signal from the first electronic device 10 through the microphone. In step S1630, the second electronic device 20 determines whether the sound signal is received from the first electronic device 10 through the microphone.

When the sound signal is received through the microphone, the second electronic device 20 calculates the distance between the first electronic device 10 and the second electronic device 20 based on a reception time point of the wireless signal and a reception time point of the sound signal in step S1640. The second electronic device 20 calculates the distance between the first electronic device 10 and the second electronic device 20 according to equations (2) and (3).

The operation of calculating the distance between the first electronic device 10 and the second electronic device 20 may be repeatedly performed until it is determined that a predetermined number of sound signals are received in step S1650. The second electronic device 20 may also calculate an absolute distance change amount between the first electronic device 10 and the second electronic device 20 in response to the repetitive reception of the sound signal through the microphone.

In step S1660, the second electronic device 20 transmits feedback of the distance between the first electronic device 10 and the second electronic device 20 and measurement result information for the absolute distance change amount to the first electronic device 10. The operation of step S1660 may be selectively performed.

According to another embodiment, the second electronic device 20 may determine whether a preset time expires in step S1630 and, when the timer expires, proceed to step S1640. Further, the second electronic device 20 may determine whether a preset time expires in step S1650 and, when the timer expires, proceeds to step S1660.

Figure 17:
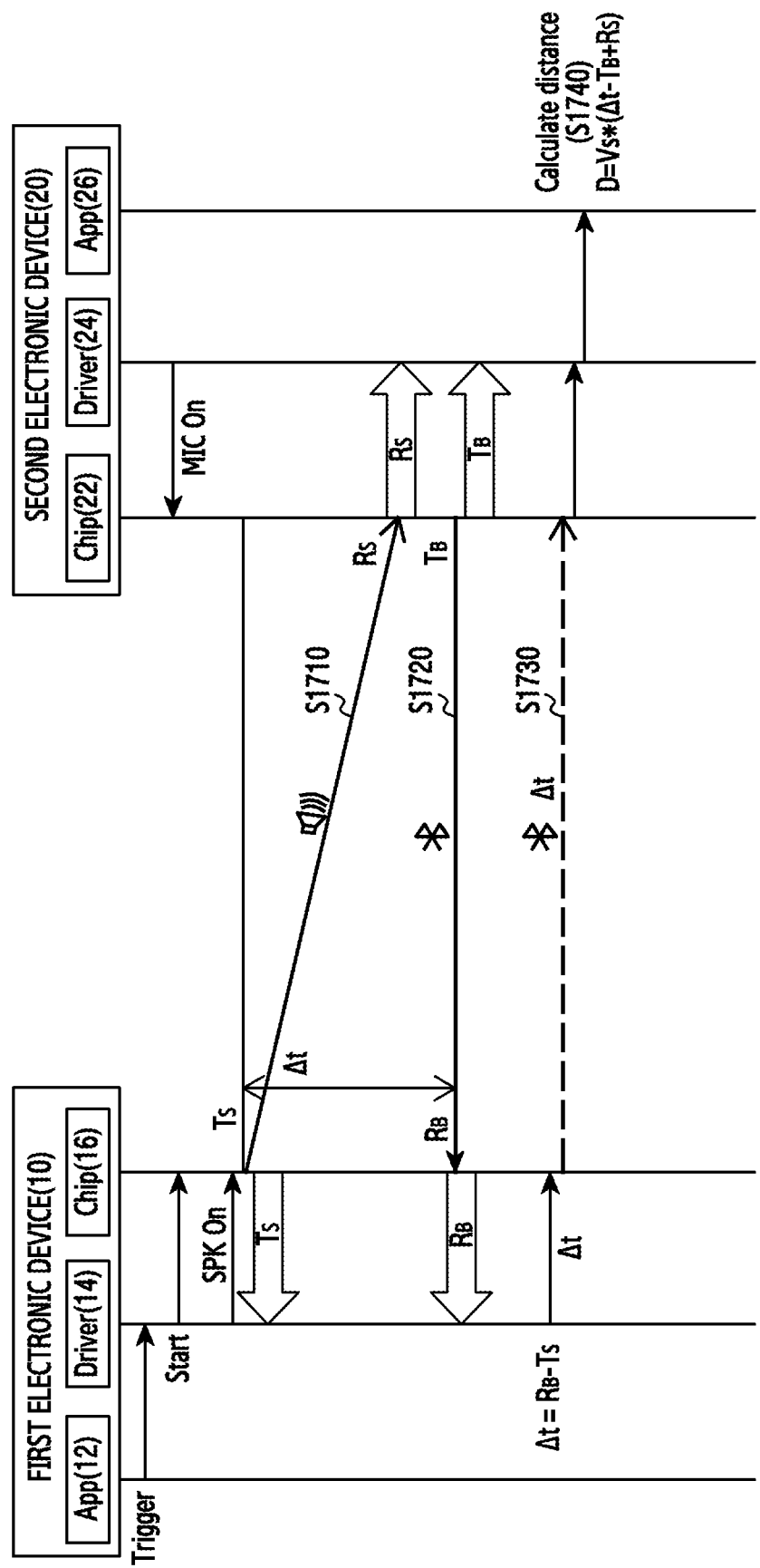
FIG. 17 illustrates a flow of processing of a wireless distance measurement scheme according to a third embodiment of the present disclosure.

FIG. 17 illustrates a flow of processing of a wireless distance measurement scheme according to a third embodiment of the present disclosure. The processing flow corresponds to a processing flow of the wireless distance measurement scheme according to the DualSeq scheme. Here, the illustrated matters are only for an example for describing the present disclosure and should be not construed to limit the protection range of the present disclosure since modified embodiments can be made.

Referring to FIG. 17, the first electronic device 10 includes an application 12, a driver 14, and a chip 16. The second electronic device 20 includes an application 22, a driver 24, and a chip 26. The chips 16 and 26 are elements for generating a wireless signal or a sound signal. For example, the chips 16 and 26 include a module (for example, a BT module 1325 or a communication module 1320 of FIG. 53) for generating a wireless signal such as a Bluetooth Low Energy (BLE) signal. In another example, the chips 16 and 26 include a module (for example, an audio module 1380 of FIG. 53) for generating a sound signal. The applications 12 and 22 are elements for performing a service of the electronic device. The drivers 14 and 24 are elements for controlling driving of the chips 16 and 26. The first electronic device 10 includes a speaker, and the second electronic device 20 includes a microphone.

The application 12 of the first electronic device 10 generates a trigger signal for measuring a distance, and the driver 14 generates a distance measurement start signal in response to the trigger signal. The chip 16 activates a speaker in response to the distance measurement start signal at a time point $T_S$ and generates the sound signal in S1710. According to an embodiment, the negotiation process 100 illustrated in FIGS. 1A and 1B may be performed in response to a trigger signal, and the distance measurement start signal may be executed after the negotiation process 100 is finished.

The second electronic device 20 activates a microphone at a predetermined time point after the negotiations with the first electronic device 10. Then, the microphone connected to the chip 22 starts recording. Thereafter, the second electronic device 20 does not know when the sound signal transmitted from the first electronic device 10 is received, so that the recording through the microphone is performed for a predetermined time from a time point when the microphone is activated. Here, the predetermined time may be set as a proper and sufficient time after a time point when it is expected to receive the sound signal. For example, the predetermined time may be determined in consideration of a time point when the first electronic device 10 generates the distance measurement start signal, a time point $T_S$ when the speaker is activated and the sound signal is transmitted in response to the distance measurement start signal, and a time when the sound signal transmitted from the first electronic device 10 reaches the second electronic device 20. The second electronic device 20 receives the sound signal from the first electronic device 10 at a time point $R_S$ while the recording through the microphone of the second electronic device 20 is performed.

The second electronic device 20 generates a wireless signal (for example, a Bluetooth Low Energy (BLE) signal) at a time point $T_B$ in response to the reception of the sound signal in S1720.

The first electronic device 10 receives the wireless signal transmitted from the second electronic device 20 at a time point $R_B$ in S1720.

The first electronic device 10 transfers information on a time difference ($\Delta t = R_B - T_S$) between the time point $R_B$ and the time point $T_S$ to the second electronic device 20 in S1730.

The second electronic device 20 calculates a distance D between the first electronic device 10 and the second electronic device 20 based on the time difference between the reception time point ($R_S$) of the sound signal and the transmission time point ($T_B$) of the sound signal and the information on the time difference ($\Delta t = R_B - T_S$) between the time point $R_B$ and the time point $T_S$ received from the first electronic device 10 in S1740. The distance D between the first electronic device 10 and the second electronic device 20 is calculated as equation (4) below. The application 26 of the second electronic device 20 drives the reception time point ($R_S$) of the sound signal by using a result of the recording through the microphone. That is, the application 26 may derive the reception time point ($R_S$) of the sound signal because a time point when the microphone is activated and recording starts and a time during which the recording is performed from the time point when the recording starts are known.

$$D = V_S * (\Delta t - T_B + R_S) \qquad \text{equation (4)}$$

Here, $V_S$ denotes a transmission speed (340 m/s) of the sound signal, $R_S$ denotes a time point when the second electronic device 20 receives the sound signal, $T_B$ denotes a time point when the second electronic device 20 transmits the wireless signal, and Δt denotes a time difference between the time point ($R_B$) when the first electronic device 10 receives the wireless signal and the time point ($T_S$) when the first electronic device 10 transmits the sound signal.

As described above, the information on the distance D between the first electronic device 10 and the second electronic device 20 measured by the second electronic device 10 may be fed back to the first electronic device 20.

According to another embodiment, on behalf of the second electronic device 20, the first electronic device 10 may calculate the distance D between the first electronic device 10 and the second electronic device 20. In this case, the first electronic device 10 calculates the distance D by receiving information on the time difference between the time point ($R_S$) when the sound signal is received from the second electronic device 20 and the time point ($T_B$) when the wireless signal is transmitted. Processing flows illustrated in FIGS. 18 and 19 correspond to an embodiment in which the first electronic device 10 calculates the distance D between the first electronic device 10 and the second electronic device 20.

Figure 18:
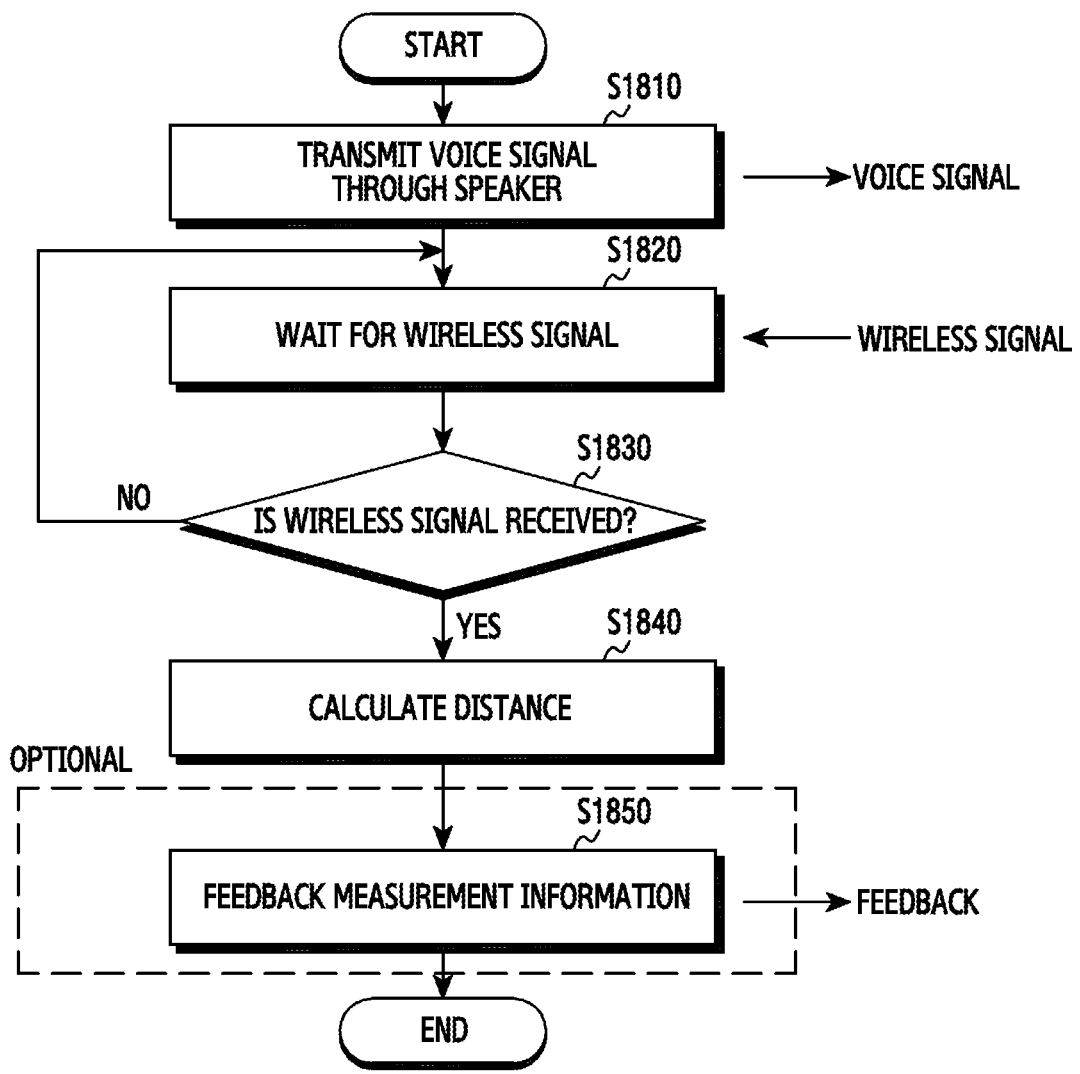
FIG. 18 illustrates a flow of processing for wireless distance measurement by the first electronic device according to the third embodiment of the present disclosure.

FIG. 18 illustrates a flow of processing for wireless distance measurement by the first electronic device according to the third embodiment of the present disclosure. The processing flow may be performed by the first electronic device 10 illustrated in FIG. 17. However, it will be described that a distance calculation operation is performed by the first electronic device 10. Here, the illustrated matters are only for an example for describing the present disclosure and should be not construed to limit the protection range of the present disclosure since modified embodiments can be made.

Referring to FIG. 18, in step S1810, the first electronic device 10 transmits the sound signal through the speaker.

The first electronic device 10 waits for receiving the wireless signal in step S1820, and determines whether the wireless signal is received in step S1830.

When it is determined that the wireless signal is received, the first electronic device 10 calculates the distance D between the first electronic device 10 and the second electronic device 20 in step S1840. The first electronic device 10 calculates the distance D between the first electronic device 10 and the second electronic device 20 based on a time difference between the time point ($R_S$) when the sound signal transmitted from the second electronic device 20 is received and a time point ($T_B$) when the wireless signal is transmitted and information on a time difference ($\Delta t = R_B - T_S$) between the reception time point ($R_B$) of the wireless signal and the transmission time point ($T_S$) of the sound signal.

In step S1850, the first electronic device 10 feeds back measurement result information of the distance between the first electronic device 10 and the second electronic device 20 to the second electronic device 20. The operation of step S1850 may be selectively performed.

According to another embodiment, the first electronic device 20 may determine whether a preset timer expires in step S1830 and, when the timer expires, proceed to step S1840.

Figure 19:
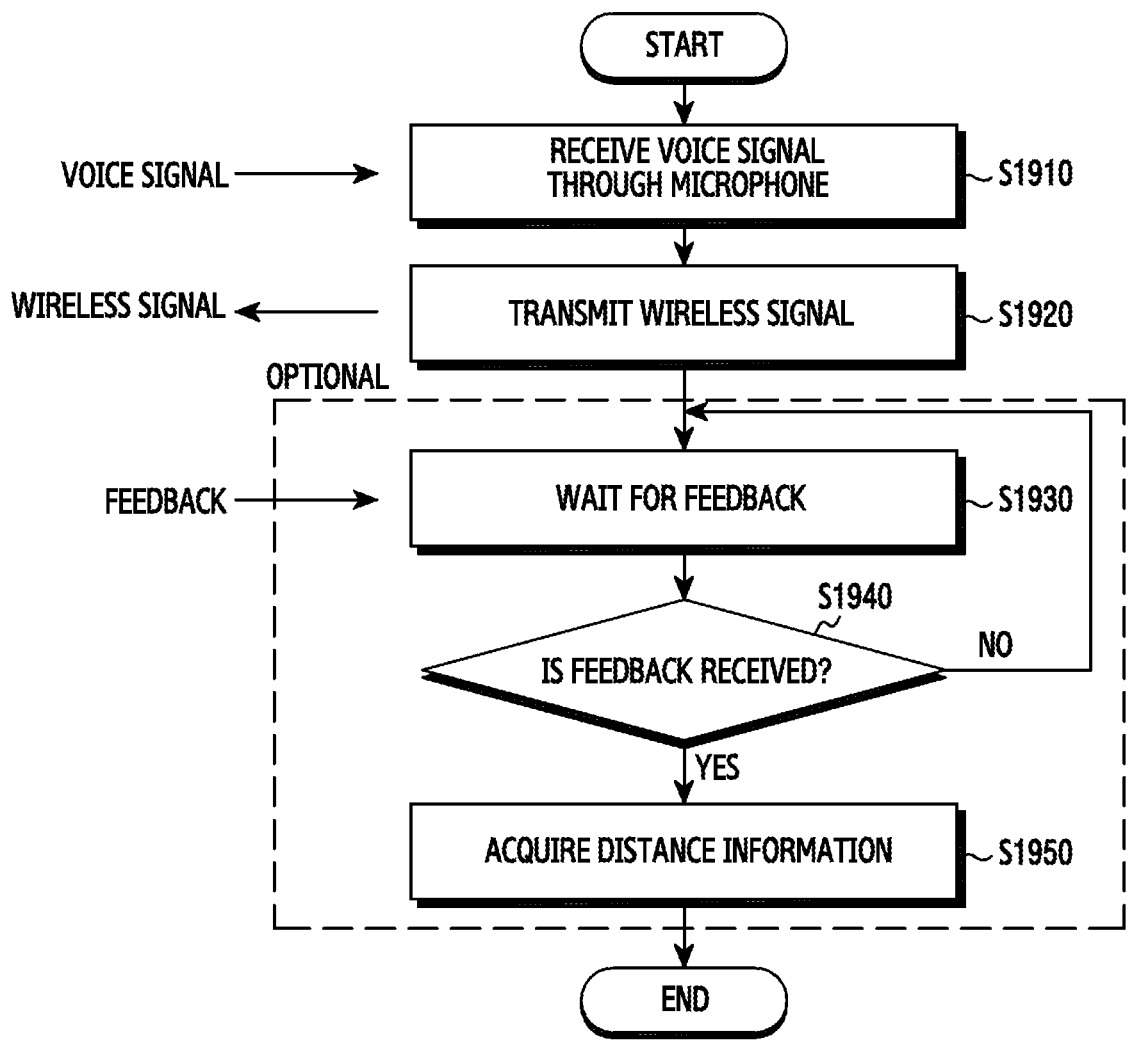
FIG. 19 illustrates a flow of processing for wireless distance measurement by the second electronic device according to the third embodiment of the present disclosure.

FIG. 19 illustrates a flow of processing for wireless distance measurement by the second electronic device according to the third embodiment of the present disclosure. The processing flow may be performed by the second electronic device 20 illustrated in FIG. 17. However, it will be described that a distance calculation operation is performed by the first electronic device 10. Here, the illustrated matters are only for an example for describing the present disclosure and should be not construed to limit the protection range of the present disclosure since modified embodiments can be made.

Referring to FIG. 19, in step S1910, the second electronic device 20 receives the sound signal from the first electronic device 10 through the microphone in step S1910.

When the sound signal is received through the microphone, the second electronic device 20 transmits the wireless signal in step S1920.

The second electronic device 20 waits for feedback from the first electronic device 10 in step S1930, and determines whether the feedback is received from the first electronic device 10 in step S1940.

When the feedback is received from the first electronic device 10, the second electronic device 20 acquires information on the distance between the first electronic device 10 and the second electronic device 20 from the received feedback information in step S1950.

The operations of steps 1930 to S1950 may be selectively performed.

According to another embodiment, the second electronic device 20 may determine whether a preset timer expires in step S1940 and, when the timer expires, proceed to step S1950.

Figure 20:
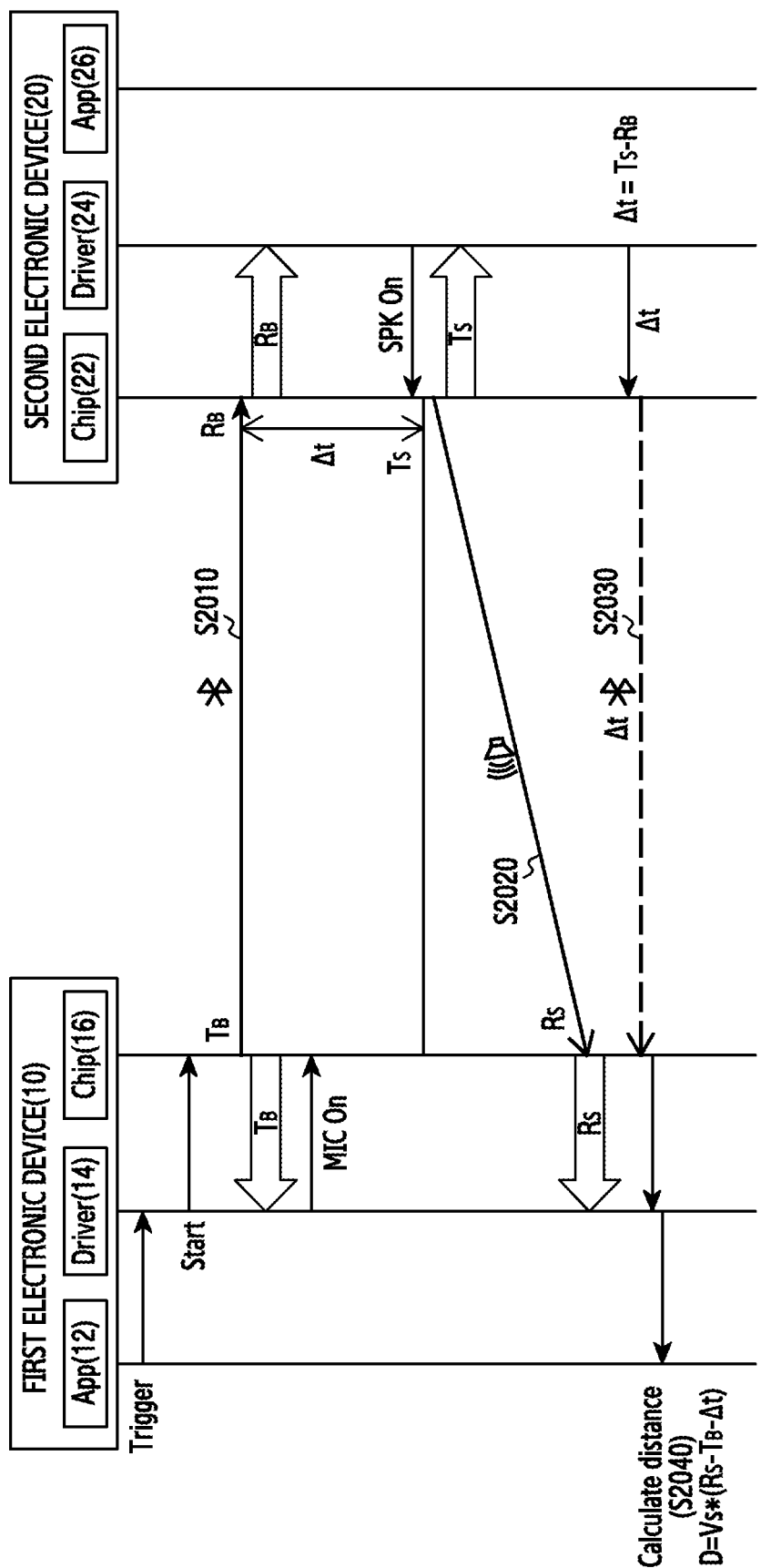
FIG. 20 illustrates a flow of processing of a wireless distance measurement scheme according to a fourth embodiment of the present disclosure.

FIG. 20 illustrates a flow of processing of a wireless distance measurement scheme according to a fourth embodiment of the present disclosure. The processing flow corresponds to a processing flow of the wireless distance measurement scheme according to the DualSeq ES scheme. Here, the illustrated matters are only for an example for describing the present disclosure and should be not construed to limit the protection range of the present disclosure since modified embodiments can be made.

Referring to FIG. 20, the first electronic device 10 includes an application 12, a driver 14, and a chip 16. The second electronic device 20 includes an application 22, a driver 24, and a chip 26. The chips 16 and 26 are elements for generating a wireless signal or a sound signal. For example, the chips 16 and 26 include a module (for example, a BT module 1325 or a communication module 1320 of FIG. 53) for generating a wireless signal such as a Bluetooth Low Energy (BLE) signal. In another example, the chips 16 and 26 include a module (for example, an audio module 1380 of FIG. 53) for generating a sound signal. The applications 12 and 22 are elements for performing a service of the electronic device. The drivers 14 and 24 are elements for controlling driving of the chips 16 and 26. The first electronic device 10 has a microphone, and the second electronic device 20 has a speaker.

The application 12 of the first electronic device 10 generates a trigger signal for measuring a distance, and the driver 14 generates a distance measurement start signal in response to the trigger signal. The chip 16 generates a wireless signal (for example, Bluetooth Low Energy (BLE) signal) in response to the distance measurement start signal at a time point $T_B$ in step S2010. The first electronic device 10 activates the microphone after a predetermined time (for example, Δt) from the time point $T_B$. Then, the microphone connected to the chip 16 starts recording. Thereafter, the first electronic device 10 does not know when the sound signal transmitted from the second electronic device 20 is received, so that recording through the microphone is performed for a predetermined time from a time point ($T_B + \Delta t$). Here, the predetermined time may be set as a proper and sufficient time after a time point when it is expected to receive the sound signal. For example, the predetermined time may be determined in consideration of a time difference ($\Delta t = T_S - R_B$) between the time point $R_B$ and the time point $T_S$ in the first electronic device 10 and a time when the sound signal transmitted from the second electronic device 20 reaches the first electronic device 10. According to an embodiment, the negotiation process 100 illustrated in FIGS. 1A and 1B may be performed in response to a trigger signal, and the distance measurement start signal may be executed after the negotiation process 100 is finished.

The second electronic device 20 receives the wireless signal from the first electronic device 10 at the time point $R_B$.

When the wireless signal is received, the second electronic device 10 activates the speaker at the time point $T_S$ after the time point $R_B$ and generates the sound signal in S2020.

The first electronic device 10 receives the sound signal from the second electronic device 20 through the microphone at the time point $R_S$. The microphone of the first electronic device 10 performs recording for a predetermined time from the time point ($T_B + \Delta t$) and receives the sound signal from the first electronic device 10 while the recording operation is performed.

The second electronic device 20 transfers information on the time difference ($\Delta t = T_S - R_B$) between the time point $R_B$ and the time point $T_S$ to the first electronic device 10 in S2030.

The first electronic device 10 calculates a distance D between the first electronic device 20 and the second electronic device 20 based on the time difference between the transmission time point ($T_B$) of the wireless signal and the reception time point ($R_S$) of the wireless signal and the information on the time difference ($\Delta t = T_S - R_B$) between the time point $R_B$ and the time point $T_S$ received from the second electronic device 20 in S2040. The distance D between the first electronic device 10 and the second electronic device 20 is calculated as shown in equation (5) below. The application 12 of the first electronic device 10 derives the reception time point ($R_S$) of the sound signal by using a result of the recording through the microphone. That is, the application 12 may derive the reception time point ($R_S$) of the sound signal because the time point $T_B$ when the wireless signal is transmitted to the second electronic device 20, the time point ($T_B + \Delta t$) when the recording starts through the microphone, and the time during which the recording is performed from the time point ($T_B + \Delta t$) are known.

$$D = V_S * (R_S - T_B - \Delta t) \quad \text{equation (5)}$$

Here, $V_S$ denotes a transmission speed (340 m/s) of the sound signal, $R_S$ denotes a time point when the first electronic device 10 receives the sound signal, $T_B$ denotes a time point when the first electronic device 10 transmits the wireless signal, and $\Delta t$ denotes a time difference between the time point ($T_S$) when the second electronic device 20 transmits the sound signal and the time point ($R_B$) when the second electronic device 20 receives the wireless signal.

Information on the distance D between the first electronic device 10 and the second electronic device 20 measured by the first electronic device 10 may be fed back to the second electronic device 20.

According to another embodiment, on behalf of the first electronic device 10, the second electronic device 20 may calculate the distance D between the first electronic device 10 and the second electronic device 20. In this case, the second electronic device 20 calculates the distance D by receiving information on the time difference between the time point ($R_S$) when the sound signal is received from the first electronic device 10 and the time point ($T_B$) when the wireless signal is transmitted.

Figure 21:
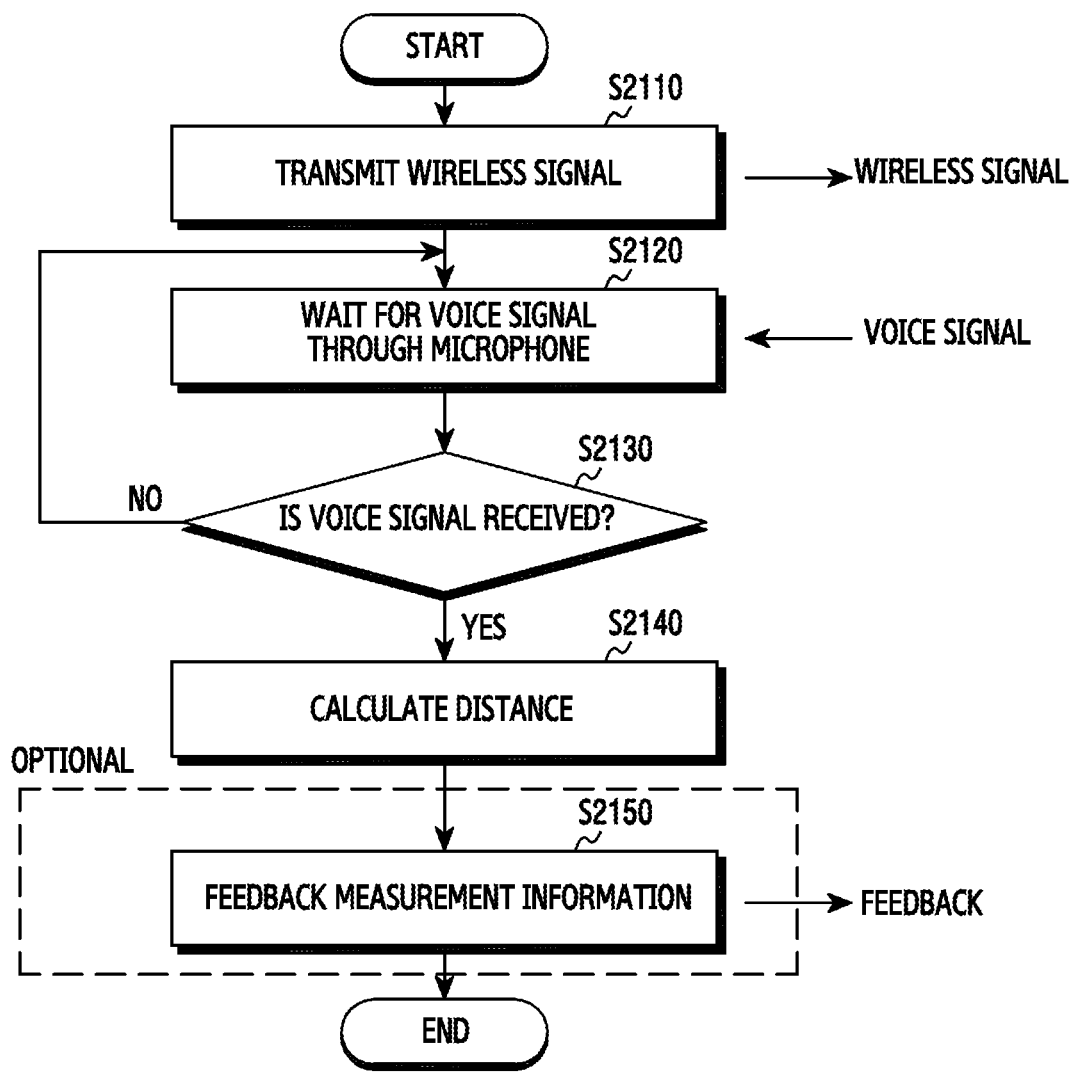
FIG. 21 illustrates a flow of processing for wireless distance measurement by the first electronic device according to the fourth embodiment of the present disclosure.

FIG. 21 illustrates a flow of processing for wireless distance measurement by the first electronic device according to the fourth embodiment of the present disclosure. The processing flow may be performed by the first electronic device 10 illustrated in FIG. 20. Here, the illustrated matters are only for an example for describing the present disclosure and should be not construed to limit the protection range of the present disclosure since modified embodiments can be made.

Referring to FIG. 21, the first electronic device 10 transmits the wireless signal in step S2110.

The first electronic device 10 waits for receiving the sound signal through the microphone in step S2120, and determines whether the wireless signal is received in step S2130.

When it is determined that the sound signal is received, the first electronic device 10 calculates the distance between the first electronic device 10 and the second electronic device 20 in step S2140. The first electronic device 10 calculates the distance D between the first electronic device 20 and the second electronic device 20 based on the time difference between the transmission time point ($T_B$) of the wireless signal and the reception time point ($R_S$) of the wireless signal and the information on the time difference ($\Delta t = T_S - R_B$) between the time point $R_B$ and the time point $T_S$ received from the second electronic device 20.

In step S2150, the first electronic device 10 feeds back measurement result information of the distance between the first electronic device 10 and the second electronic device 20 to the second electronic device 20. The operation of step S2150 may be selectively performed.

According to another embodiment, the first electronic device 20 may determine whether a preset timer expires in step S2130 and, when the timer expires, proceed to step S2140.

Figure 22:
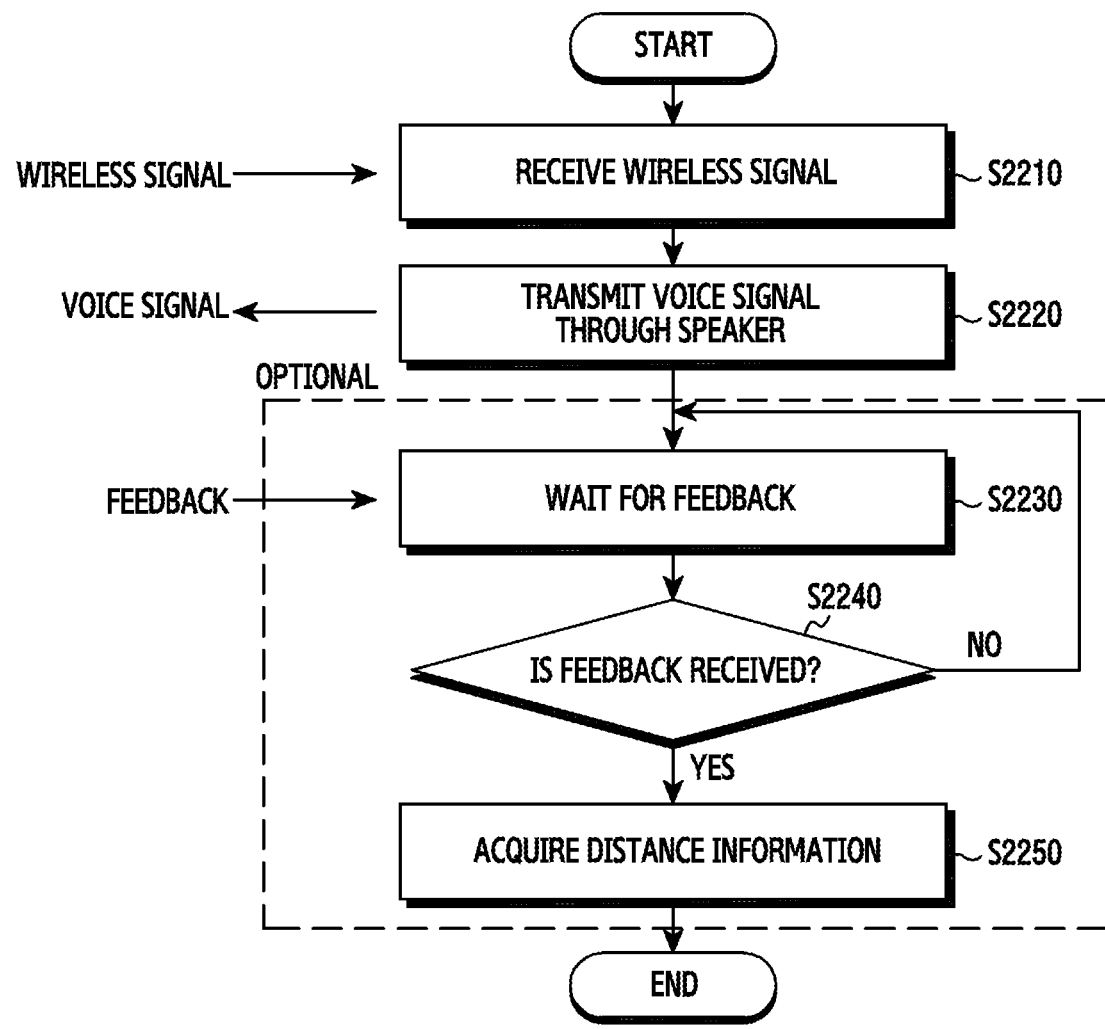
FIG. 22 illustrates a flow of processing for wireless distance measurement by the second electronic device according to the fourth embodiment of the present disclosure.

FIG. 22 illustrates a flow of processing for wireless distance measurement by the second electronic device according to the fourth embodiment of the present disclosure. The processing flow may be performed by the second electronic device 20 illustrated in FIG. 20. Here, the illustrated matters are only for an example for describing the present disclosure and should be not construed to limit the protection range of the present disclosure since modified embodiments can be made.

Referring to FIG. 22, the second electronic device 20 receives the wireless signal from the first electronic device 10 in step S2210.

When the wireless signal is received, the second electronic device 20 transmits the sound signal through the speaker in step S2220.

The second electronic device 20 waits for feedback from the first electronic device 10 in step S2230, and determines whether the feedback is received from the first electronic device 10 in step S2240.

When the feedback is received from the first electronic device 10, the second electronic device 20 acquires information on the distance between the first electronic device 10 and the second electronic device 20 from the received feedback information in step S2250.

The operation of steps S2230 to S2250 may be selectively performed.

According to another embodiment, the second electronic device 20 may determine whether a preset timer expires in step S2240 and, when the timer expires, proceed to step S2250.

Figure 23:
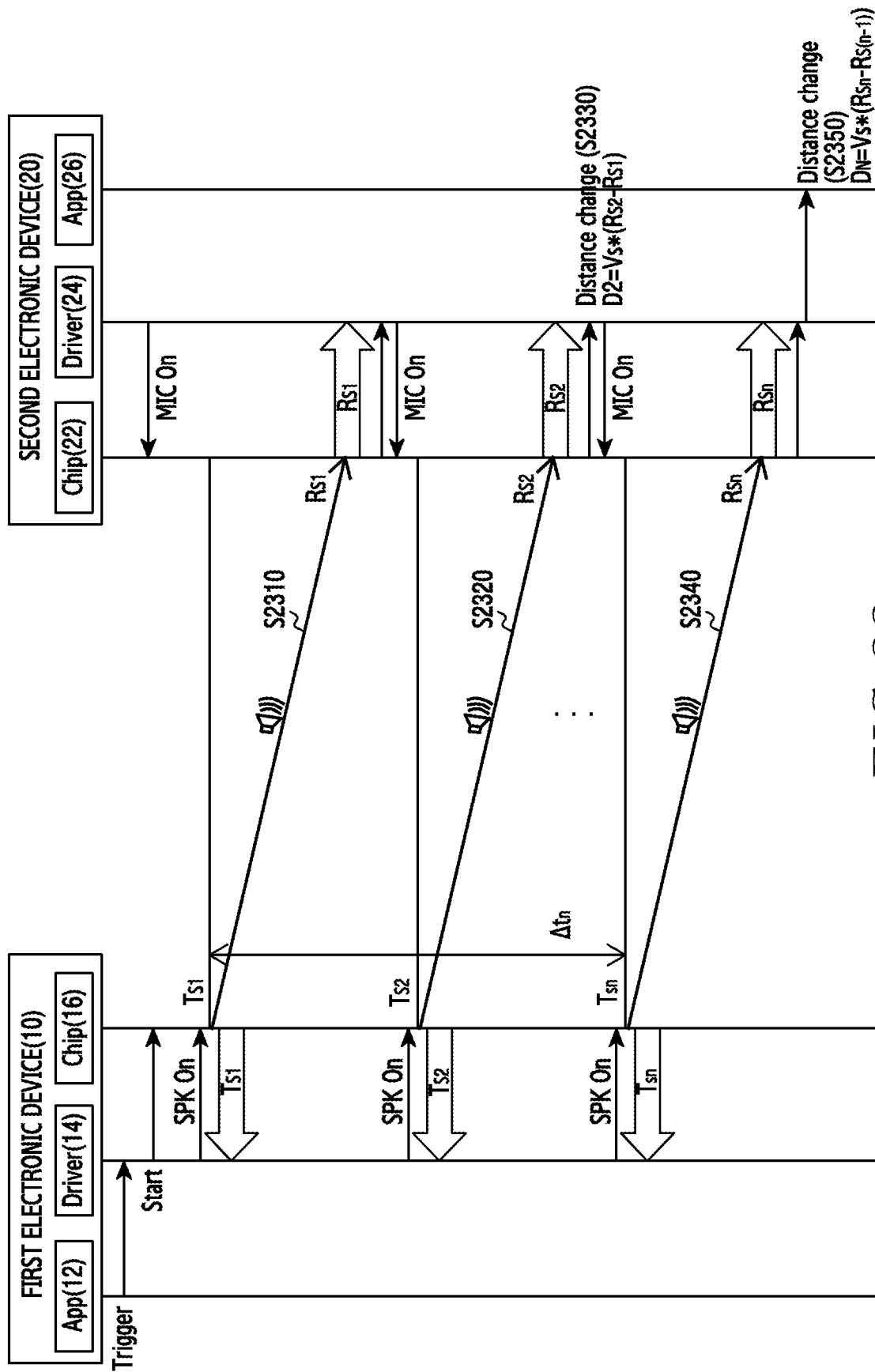
FIG. 23 illustrates a flow of processing of a wireless distance measurement scheme according to a fifth embodiment of the present disclosure.

FIG. 23 illustrates a flow of processing of a wireless distance measurement scheme according to a fifth embodiment of the present disclosure. The processing flow corresponds to a processing flow of the wireless distance measurement scheme according to the ASyncSound scheme. Here, the illustrated matters are only for an example for describing the present disclosure and should be not construed to limit the protection range of the present disclosure since modified embodiments can be made.

Referring to FIG. 23, the first electronic device 10 includes an application 12, a driver 14, and a chip 16. The second electronic device 20 includes an application 22, a driver 24, and a chip 26. The chips 16 and 26 are elements for generating a wireless signal or a sound signal. For example, the chips 16 and 26 include a module (for example, a BT module 1325 or a communication module 1320 of FIG. 53) for generating a wireless signal such as a Bluetooth Low Energy (BLE) signal. In another example, the chips 16 and 26 include a module (for example, an audio module 1380 of FIG. 53) for generating a sound signal. The applications 12 and 22 are elements for performing a service of the electronic device. The drivers 14 and 24 are elements for controlling driving of the chips 16 and 26. The first electronic device 10 includes a speaker, and the second electronic device 20 includes a microphone.

The application 12 of the first electronic device 10 generates a trigger signal for measuring a distance, and the driver 14 generates a distance measurement start signal in response to the trigger signal. The chip 16 periodically generates the sound signal in response to the distance measurement start signal. According to an embodiment, the negotiation process 100 illustrated in FIGS. 1A and 1B may be performed in response to a trigger signal, and the distance measurement start signal may be executed after the negotiation process 100 is finished.

The first electronic device 10 generates the sound signal by activating the speaker at a time point $T_{S1}$ in S2310, generates the sound by activating the speaker at a time point $T_{S2}$ in S2320, and generates the sound signal by activating the speaker at a time point $T_{Sn}$ in S2340.

The second electronic device 20 activates a microphone at a predetermined time point after the negotiations with the first electronic device 10. Then, the microphone connected to the chip 22 starts recording. The second electronic device 20 receives the sound signal from the first electronic device 10 through the microphone at a time point $R_{S1}$ in S2310. The microphone of the second electronic device 20 performs recording for a predetermined time from a time point when the microphone is activated and receives the sound signal from the first electronic device 10 while the recording operation is performed.

Next, the second electronic device 20 activates the microphone and receives the sound signal from the first electronic device 10 through the microphone at a time point $R_{S2}$ in S2320. The microphone of the second electronic device 20 performs recording for a predetermined time from a time point when the microphone is activated and receives the sound signal from the first electronic device 10 while the recording operation is performed.

The second electronic device 20 calculates a change amount of relative distance D2 between the first electronic device 10 and the second electronic device 20 based on information on the time point $R_{S1}$ when the sound signal is first received and the time point $R_{S2}$ when the sound signal is second received in S2330. The change amount of the relative distance D2 between the first electronic device 10 and the second electronic device 20 is calculated as equation (6) below. The application 26 of the second electronic device 20 derives the reception time point ($R_{S1}$) and the reception time point ($R_{S2}$) of the sound signal by using a result of the recording through the microphone. That is, the application 26 may derive the reception time point ($R_{S1}$) and the reception time point ($R_{S2}$) of the sound signal because the microphone turned on time point when the recording is started through the microphone and the time during which the recording is performed from the microphone turned on time point are known.

$$D2 = V_S * (R_{S2} - R_{S1}) \qquad \text{equation (6)}$$

Here, $V_S$ denotes a transmission speed (340 m/s) of the sound signal, and $R_{S1}$ and $R_{S2}$ denote time points when the second electronic device 20 receives the sound signal.

Next, the second electronic device 20 activates the microphone and receives the sound signal from the first electronic device 10 through the microphone at a time point $R_{Sn}$ in S2340. The microphone of the second electronic device 20 performs recording for a predetermined time from a time point when the microphone is activated and receives the sound signal from the first electronic device 10 while the recording operation is performed.

The second electronic device 20 calculates a change amount of a relative distance Dn between the first electronic device 10 and the second electronic device 20 based on information on the time point $R_{S(n-1)}$ when the $(n-1)^{th}$ sound signal is received and the time point $R_{Sn}$ when the $n^{th}$ sound signal is received in S2350. The change amount of the relative distance Dn between the first electronic device 10 and the second electronic device 20 is as shown in equation (7) below. The application 26 of the second electronic device 20 derives the reception time point ($R_{S(n-1)}$) and the reception time point ($R_{Sn}$) of the sound signal by using a result of the recording through the microphone. That is, the application 26 may derive the reception time point ($R_{S(n-1)}$) and the reception time point ($R_{Sn}$) of the sound signal because the microphone turned on time point when the recording is started through the microphone and the time during which the recording is performed from the microphone turned on time point are known.

$$Dn = V_S * (R_{Sn} - R_{S(n-1)}) \qquad \text{equation (7)}$$

Here, $V_S$ denotes a transmission speed (340 m/s) of the sound signal, and $R_{S(n-1)}$ and $R_{Sn}$ denote time points when the second electronic device 20 receives the sound signal.

Information on a change amount of a relative distance D between the first electronic device 10 and the second electronic device 20 measured by the second electronic device 20 may fed back to the first electronic device 10.

Figure 24:
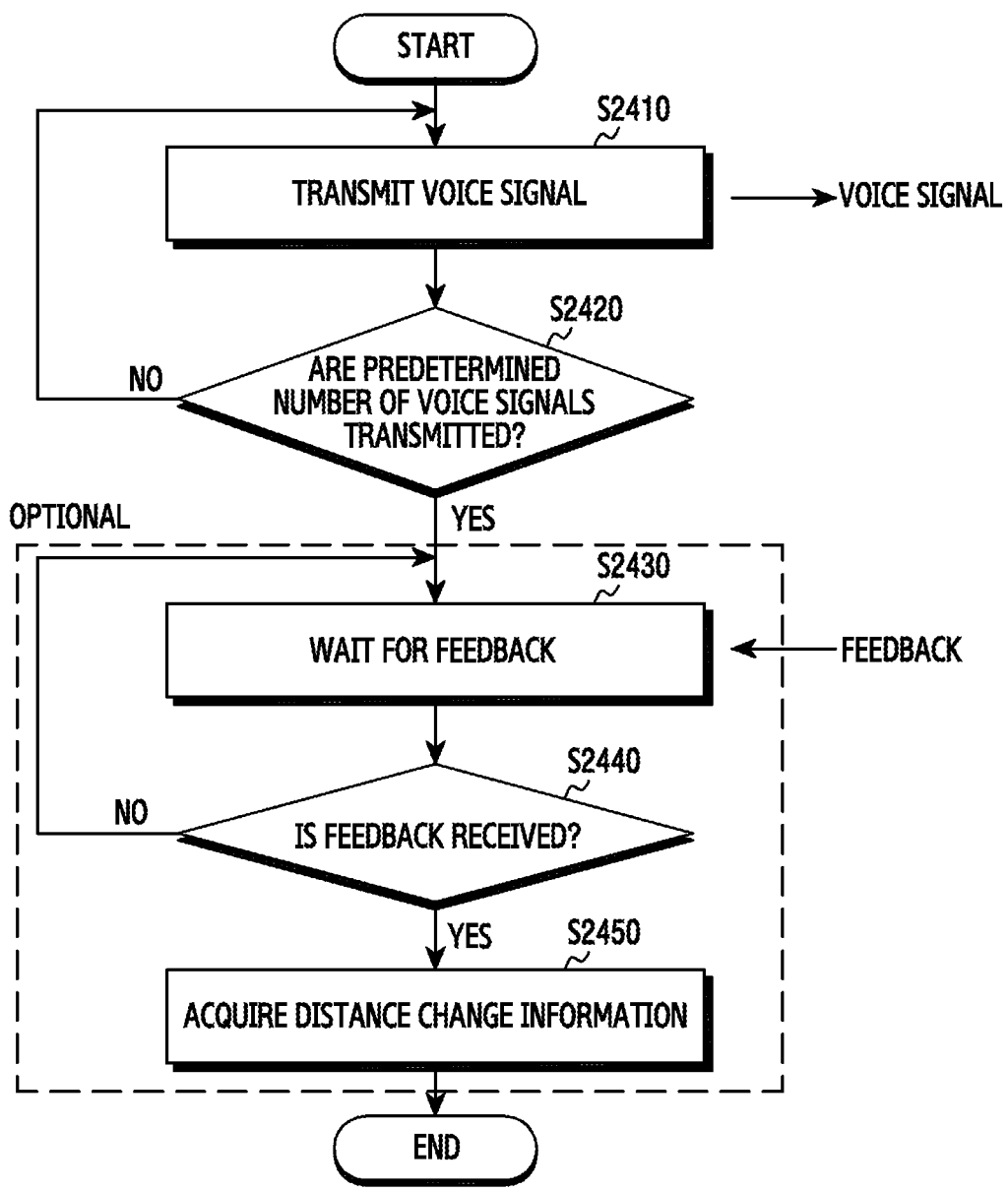
FIG. 24 illustrates a flow of processing for wireless distance measurement by the first electronic device according to the fifth embodiment of the present disclosure.

FIG. 24 illustrates a flow of processing for wireless distance measurement by the first electronic device according to the fifth embodiment of the present disclosure. The processing flow may be performed by the first electronic device 10 illustrated in FIG. 23. Here, the illustrated matters are only for an example for describing the present disclosure and should be not construed to limit the protection range of the present disclosure since modified embodiments can be made.

Referring to FIG. 24, the first electronic device 10 transmits the sound signal through the speaker in step S2410. The transmission of the sound signal through the speaker is performed until a predetermined number of sound signals are transmitted in step S2420.

The first electronic device 10 waits for feedback from the second electronic device 20 in step S2430 and determines whether the feedback is received from the second electronic device 20 in step S2440.

When the feedback is received from the second electronic device 20, the first electronic device 10 acquires information on the change of the distance between the first electronic device 10 and the second electronic device 20 from the received feedback information in step S2450. The operations of steps S2430 to S2450 may be selectively performed.

According to another embodiment, the first electronic device 10 determines whether a preset timer expires in step S2420 and, when the timer expires, proceeds to step S2430. Further, the first electronic device 10 determines whether a preset timer expires in step S2440 and, when the timer expires, proceeds to step S2450.

Figure 25:
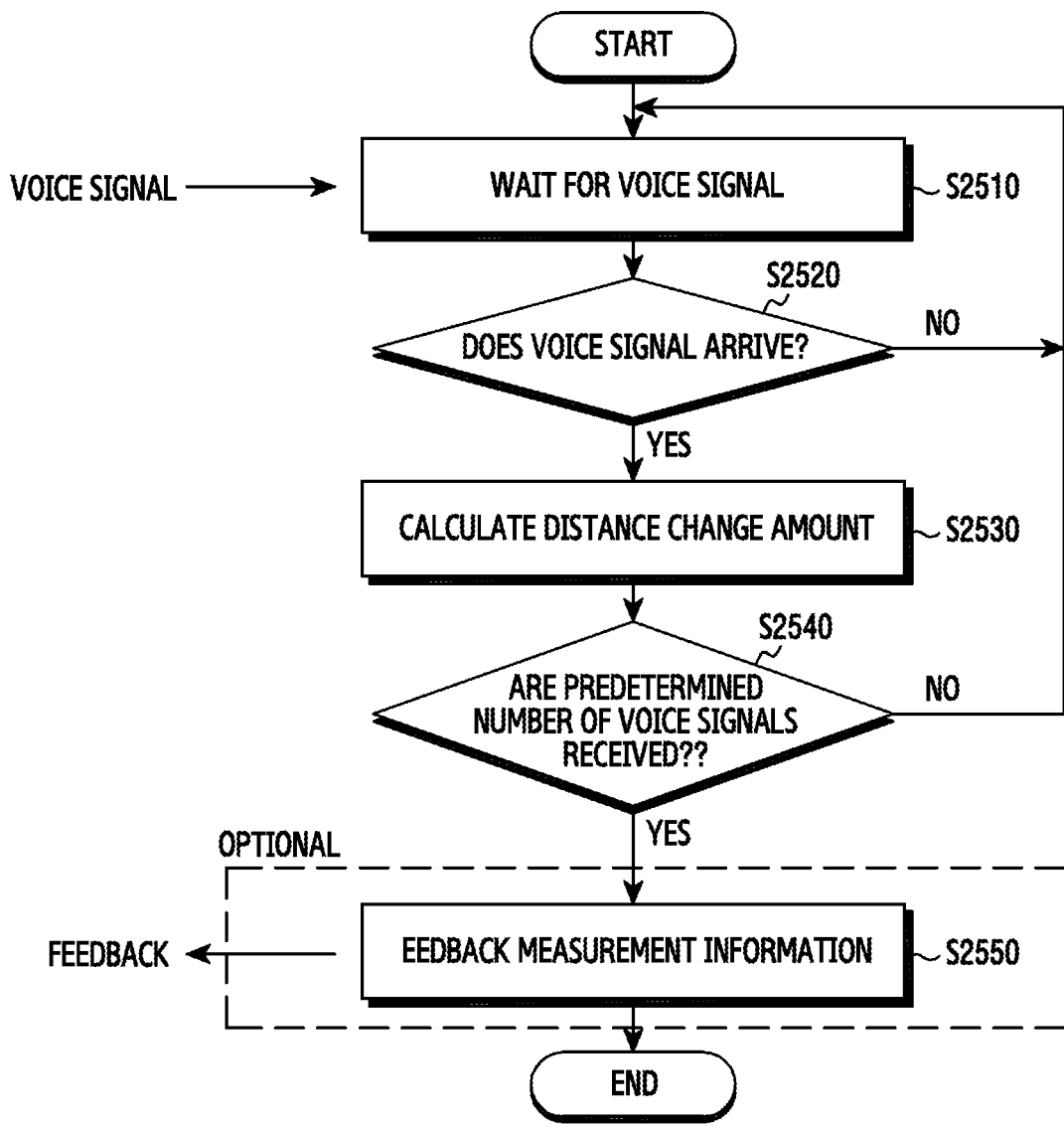
FIG. 25 illustrates a flow of processing for wireless distance measurement by the second electronic device according to the fifth embodiment of the present disclosure.

FIG. 25 illustrates a flow of processing for wireless distance measurement by the second electronic device according to the fifth embodiment of the present disclosure. The processing flow may be performed by the second electronic device 20 illustrated in FIG. 23. Here, the illustrated matters are only for an example for describing the present disclosure and should be not construed to limit the protection range of the present disclosure since modified embodiments can be made.

Referring to FIG. 25, the second electronic device 20 waits for receiving the sound signal from the first electronic device 10 through the microphone in step S2510. In step S2520, the second electronic device 20 determines whether the sound signal is received from the first electronic device 10 through the microphone.

When the sound signal is received through the microphone, the second electronic device 20 calculates a change amount of a relative distance between the first electronic device 10 and the second electronic device 20 based on reception time points of the sound signal in step S2530. The second electronic device 20 calculates the change amount of the relative distance between the first electronic device 10 and the second electronic device 20 according to equation (6) and equation (7) above.

The operation of calculating the change amount of the distance between the first electronic device 10 and the second electronic device 20 may be repeatedly performed until it is determined that a predetermined number of sound signals have been received in step S2540.

In step S2550, the second electronic device 20 transmits feedback of measurement result information of the change amount of the relative distance between the first electronic device 10 and the second electronic device 20 to the first electronic device 10 in step S2550. The operation of step S2550 may be selectively performed.

According to another embodiment, the second electronic device 20 may determine whether a preset timer expires in step S2520 and, when the timer expires, proceed to step S2530. Further, the second electronic device 20 may determine whether a preset timer expires in step S2540 and, when the timer expires, proceed to step S2550.

Figure 26:
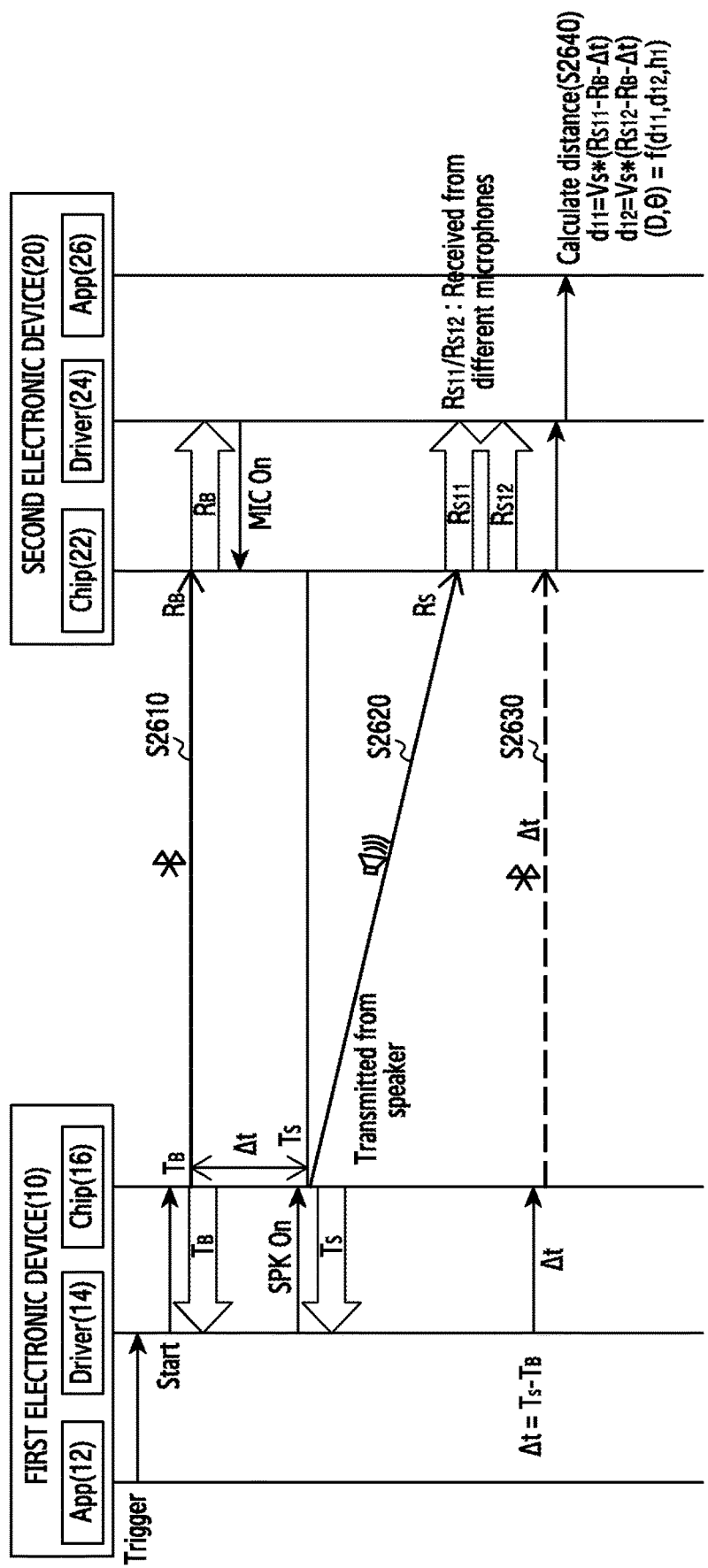
FIG. 26 illustrates a flow of processing of a wireless distance measurement scheme according to a sixth embodiment of the present disclosure.

FIG. 26 illustrates a flow of processing of a wireless distance measurement scheme according to a sixth embodiment of the present disclosure. The processing flow corresponds to a processing flow of the wireless distance measurement scheme according to the DualSync scheme. According to the processing flow, a distance and a direction (or an angle) between the first electronic device 10 and the second electronic device 20 are measured. To this end, as illustrated in FIG. 3B, the first electronic device 10 has a speaker and the second electronic device 20 has a plurality of (for example, two) microphones. Here, the illustrated matters are only for an example for describing the present disclosure and should be not construed to limit the protection range of the present disclosure since modified embodiments can be made.

Referring to FIG. 26, the first electronic device 10 includes an application 12, a driver 14, and a chip 16. The second electronic device 20 includes an application 22, a driver 24, and a chip 26. The chips 16 and 26 are elements for generating a wireless signal or a sound signal. For example, the chips 16 and 26 include a module (for example, a BT module 1325 or a communication module 1320 of FIG. 53) for generating a wireless signal such as a Bluetooth Low Energy (BLE) signal. In another example, the chips 16 and 26 include a module (for example, an audio module 1380 of FIG. 53) for generating a sound signal. The applications 12 and 22 are elements for performing a service of the electronic device. The drivers 14 and 24 are elements for controlling driving of the chips 16 and 26.

The application 12 of the first electronic device 10 generates a trigger signal for measuring a distance, and the driver 14 generates a distance measurement start signal in response to the trigger signal. The chip 16 generates a wireless signal (for example, Bluetooth Low Energy (BLE) signal) in response to the distance measurement start signal at a time point $T_B$ in step S2610. According to an embodiment, the negotiation process 100 illustrated in FIGS. 1A and 1B may be performed in response to a trigger signal, and the distance measurement start signal may be executed after the negotiation process 100 is finished.

The second electronic device 20 receives a wireless signal from the first electronic device 10 at an $R_B$ time point and activates the microphone in response to the wireless signal. The driver 24 of the second electronic device 20 activates the microphone after a predetermined time (for example, $\Delta t$) from the $R_B$ time point. Then, the microphone connected to the chip 22 starts recording. Thereafter, the recording through the microphone is made for a predetermined time from a ($R_B+\Delta t$) time point because the second electronic device 20 does not know when the sound signal transmitted from the first electronic device 10 is received. Here, the predetermined time may be set as a proper and sufficient time after a time point when it is expected to receive the sound signal. For example, the predetermined time may be determined in consideration of a time difference ($\Delta t1=T_S-T_B$) between a time point $T_B$ and a time point $T_S$ and a time during which the sound signal transmitted from the first electronic device 10 reaches the second electronic device 20.

The driver 14 of the first electronic device 10 generates the sound signal through the speaker connected to the chip 16 by activating the speaker at the time point $T_S$ after the time point $T_B$ in S2620. The generated sound signal is transmitted through the speaker.

The second electronic device 20 receives the sound signal from the first electronic device 10 through a plurality of (for example, two) microphones at a time point $R_S$ in S2620. When the number of microphones is two, the first microphone and the second microphone of the second electronic device 20 performs recording for a predetermined time from a time point ($R_B+\Delta t$) and receives sound signal from the first electronic device 10 through each of the first microphone and the second microphone while the recording operation is performed. The first electronic device 10 transfers information on the time difference ($\Delta t=T_S-T_B$) between the time point $T_B$ and the time point $T_S$ to the second electronic device 20 in S2630.

The second electronic device 20 calculates a distance $d_{11}$ between the first electronic device 10 and the first microphone of the second electronic device 20 based on the time difference between the reception time point ($R_B$) of the wireless signal and a reception time point ($R_{S11}$) of the sound signal through the first microphone and the information on the time difference ($\Delta t=T_S-T_B$) between the time point $T_B$ and the time point $T_S$ received from the first electronic device 10 in S2640. The distance $d_{11}$ between the first electronic device 10 and the first microphone of the second electronic device 20 is calculated as equation (8) below. The application 26 of the second electronic device 20 derives the reception time point ($R_{S11}$) of the sound signal through the first microphone by using a result of the recording through the microphone. That is, the application 26 may derive the reception time point ($R_{S11}$) of the sound signal through the first microphone since the time point $R_B$ when the wireless signal is received from the first electronic device 10, the time point ($R_B+\Delta t$) when the recording is started through the microphone, and the time during which the recording is performed from the time point ($R_B+\Delta t$) are known.

$$d_{11}=V_S*(R_{S11}-R_B-\Delta t) \quad \text{equation (8)}$$

Here, $V_S$ denotes a transmission speed (340 m/s) of the sound signal, $R_{S11}$ denotes a time point when the second electronic device 20 receives the sound signal through the first microphone, $R_B$ denotes a time point when the second electronic device 20 receives the wireless signal, and $\Delta t$ denotes a time difference between the time point ($T_B$) when the first electronic device 10 transmits the wireless signal and the time point ($T_S$) when the first electronic device 10 transmits the sound signal.

Further, the second electronic device 20 calculates a distance $d_{12}$ between the first electronic device 10 and the second microphone of the second electronic device 20 based on the time difference between the reception time point ($R_B$) of the wireless signal and a reception time point ($R_{S12}$) of the sound signal through the second microphone and the information on the time difference ($\Delta t=T_S-T_B$) between the time point $T_B$ and the time point $T_S$ received from the first electronic device 10 in S2640. The distance $d_{12}$ between the first electronic device 10 and the second microphone of the second electronic device 20 is calculated as equation (9) below. The application 26 of the second electronic device 20 derives the reception time point ($R_{S12}$) of the sound signal through the second microphone by using a result of the recording through the microphone. That is, the application 26 may derive the reception time point ($R_{S12}$) of the sound signal through the second microphone since the time point $R_B$ when the wireless signal is received from the first electronic device 10, the time point ($R_B+\Delta t$) when the recording is started through the microphone, and the time during which the recording is performed from the time point ($R_B+\Delta t$) are known.

$$d_{12}=V_S*(R_{S2}-R_B-\Delta t) \quad \text{equation (9)}$$

Here, $V_S$ denotes a transmission speed (340 m/s) of the sound signal, $R_{S2}$ denotes a time point when the second electronic device 20 receives the sound signal through the second microphone, $R_B$ denotes a time point when the second electronic device 20 receives the wireless signal, and $\Delta t$ denotes a time difference between the time point ($T_B$) when the first electronic device 10 transmits the wireless signal and the time point ($T_S$) when the first electronic device 10 transmits the sound signal.

Further, the second electronic device 20 calculates a distance D and a direction (angle) θ between the first electronic device 10 and the second electronic device 20 based on the distance $d_{11}$ between the first electronic device 10 and the first microphone of the second electronic device 20, the distance $d_{12}$ between the first electronic device 10 and the second microphone of the second electronic device 20, and a distance $h_1$ between the microphones. The distance D and the direction θ between the first electronic device 10 and the second electronic device 20 is calculated as equation (10) below.

$$(D,\theta)=f(d_{11},d_{12},h_1)$$

$$D=\tfrac{1}{2}*\text{sqrt}(2d_{12}^2+2d_{11}^2-h_1^2)$$

$$\cos(\pi/2-\Theta)=1/(2Dh_1/2)*(D^2+h_1^2/4-d^2)$$

$$d=\min(d_{11},d_{12}) \quad \text{equation (10)}$$

Here, $d_{11}$ denotes the distance measured between the first electronic device 10 and the first microphone of the second electronic device 20, $d_{12}$ denotes the distance measured between the first electronic device 10 and the second microphone of the second electronic device 20, $h_1$ denotes the distance between the first microphone and the second microphone, and θ denotes the angle of the second electronic device 20 with respect to the first electronic device 10.

Information on the distance D and the direction θ between the first electronic device 10 and the second electronic device 20 measured by the second electronic device 20 may be fed back to the first electronic device 10.

Figure 27:
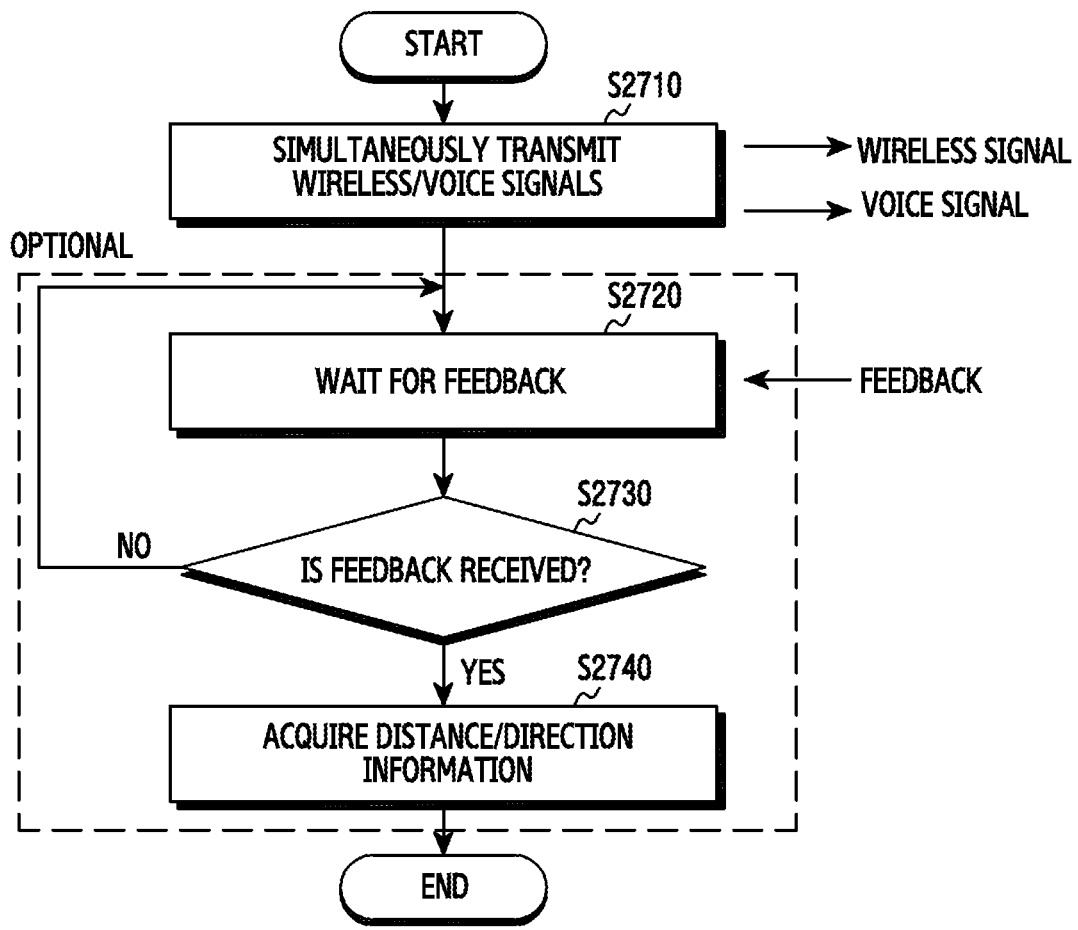
FIG. 27 illustrates a flow of processing for wireless distance measurement by the first electronic device according to the sixth embodiment of the present disclosure.

FIG. 27 illustrates a flow of processing for wireless distance measurement by the first electronic device according to the sixth embodiment of the present disclosure. The processing flow may be performed by the first electronic device 10 illustrated in FIG. 26. Here, the illustrated matters are only for an example for describing the present disclosure and should be not construed to limit the protection range of the present disclosure since modified embodiments can be made.

Referring to FIG. 27, in step S2710, the first electronic device 10 simultaneously transmits the wireless signal and the sound signal. The wireless signal first arrives at the second electronic device 20 and thus an operation of a reception end of the second electronic device is triggered, and then the sound signal arrives at the second electronic device 20.

The first electronic device 10 waits for feedback from the second electronic device 20 in step S2720, and determines whether the feedback is received from the second electronic device in step S2730.

When the feedback is received from the second electronic device 20, the first electronic device 10 acquires information on the distance/direction between the first electronic device 10 and the second electronic device 20 from the received feedback information in step S2740.

The operations of steps S2720 to S2740 may be selectively performed.

According to another embodiment, the first electronic device 10 may determine whether a preset timer expires in step S2730 and, when the timer expires, proceed to step S2740.

Figure 28:
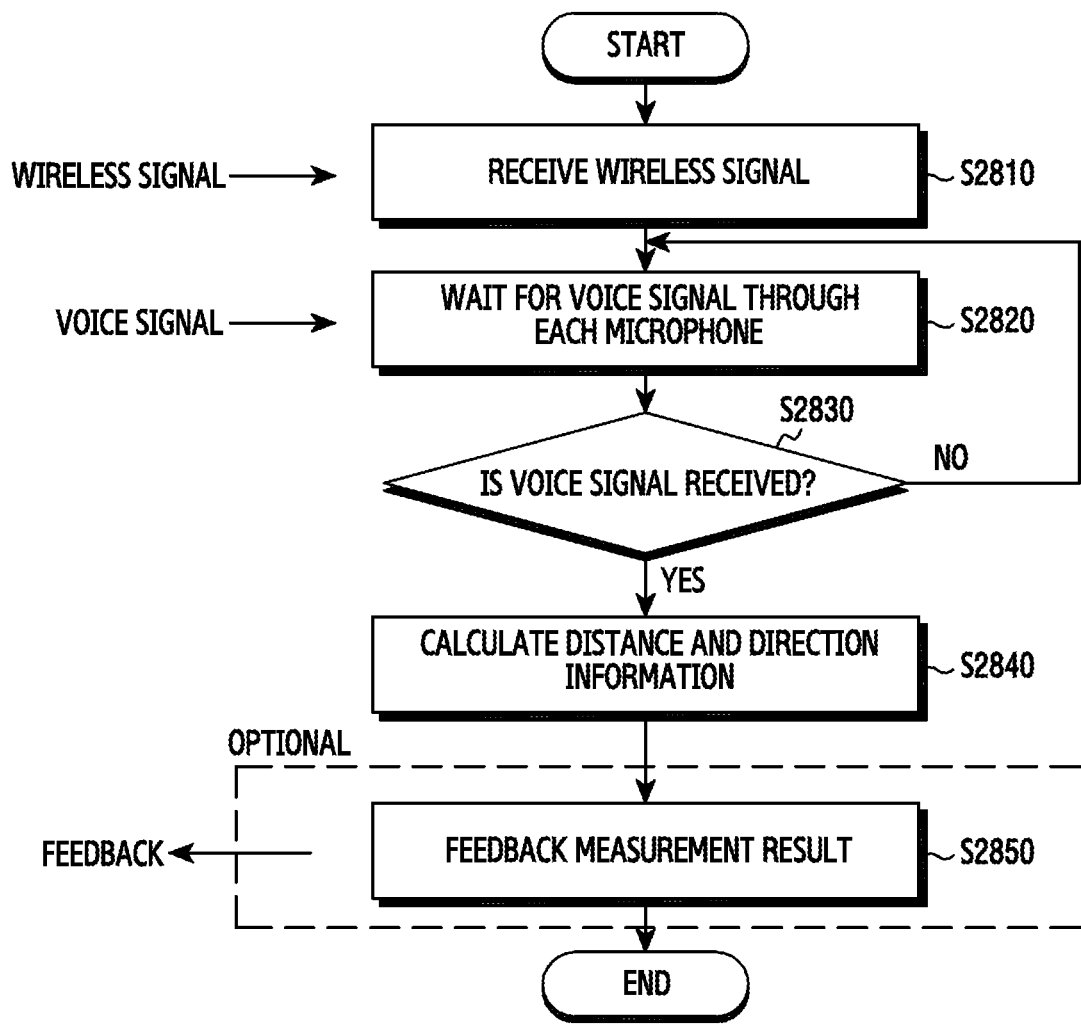
FIG. 28 illustrates a flow of processing for wireless distance measurement by the second electronic device according to the sixth embodiment of the present disclosure.

FIG. 28 illustrates a flow of processing for wireless distance measurement by the second electronic device according to the sixth embodiment of the present disclosure. The processing flow may be performed by the second electronic device 26 illustrated in FIG. 26. Here, the illustrated matters are only for an example for describing the present disclosure and should be not construed to limit the protection range of the present disclosure since modified embodiments can be made.

Referring to FIG. 28, the second electronic device 20 receives the wireless signal from the first electronic device 10 in step S2810. In step S2820, the second electronic device 20 waits for receiving the sound signal from the first electronic device 10 through each of a plurality of microphones. In step S2830, the second electronic device 20 determines whether the sound signal is received from the first electronic device 10 through the microphones.

When the sound signal is received through each microphone, the second electronic device 20 calculates the distance and the direction between the first electronic device 10 and the second electronic device 20 based on a reception time point of the wireless signal and a reception time of the sound signal in step S2840. The second electronic device 20 calculates the distance and the direction between the first electronic device 10 and the second electronic device 20 according to equation (8) to equation (10) above.

In step S2850, the second electronic device 20 transmits feedback of measurement result information of the distance/direction between the first electronic device 10 and the second electronic device 20 to the first electronic device 10. The operation of step S2850 may be selectively performed.

According to another embodiment, the second electronic device 20 may determine whether a preset timer expires in step S2830 and, when the timer expires, proceed to step S2840.

Figure 29:
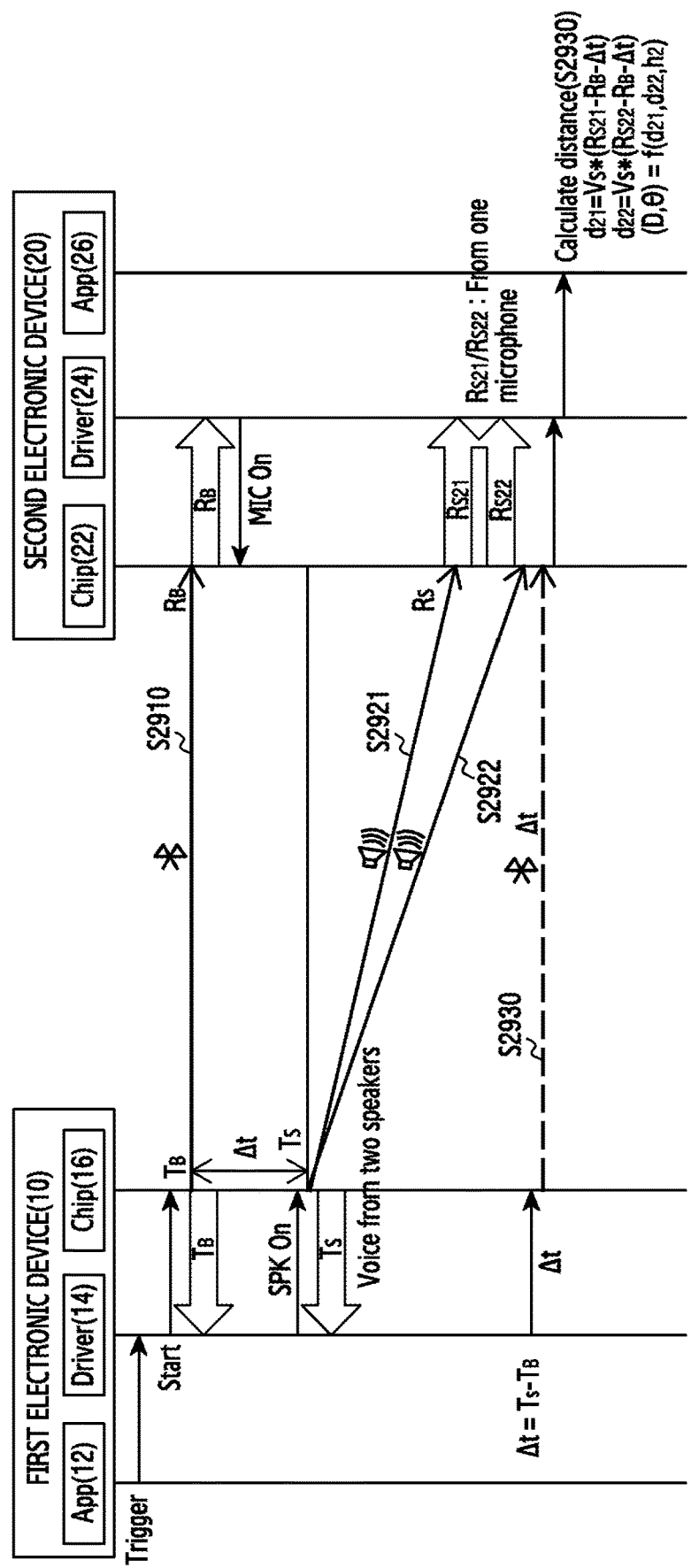
FIG. 29 illustrates a flow of processing of a wireless distance measurement scheme according to a seventh embodiment of the present disclosure.

FIG. 29 illustrates a flow of processing of a wireless distance measurement scheme according to a seventh embodiment of the present disclosure. The processing flow corresponds to a processing flow of the wireless distance measurement scheme according to the DualSync scheme. According to the processing flow, a distance and a direction (or an angle) between the first electronic device 10 and the second electronic device 20 are measured. To this end, as illustrated in FIG. 3C, the first electronic device 10 has a plurality of (for example, two) speakers and the second electronic device 20 has a microphone. Here, the illustrated matters are only for an example for describing the present disclosure and should be not construed to limit the protection range of the present disclosure since modified embodiments can be made.

Referring to FIG. 29, the first electronic device 10 includes an application 12, a driver 14, and a chip 16. The second electronic device 20 includes an application 22, a driver 24, and a chip 26. The chips 16 and 26 are elements for generating a wireless signal or a sound signal. For example, the chips 16 and 26 include a module (for example, a BT module 1325 or a communication module 1320 of FIG. 53) for generating a wireless signal such as a Bluetooth Low Energy (BLE) signal. In another example, the chips 16 and 26 include a module (for example, an audio module 1380 of FIG. 53) for generating a sound signal. The applications 12 and 22 are elements for performing a service of the electronic device. The drivers 14 and 24 are elements for controlling driving of the chips 16 and 26.

The application 12 of the first electronic device 10 generates a trigger signal for measuring a distance, and the driver 14 generates a distance measurement start signal in response to the trigger signal. The chip 16 generates a wireless signal (for example, Bluetooth Low Energy (BLE) signal) in response to the distance measurement start signal at a time point $T_B$ in step S2910. According to an embodiment, the negotiation process 100 illustrated in FIGS. 1A and 1B may be performed in response to a trigger signal, and the distance measurement start signal may be executed after the negotiation process 100 is finished.

The second electronic device 20 receives a wireless signal from the first electronic device 10 at an $R_B$ time point and activates the microphone in response to the wireless signal. The driver 24 of the second electronic device 20 activates the microphone after a predetermined time (for example, $\Delta t$) from the $R_B$ time point. Then, the microphone connected to the chip 22 starts recording. Thereafter, the recording through the microphone is made for a predetermined time from a $(R_B+\Delta t)$ time point because the second electronic device 20 does not know when the sound signal transmitted from the first electronic device 10 is received. Here, the predetermined time may be set as a proper and sufficient time after a time point when it is expected to receive the sound signal. For example, the predetermined time may be determined in consideration of a time difference ($\Delta t = T_S - T_B$) between a time point $T_B$ and a time point $T_S$ and a time when the sound signal transmitted from the first electronic device 10 reaches the second electronic device 20.

The driver 14 of the first electronic device 10 generates the sound signal through the speaker connected to the chip 16 by activating the speaker at the time point $T_S$ after the time point $T_B$. The generated sound signal is transmitted through a plurality of (for example, two) speakers in S2921 to S2922.

The second electronic device 20 receives the sound signal transmitted through each speaker of the first electronic device 10 at a time point $R_{S21}$ and a time point $R_{S22}$. The second electronic device 20 receives the sound signal transmitted through the first speaker of the first electronic device 10 at the time point $R_{S21}$ in S2921 and receives the sound signal transmitted through the second speaker of the first electronic device 10 at the time point $R_{S22}$ in S2922. The microphone of the second electronic device 20 performs recording for a predetermined time from a time point $(R_B+\Delta t)$ and receives the sound signal through the plurality of speakers of the first electronic device 10 while the recording operation is performed.

The first electronic device 10 transfers information on a time difference ($\Delta t = T_S - T_B$) between the time point $T_B$ and the time point $T_S$ to the second electronic device 20 in S2930.

The second electronic device 20 calculates a distance $d_{21}$ between the first speaker of the first electronic device 10 and the second electronic device 20 based on a time difference between the reception time point ($R_B$) of the wireless signal and the reception time point ($R_{S21}$) of the sound signal transmitted through the first speaker of the first electronic device and the information on the time difference ($\Delta t = T_S - T_B$) between the time point $T_B$ and the time point $T_S$ received from the first electronic device 10 in S2940. The distance between the first speaker of the first electronic device 10 and the second electronic device 20 is calculated as equation (11) below. The application 26 of the second electronic device 20 derives the reception time point ($R_{S2}i$) of the sound signal by using a result of the recording through the microphone. That is, the application 26 may derive the reception time point ($R_{S11}$) of the sound signal since the time point $R_B$ when the wireless signal is received from the first speaker of the first electronic device 10, the time point ($R_B+\Delta t$) when the recording is started through the microphone, and the time during which the recording is performed from the time point ($R_B+\Delta t$) are known.

$$d_{21} = V_S * (R_{S21} - R_B - \Delta t) \qquad \text{equation (11)}$$

Here, $V_S$ denotes a transmission speed (340 m/s) of the sound signal, $R_{S21}$ denotes a time point when the second electronic device 20 receives the sound signal transmitted through the first speaker of the first electronic device 10, $R_B$ denotes a time point when the second electronic device 20 receives the wireless signal, and Δt denotes a time difference between the time point ($T_B$) when the first electronic device 10 receives the wireless signal and the time point ($T_S$) when the first electronic device 10 transmits the sound signal.

Further, the second electronic device 20 calculates a distance d2 between the second speaker of the first electronic device 10 and the second electronic device 20 based on a time difference between the reception time point ($R_B$) of the wireless signal and the reception time point ($R_{S22}$) of the sound signal transmitted through the second speaker of the first electronic device and the information on the time difference (Δt=Ts−$T_B$) between the time point $T_B$ and the time point $T_S$ received from the first electronic device 10 in S2940. The distance between the second speaker of the first electronic device 10 and the second electronic device 20 is calculated as equation (12) below. The application 26 of the second electronic device 20 derives the reception time point ($R_{S22}$) of the sound signal by using a result of the recording through the microphone. That is, the application 26 may derive the reception time point ($R_{S22}$) of the sound signal since the time point $R_B$ when the wireless signal is received from the first speaker of the first electronic device 10, the time point ($R_B$+Δt) when the recording is started through the microphone, and the time during which the recording is performed from the time point ($R_B$+Δt) are known.

$$d_{22}=V_S*(R_{S22}-R_B-\Delta t) \quad \text{equation (12)}$$

Here, $V_S$ denotes a transmission speed (340 m/s) of the sound signal, $R_{S22}$ denotes a time point when the second electronic device 20 receives the sound signal through the second speaker of the first electronic device 10, $R_B$ denotes a time point when the second electronic device 20 receives the wireless signal, and Δt denotes a time difference between the time point ($T_B$) when the first electronic device 10 receives the wireless signal and the time point ($T_S$) when the first electronic device 10 transmits the sound signal.

Further, the second electronic device 20 calculates the distance D and the direction (angle) θ between the first electronic device 10 and the second electronic device 20 based on the distance $d_{21}$ between the first speaker of the first electronic device 10 and the second electronic device 20, the distance $d_{22}$ between the second speaker of the first electronic device 10 and the second electronic device 20, and the distance $h_2$ between the speakers. The distance D and the direction θ between the first electronic device 10 and the second electronic device 20 is calculated as equation (13) below.

$$(D,\theta)=f(d_{21},d_{22},h_2)$$

$$D=\tfrac{1}{2}*\text{sqrt}(2d_{22}^2+2d_{21}^2-h_2^2)$$

$$\cos(\pi/2-\Theta)=1/(2Dh_2/2)*(D^2+h_2^2/4-d^2)$$

$$d=\min(d_{11},d_{12}) \quad \text{equation (13)}$$

Here, $d_{21}$ denotes the distance measured between the first speaker of the first electronic device 10 and the second electronic device 20, $d_{22}$ denotes the distance measured between the second speaker of the first electronic device 10 and the second electronic device 20, $h_2$ denotes the distance between the first speaker and the second speaker, and θ denotes the angle of the second electronic device 20 with respect to the first electronic device 10.

Information on the distance D and the direction θ between the first electronic device 10 and the second electronic device 20 measured by the second electronic device 20 may be fed back to the first electronic device 10.

Figure 30:
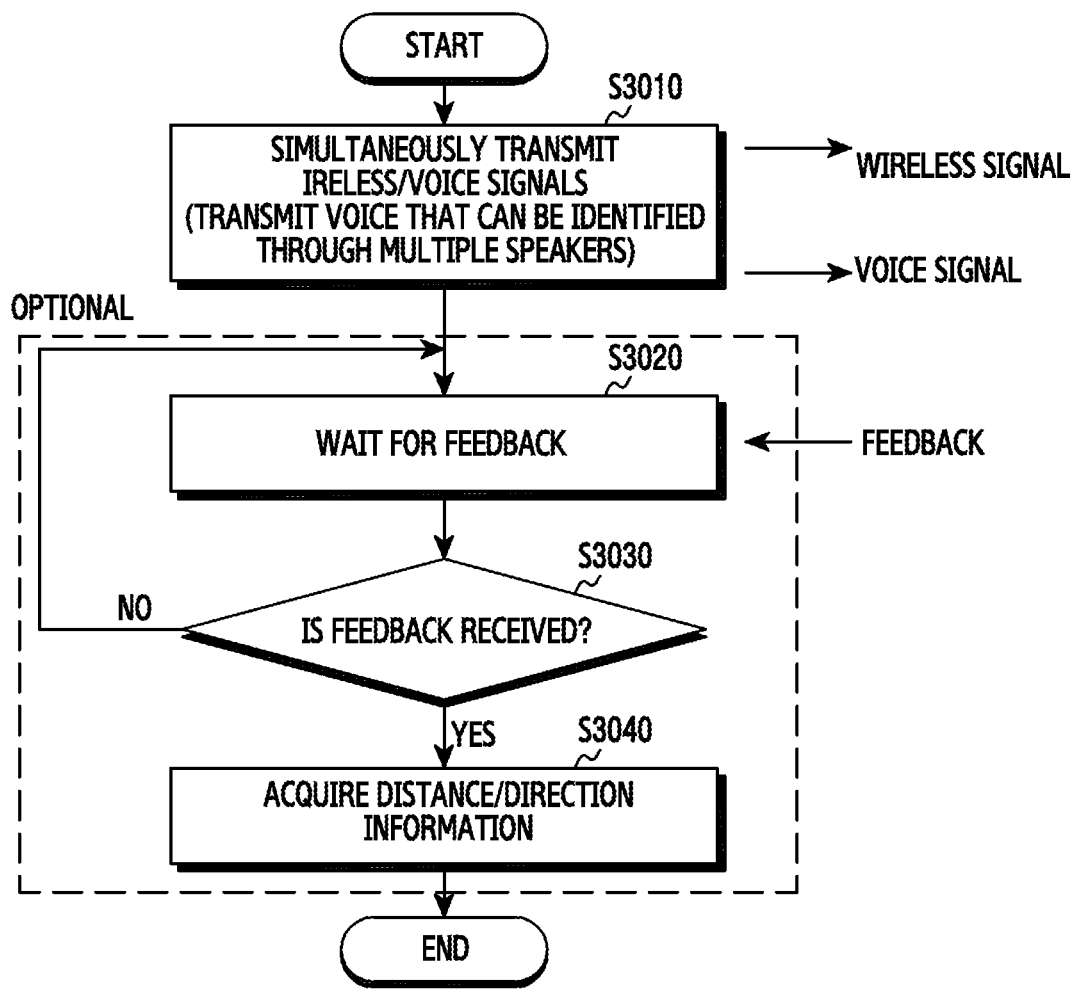
FIG. 30 illustrates a flow of processing for wireless distance measurement by the first electronic device according to the seventh embodiment of the present disclosure.

FIG. 30 illustrates a flow of processing for wireless distance measurement by the first electronic device according to the seventh embodiment of the present disclosure. The processing flow may be performed by the first electronic device 10 illustrated in FIG. 29. Here, the illustrated matters are only for an example for describing the present disclosure and should be not construed to limit the protection range of the present disclosure since modified embodiments can be made.

Referring to FIG. 30, the first electronic device 10 simultaneously transmits the wireless signal and the sound signal in step S3010. At this time, identifiable sound signals may be transmitted through multiple speakers. The wireless signal first arrives at the second electronic device 20 and thus an operation of a reception end of the second electronic device is triggered, and then the sound signal arrives at the second electronic device 20.

The first electronic device 10 waits for feedback from the second electronic device 20 in step S3020, and determines whether the feedback is received from the second electronic device 20 in step S3030.

When the feedback is received from the second electronic device 20, the first electronic device 10 acquires information on the distance/direction between the first electronic device 10 and the second electronic device 20 from the received feedback information in step S3040.

The operations of step S3020 to S3040 may be selectively performed.

According to another embodiment, the first electronic device 10 may determine whether a preset timer expires in step S3030 and, when the timer expires, proceed to step S3040.

Figure 31:
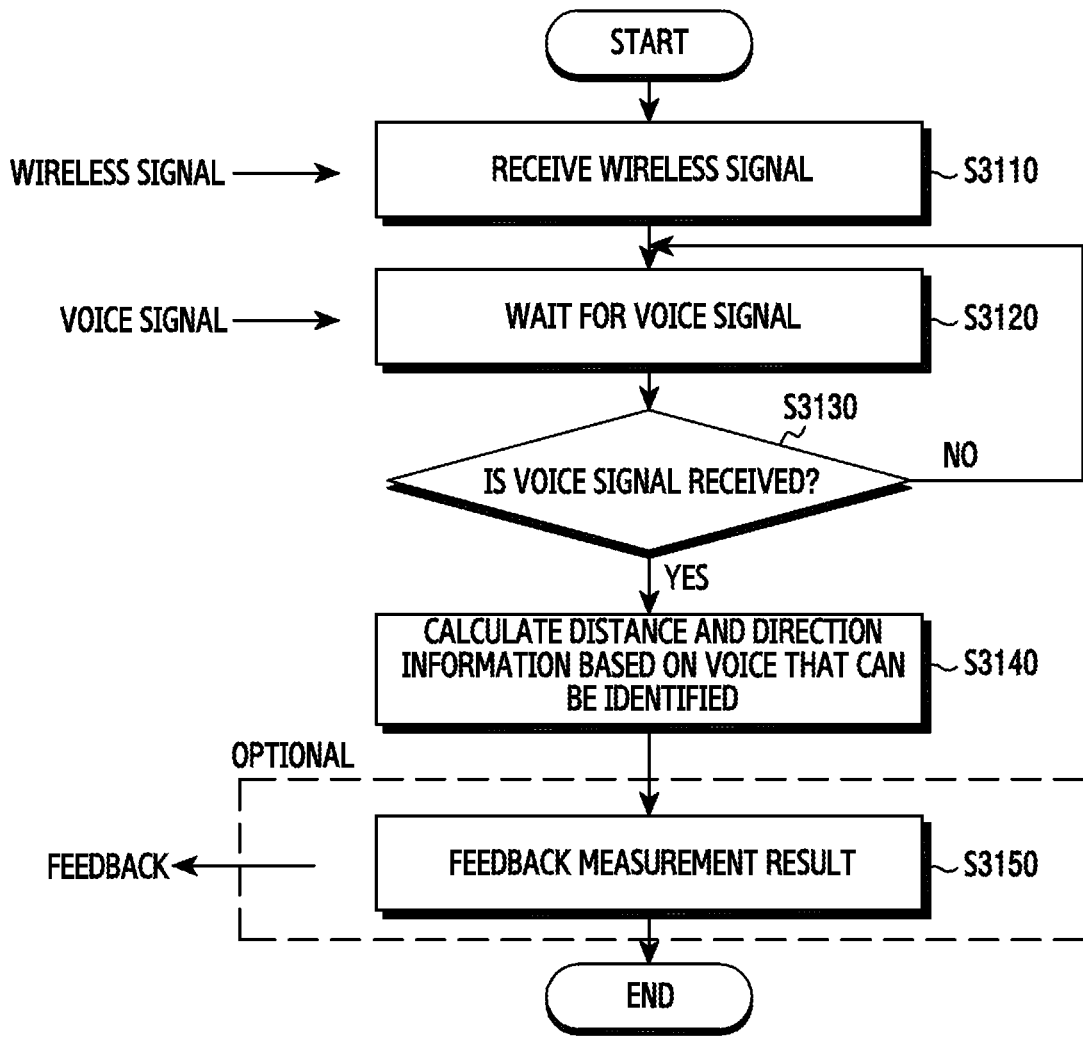
FIG. 31 illustrates a flow of processing for wireless distance measurement by the second electronic device according to the seventh embodiment of the present disclosure.

FIG. 31 illustrates a flow of processing for wireless distance measurement by the second electronic device according to the seventh embodiment of the present disclosure. The processing flow may be performed by the second electronic device 29 illustrated in FIG. 29. Here, the illustrated matters are only for an example for describing the present disclosure and should be not construed to limit the protection range of the present disclosure since modified embodiments can be made.

Referring to FIG. 31, the second electronic device 20 receives the wireless signal from the first electronic device 10 in step S3110. The second electronic device 20 waits for receiving the sound signal transmitted through each speaker of the first electronic device 10 in step S3120. In step S3130, the second electronic device 20 determines whether the sound signal transmitted from each speaker of the first electronic device 10 is received through the microphone.

When the sound signal is received, the second electronic device 20 calculates the distance and the direction between the first electronic device 10 and the second electronic device 20 at the reception time point of the wireless signal and the reception time point of the sound signal in step S3140. The second electronic device 20 calculates the distance and the direction between the first electronic device 10 and the second electronic device 20 according to equation (11) to equation (13) above.

The second electronic device 20 transmits feedback of measurement result information of the distance/direction between the first electronic device 10 and the second electronic device 20 to the first electronic device 10 in step S3150. The operation of step S3150 may be selectively performed.

According to another embodiment, the second electronic device 20 may determine whether a preset timer expires in step S3130 and, when the timer expires, proceed to step S3140.

Figure 32:
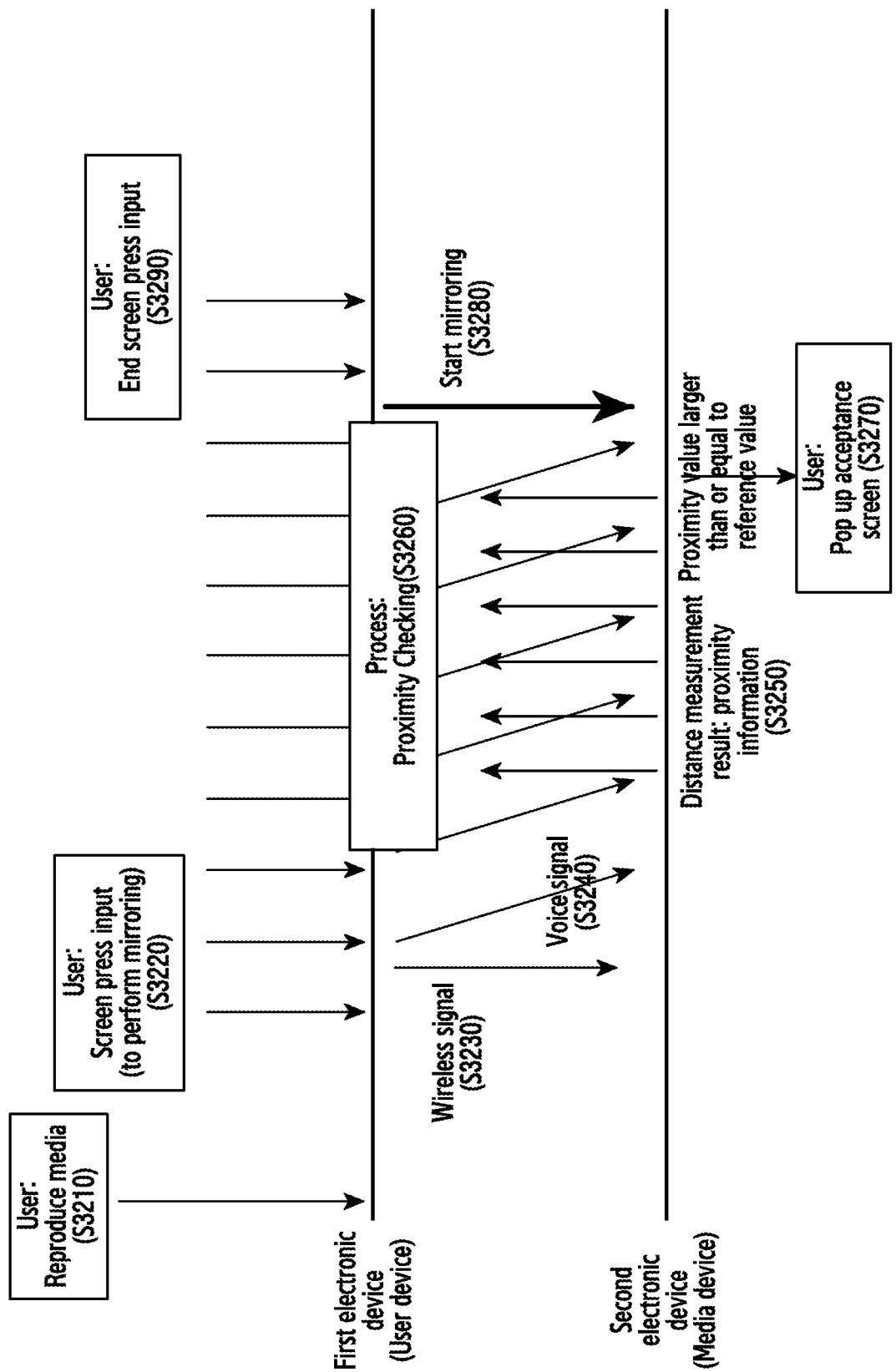
FIG. 32 illustrates a flow of processing in which an operation intended by the user is performed based on a distance measurement result measured by a wireless distance measurement scheme according to an embodiment of the present disclosure.

FIG. 32 illustrates a flow of processing in which an operation intended by the user is performed based on a distance measurement result measured by a wireless distance measurement scheme according to an embodiment of the present disclosure. The processing flow corresponds to an example of executing the interworking process 300 between the first electronic device as a user device (for example, smart phone) and the second electronic device as a media device (for example, TV) illustrated in FIG. 1B.

Referring to FIG. 32, the user makes a particular gesture to perform video mirroring in a state S3210 where media are reproduced through the first electronic device (for example, presses the screen) in S3220, the first electronic device transmits the wireless signal in S3230. Further, the first electronic device periodically transmits the sound signal in S3240. A scheme of measuring the distance between the first electronic device and the second electronic device through transmission of the wireless signal and the periodic sound signal corresponds to the SyncSound scheme illustrated in FIG. 6.

The first electronic device and the second electronic device are synchronized in response to the reception of the wireless signal from the first electronic device. Thereafter, in response to the sound signal periodically transmitted from the first electronic device, the second electronic device measures the distance between the first electronic device and the second electronic device and a distance change amount and reports a distance measurement result to the first electronic device in S3250. The first electronic device having received the distance measurement result checks proximity between the first electronic device and the second electronic device in S3260.

When the proximity larger than or equal to a reference value is checked, an acceptance screen is popped up in the second electronic device in S3270 and the first electronic device starts mirroring of a reproduced video in S3280. When the mirroring starts, the user may stop a particular gesture. That is, the user may complete a screen press input operation of the first electronic device in S3290.

FIGS. 33 to 50 illustrate examples in which the first electronic device and the second electronic device interwork with each other based on a distance measurement result measured by a wireless distance measurement scheme according to embodiments of the present disclosure. The processing flow corresponds to examples in which the interworking process 300 between the first electronic device and the second electronic device illustrated in FIG. 1B is performed. In the following description of operation examples, the first electronic device may be named a user mobile phone (or smart phone), a user device, smart glasses, or a remote control, and the second electronic device may be named a user mobile phone (or smart phone), a TV, a speaker, a computer, a POS terminal, a beacon terminal, or a smart watch.

Figure 33:
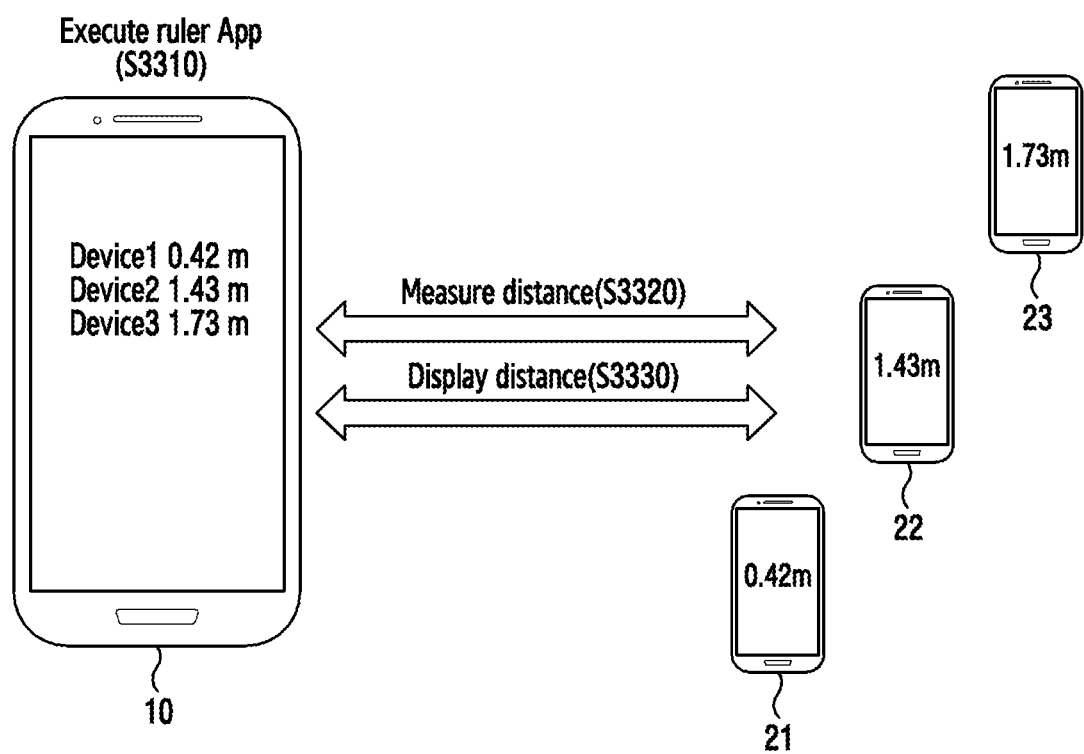
FIGS. 33 to 55B illustrate examples in which the first electronic device and the second electronic device interwork with each other based on a distance measurement result measured by a wireless distance measurement scheme according to embodiments of the present disclosure.

Referring to FIG. 33, a distance measurement application, that is, a Ruler App is executed in the first electronic device 10 for distance measurement between devices in S3310. The first electronic device 10 measures a distance between neighboring devices in S3320. Names of the neighboring devices and the distance measurement result are displayed on a display of the first electronic device 10 in S3330. For example, a distance of 0.42 m measured between the first electronic device 10 and a device 21 is displayed, a distance of 1.43 m measured between the first electronic device 10 and a device 22 is displayed, and a distance of 1.73 m measured between the first electronic device 10 and a device 23 is displayed. The example corresponds to an example of measuring and displaying the distance between the neighboring mobile phones through the mobile phone.

Figure 34:
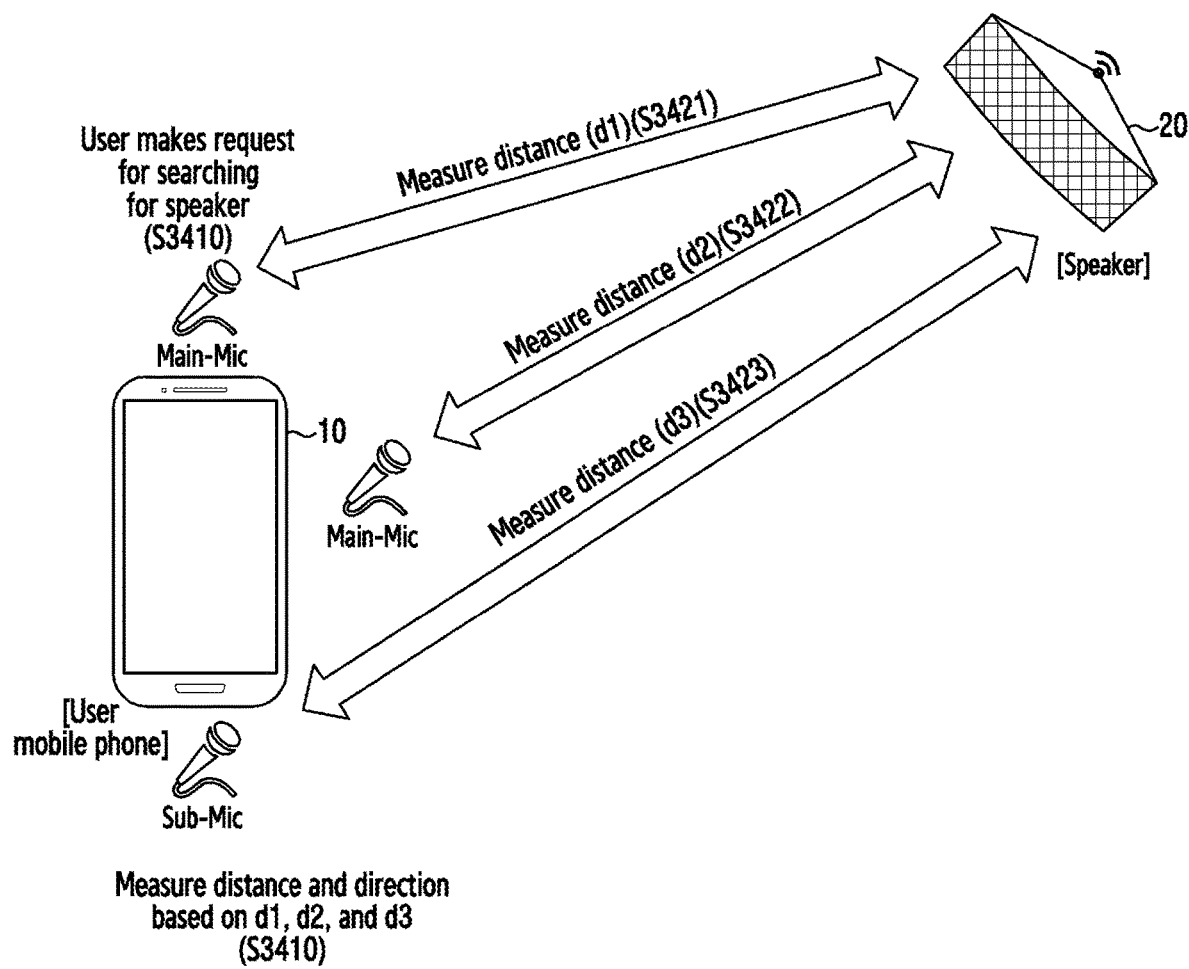

Referring to FIG. 34, the user makes a request for searching for a speaker through the user mobile phone 10 in S3410. The user mobile phone 10 and the speaker 20 starts measuring the distance, and the user mobile phone 10 measures the distance to the speaker 20 by using a plurality of (for example, three) microphones. A distance (d1) between a main microphone of the user mobile phone 10 and the speaker 20 is measured in S3421, a distance (d2) between a main microphone of the user mobile phone 10 and the speaker 20 is measured in S3422, and a distance (d3) between a sub microphone of the user mobile phone 10 and the speaker 20 is measured in S3423. The user mobile phone 10 measures the distance between the user mobile phone 10 and the speaker 20 by using the distance measurement results d1 to d3. The example corresponds to an example of searching for neighboring speakers through the mobile phone having a plurality of microphones.

Figure 35:
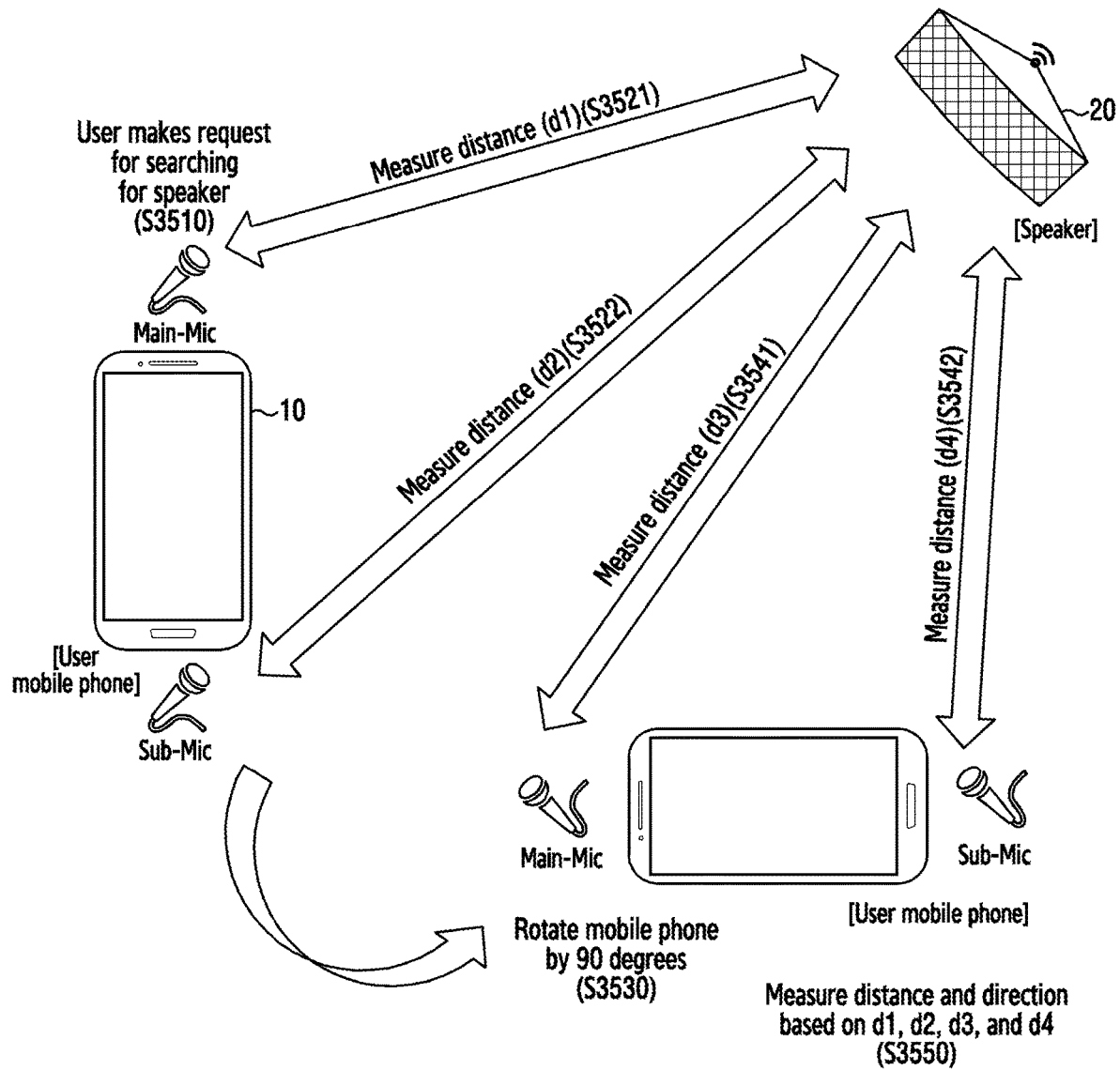

Referring to FIG. 35, the user makes a request for searching for a speaker through the user mobile phone 10 in S3510. The user mobile phone 10 and the speaker 20 starts measuring the distance, and the user mobile phone 10 measures the distance to the speaker 20 by using a plurality of (for example, two) microphones. A distance (d1) between a main microphone of the user mobile phone 10 and the speaker 20 is measured in S3521, and a distance (d2) between a sub microphone of the user mobile phone 10 and the speaker 20 is measured in S3522. The user rotates the user mobile phone 10 at 90 degrees according to an instruction in step S3530. The user mobile phone 10 having rotated at 90 degrees measures the distance to the speaker 20 by using a plurality of (for example, two) microphones. A distance (d3) between a main microphone of the user mobile phone 10 and the speaker 20 is measured in S3541, and a distance (d4) between a sub microphone of the user mobile phone 10 and the speaker 20 is measured in S3542. The user mobile phone 10 measures the distance and a direction between the user mobile phone 10 and the speaker 20 by using the distance measurement results d1 to d4. The example corresponds to an example of searching for neighboring speakers through the mobile phone having a plurality of microphones.

Figure 36:
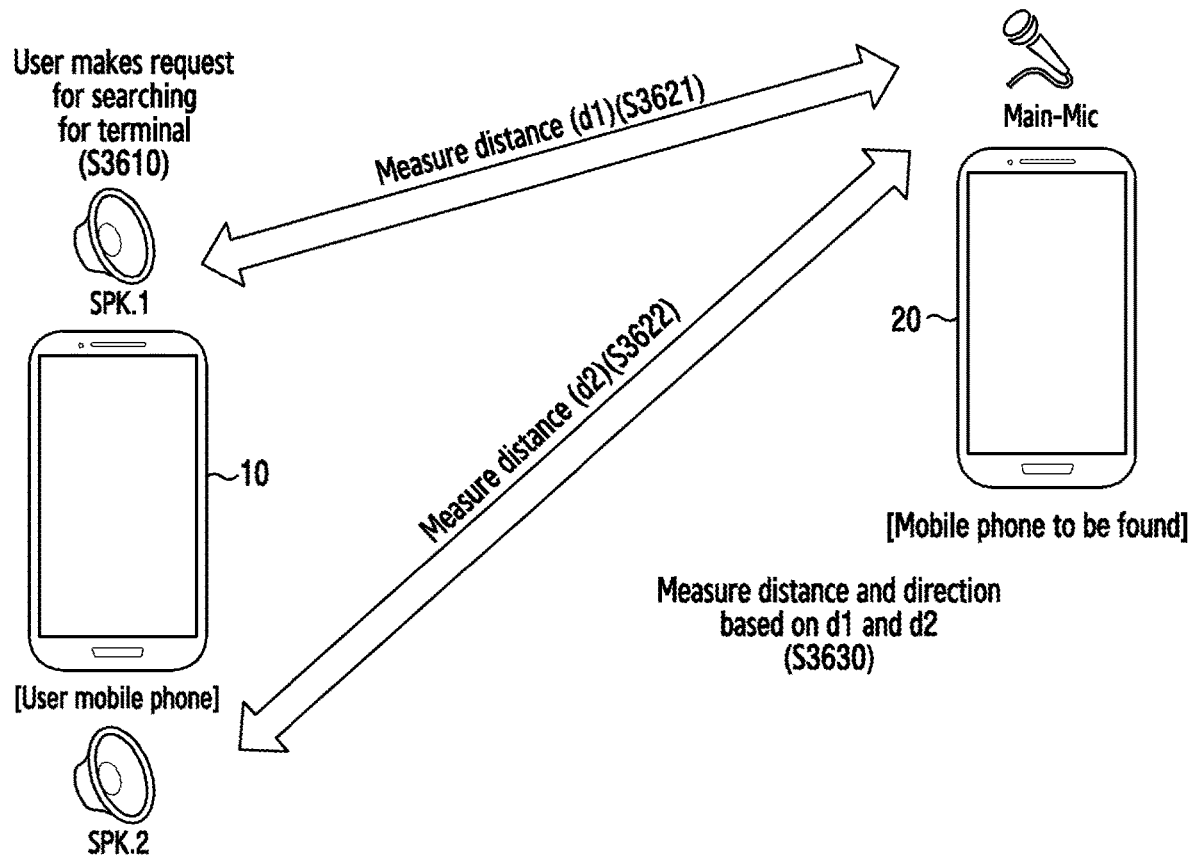

Referring to FIG. 36, the user makes a request for searching for a neighboring device through the user mobile phone 10 in S3610. The mobile phone 20 to be found measures distances from two speakers of the user mobile phone 10 by using a microphone. The mobile phone 20 measures a distance (d1) from a first speaker of the user mobile phone 10 in S3621 and a distance (d2) from a second speaker of the user mobile phone 10 in S3622. The mobile phone 20 measures a distance and a direction between the mobile phone 10 and the mobile phone 20 by using the distance measurement results d1 to d2. The example corresponds to an example of searching for a neighboring mobile phone by using a mobile phone having a plurality of speakers.

Figure 37:
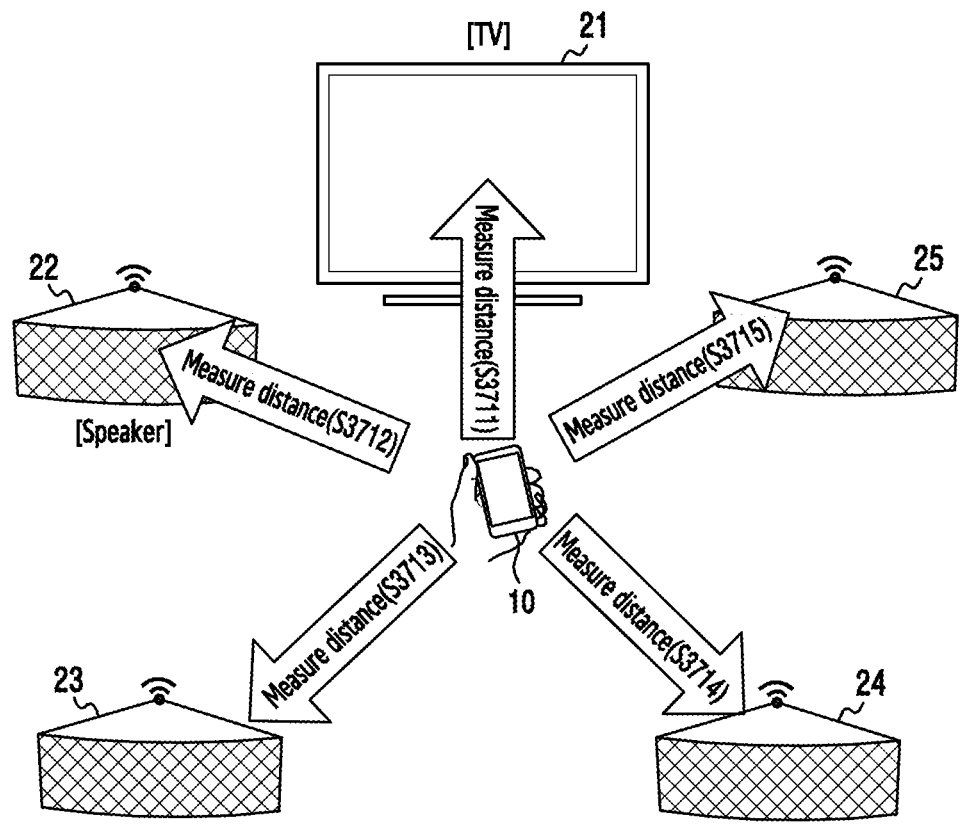

Referring to FIG. 37, the user mobile phone 10 measures a distance between speakers (including a TV) 21 to 25. The mobile phone 10 measures a distance between the mobile phone 10 and a TV 21 in S3711, measures a distance between the mobile phone 10 and a speaker 22 in S3712, measures a distance between the mobile phone 10 and a speaker 23 in S3713, measures a distance between the mobile phone 10 and a speaker 24 in S3714, and measures a distance between the mobile phone 10 and a speaker 25 in S3715. As described above, the user may measure distances to the speakers by using the mobile phone 10 and dispose room speakers based on a distance measurement result. In addition, it is possible to measure distances between the speakers (including the TV). Based on the distance measurement result between the speakers, the room speakers may be more properly disposed. The example corresponds to an example of disposing the room speakers by using the distance measurement result.

Figure 38:
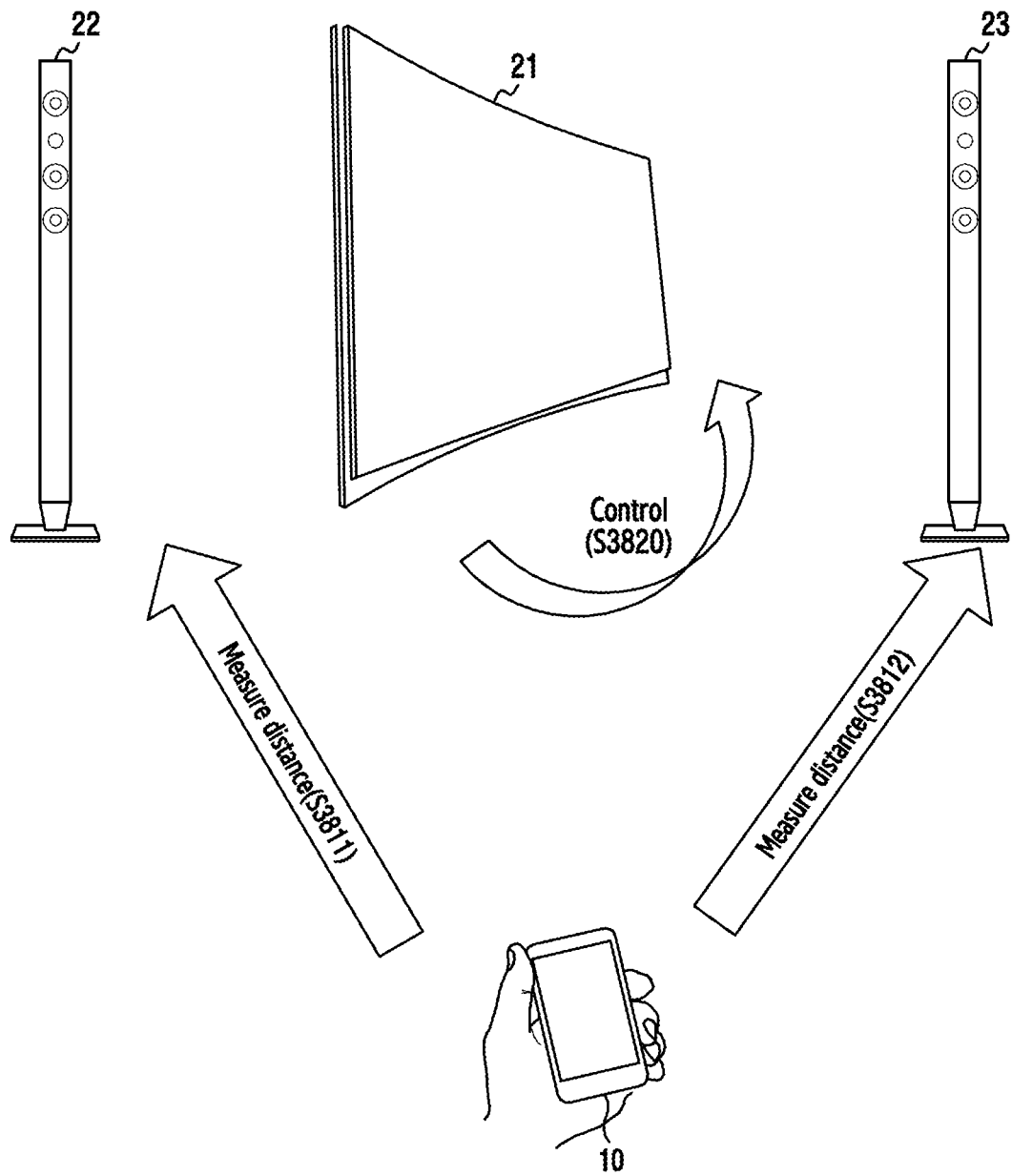

Referring to FIG. 38, the user mobile phone 10 measures distances between the user mobile phone 10 and speakers 22 and 23 of a home theater (or a curved TV) 21. Based on a measurement result, it is possible to set a home theater (or curved TV) environment optimized for a user location. That is, the speakers 22 and 23 of the home theater may be installed at optimized user locations based on the distance measurement result and a direction of the curved TV 21 may be properly controlled in S3820. The example may correspond to an example of setting the home theater (or curved TV) environment based on the distance measurement result.

Figure 39:
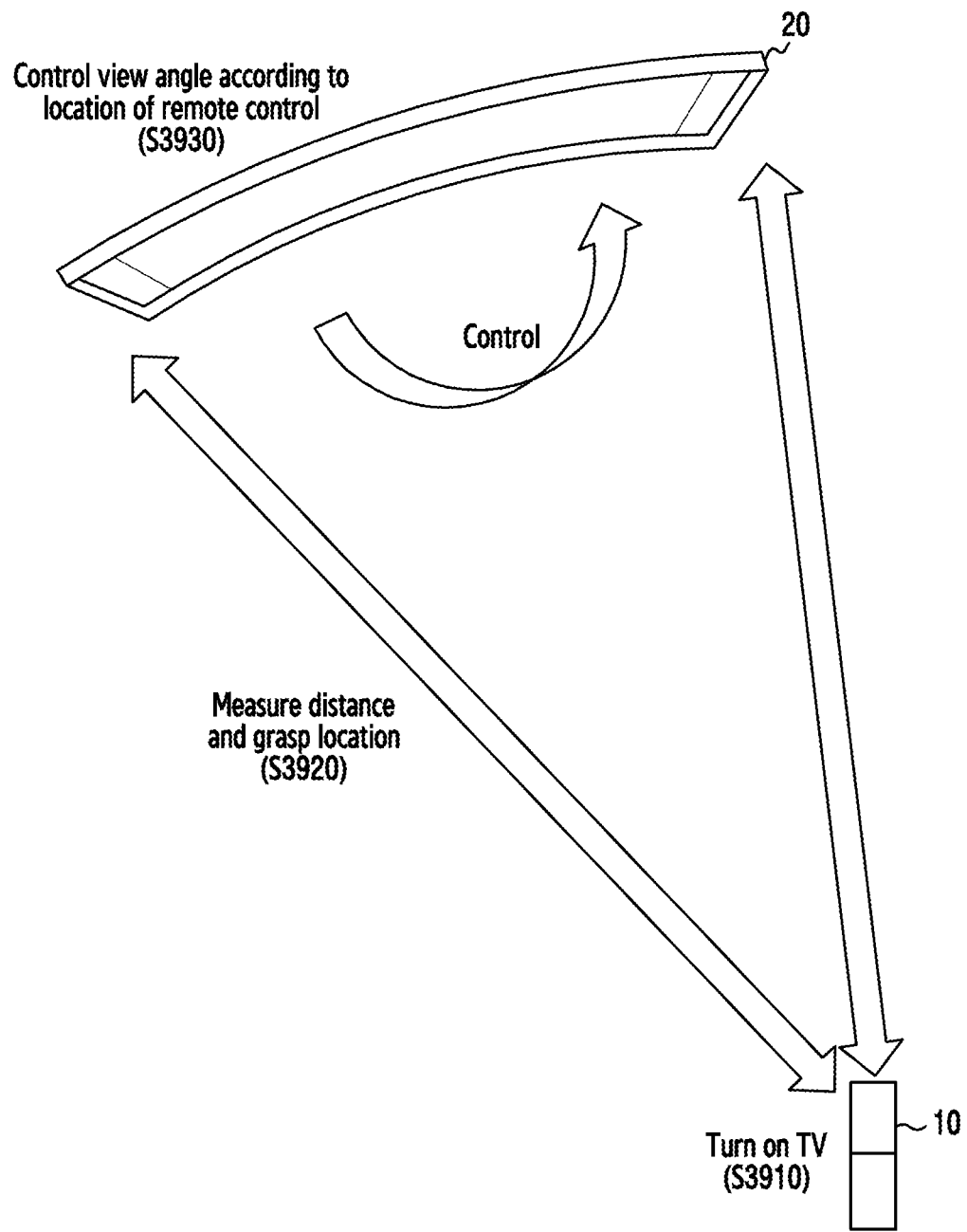

Referring to FIG. 39, the user turns on the TV 20 by using the remote control 10 in S3910. Distances between the remote control 10 and both speakers of the TV 20 are measured in S3920. The TV 20 controls a view angle according to the location of the remote control 10 in S3930. The example corresponds to an example of automatically controlling the view angle of the TV based on the distance measurement result.

Figure 40:
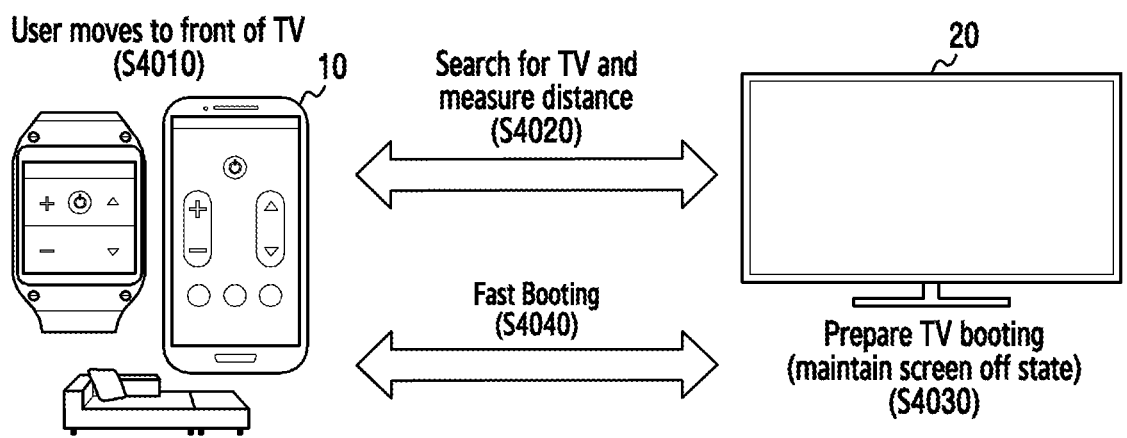

Referring to FIG. 40, the user moves in front of the TV 20 in S4010. The user device 10 searches for the TV 20 and measures the distance in S4020. The TV 20 prepares booting according to the distance between the user device 10 and the TV 20 and a maintenance time in S4030. When the booting is completed, the TV screen maintains an off state. When the user presses a power button through the user device 10, the screen of the TV 20 changes to an on state in S4040. The user device 10 may include an application for the operation, that is, a remote controller application. The example corresponds to an example of fast booting the TV based on the distance measurement result.

Figure 41A:
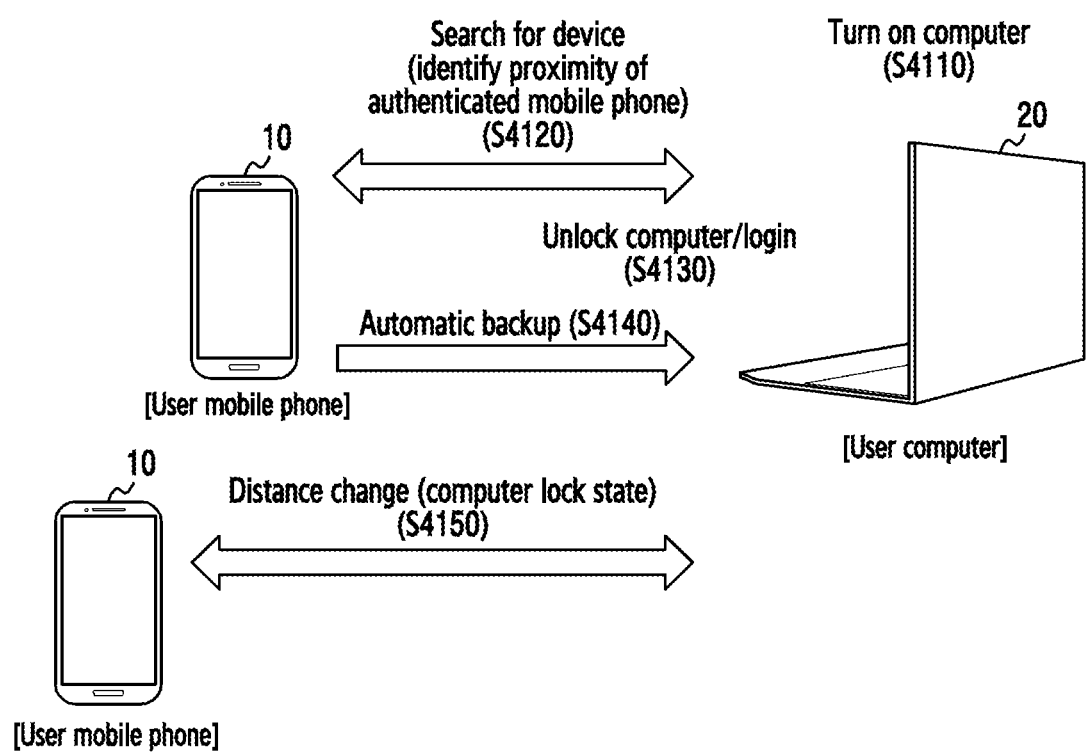

Referring to FIG. 41A, the user turns on power of the computer 20 through the mobile phone 10 in S4110. The computer 20 identifies that the mobile phone 10 is close to the computer 20 in S4120. When the mobile phone is close, the computer 20 identifies whether the mobile phone is an already authenticated mobile phone and automatically unlocks (logs in) the mobile phone in S4130. The user mobile phone 10 automatically backs up stored photos to the computer 20 in S4140. When the mobile phone 10 goes far away, the computer 20 automatically enters a sleep mode (or a lock state) in S4150. The example corresponds to an example of automatically unlocking the computer 20 based on the distance measurement result and automatically backing up information of the mobile phone 10.

Figure 41B:
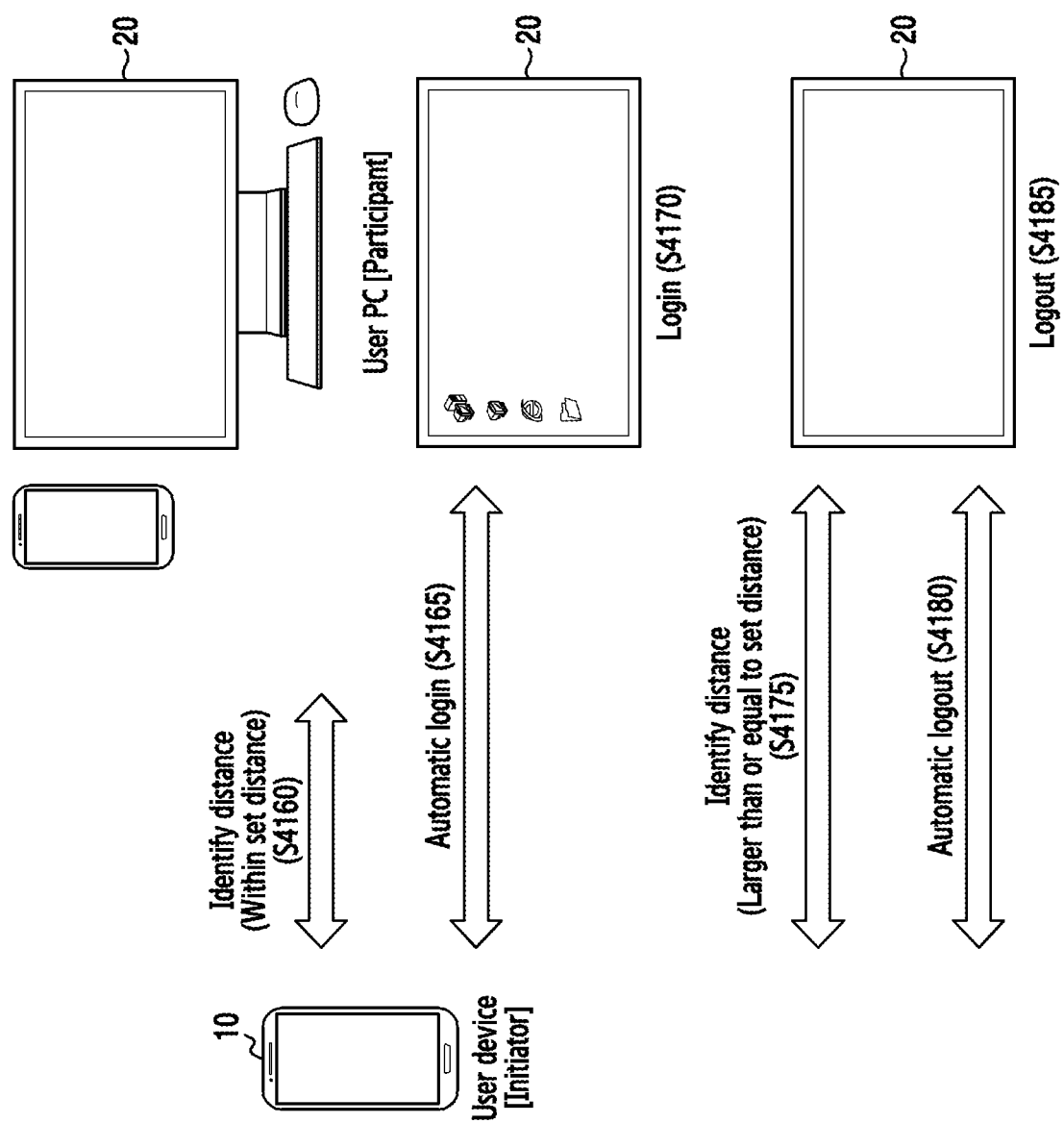

Referring to FIG. 41B, the user device (or initiator) 10 and the PC (or participant) 20 periodically measure and identify a distance value in S4160. When the measured distance is smaller than a preset distance, the user device 10 transmits an auto log-in signal in S4165. In response to the reception of the auto log-in signal, the PC 20 logs in a user screen in S4170. Next, the user device 10 and the PC 20 periodically measure and identify a distance value in S4175. When the measured distance is larger than or equal to the preset distance, the user device 10 transmits an auto log-out signal in S4180. In response to the reception of the auto log-out signal, the PC 20 logs out the user screen in S4185.

Figure 42:
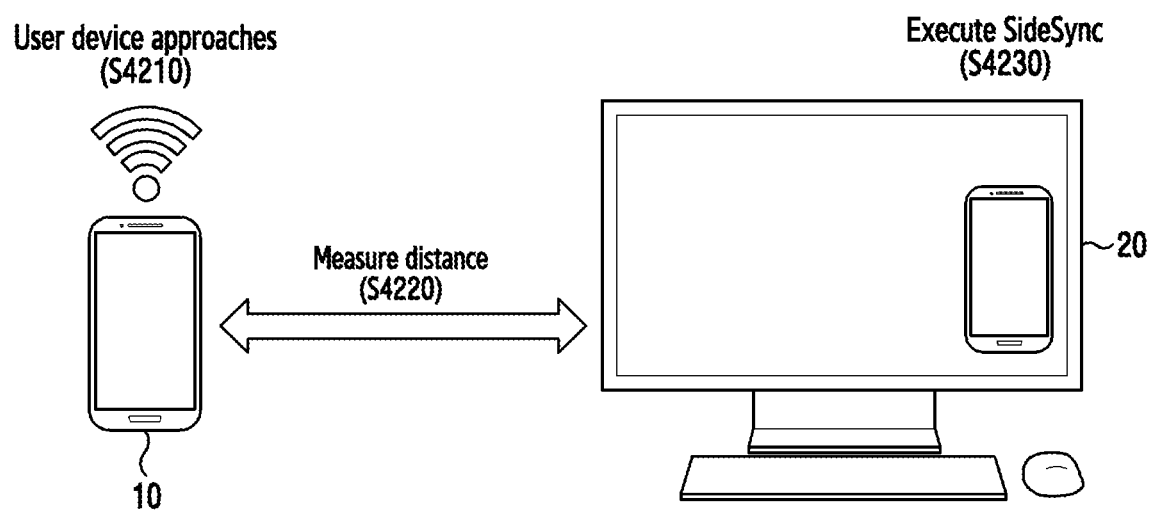

Referring to FIG. 42, the user moves the user device 10 to the proximity of the PC 20 in S4210. The user device 10 measures the distance to the PC 20 in S4220. When the distance between the user device 10 and the PC 20 is equal to or smaller than a threshold, the user device 10 executes an inter-device screen/data sharing function, that is, SideSync in the PC 20. The example corresponds to an example of executing a particular function of the PC based on the distance measurement result.

Figure 43:
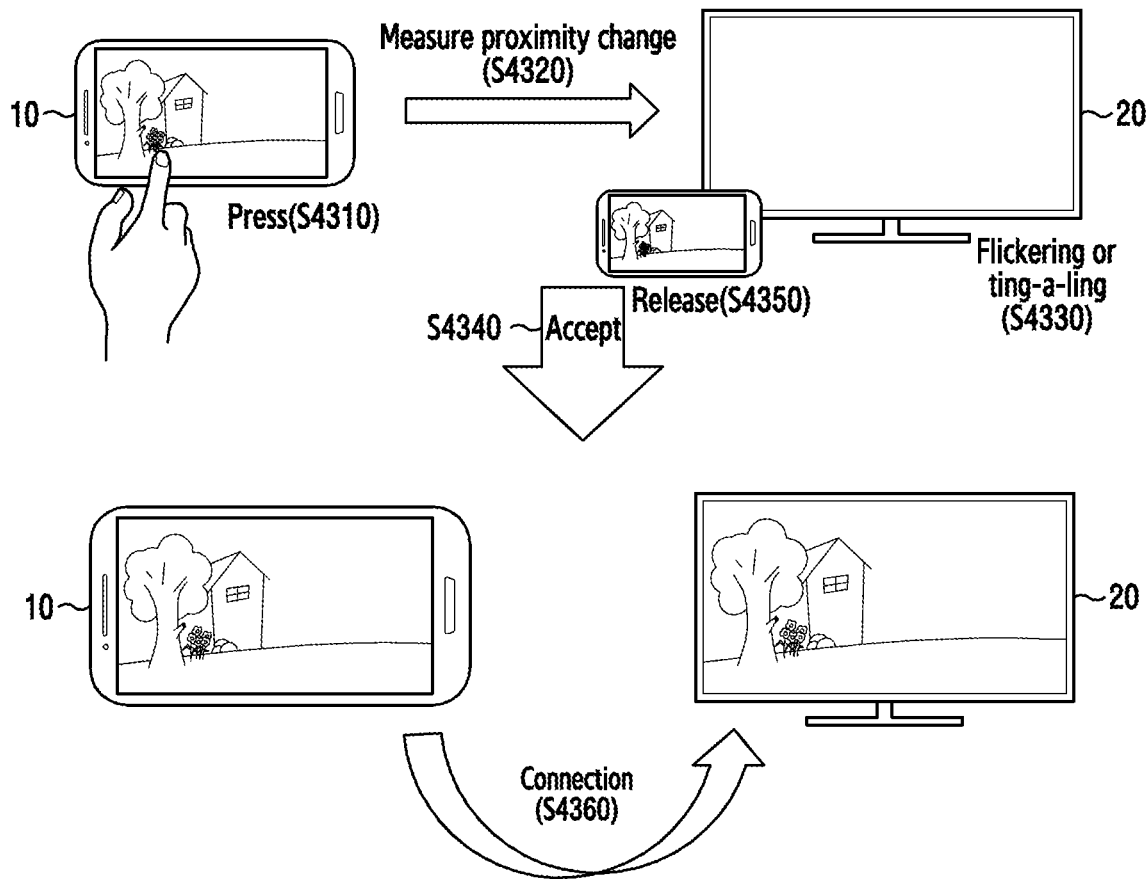

Referring to FIG. 43, the user device 10 may be executing particular media. When there is a user gesture or input in S4310, the user device 10 measures a distance between the user device 10 and the TV 20 and measures a proximity change therebetween in S4320. When the proximity between the user device 10 and the TV 20 is larger than or equal to a reference value, that is, when the user device 10 and the TV 20 are close to each other within a predetermined distance, the TV 20 is booted in S4330, an acceptance screen is popped up in S4340, and the user device 10 and the TV 20 are connected to each other in S4360. Accordingly, a video reproduced in the user device 10 is mirrored to the TV 20. The example corresponds to an example of grasping a user's intention and performing mirroring of the video reproduced in the user device 10 to the TV 20 based on a distance measurement result.

Figure 44:
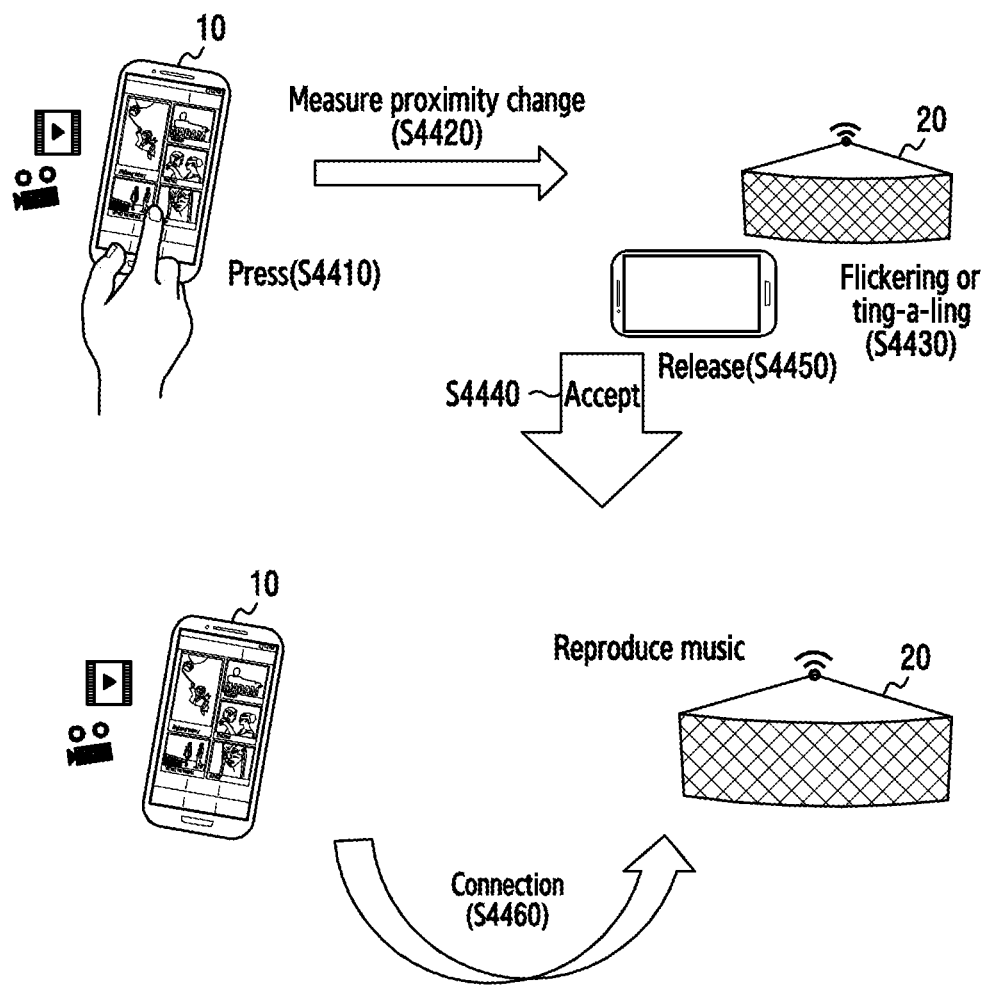

Referring to FIG. 44, the user device 10 is executing particular media. When there is a user gesture or input in S4410, the user device 10 measures a distance between the user device 10 and the speaker 20 and measures a proximity change therebetween in S4420. When the proximity between the user device 10 and the TV 20 is larger than or equal to a reference value, that is, when the user device 10 and the TV 20 are close to each other within a predetermined distance, the speaker 20 is booted in S4430, an acceptance screen is popped up in S4440, and the user device 10 and the speaker 20 are connected to each other in S4460. Accordingly, music reproduced in the user device 10 is sound-streamed and reproduced through the speaker 20. The example corresponds to an example of grasping a user's intention and performing streaming of the sound reproduced in the user device 10 through the speaker 20 based on a distance measurement result.

Figure 45:
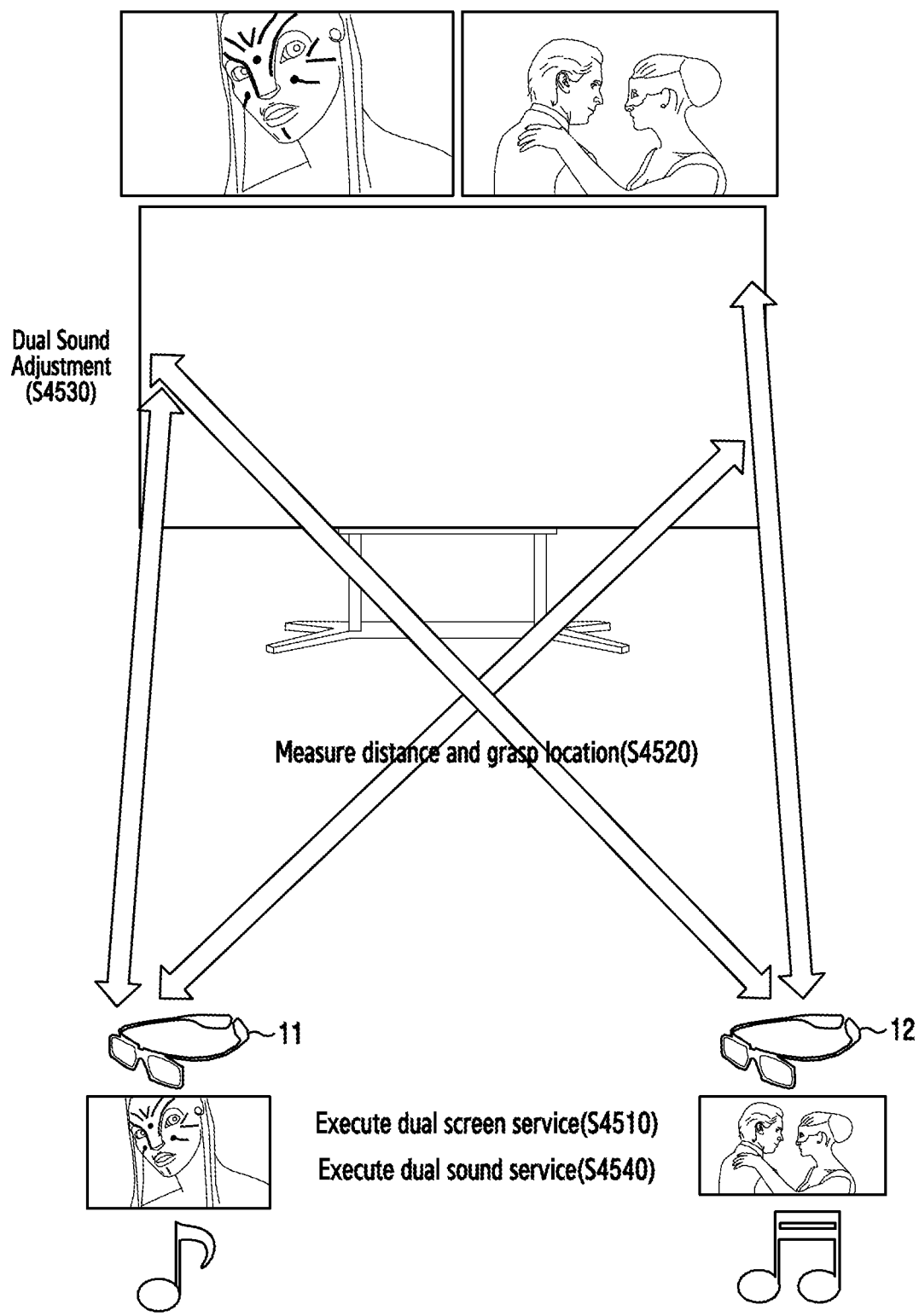

Referring to FIG. 45, the user executes a video service application through user devices 11 and 12 in S4510. The TV 20 may reproduce two videos, and the user may watch a first video through the user device 11 and a second video through the user device 12. That is, a dual screen service is provided. Distances between both speakers of the TV 20 and the user devices 11 and 12 are measured, and relative locations of the TV 20 and the user devices 11 and 12 are grasped in S4520. The TV 20 generates a sound optimized for the user device 11 and 12 based on the measured distances in S4530. The sound generated by the TV 20 is provided to each of the user devices 11 and 12 in S4540. Accordingly, the dual sound service is executed. The example corresponds to an example of optimizing two sounds reproduced in the TV 20 that provides the dual screen service based on a distance measurement result and providing the optimized sound to each of the corresponding user devices 11 and 12.

Figure 46:
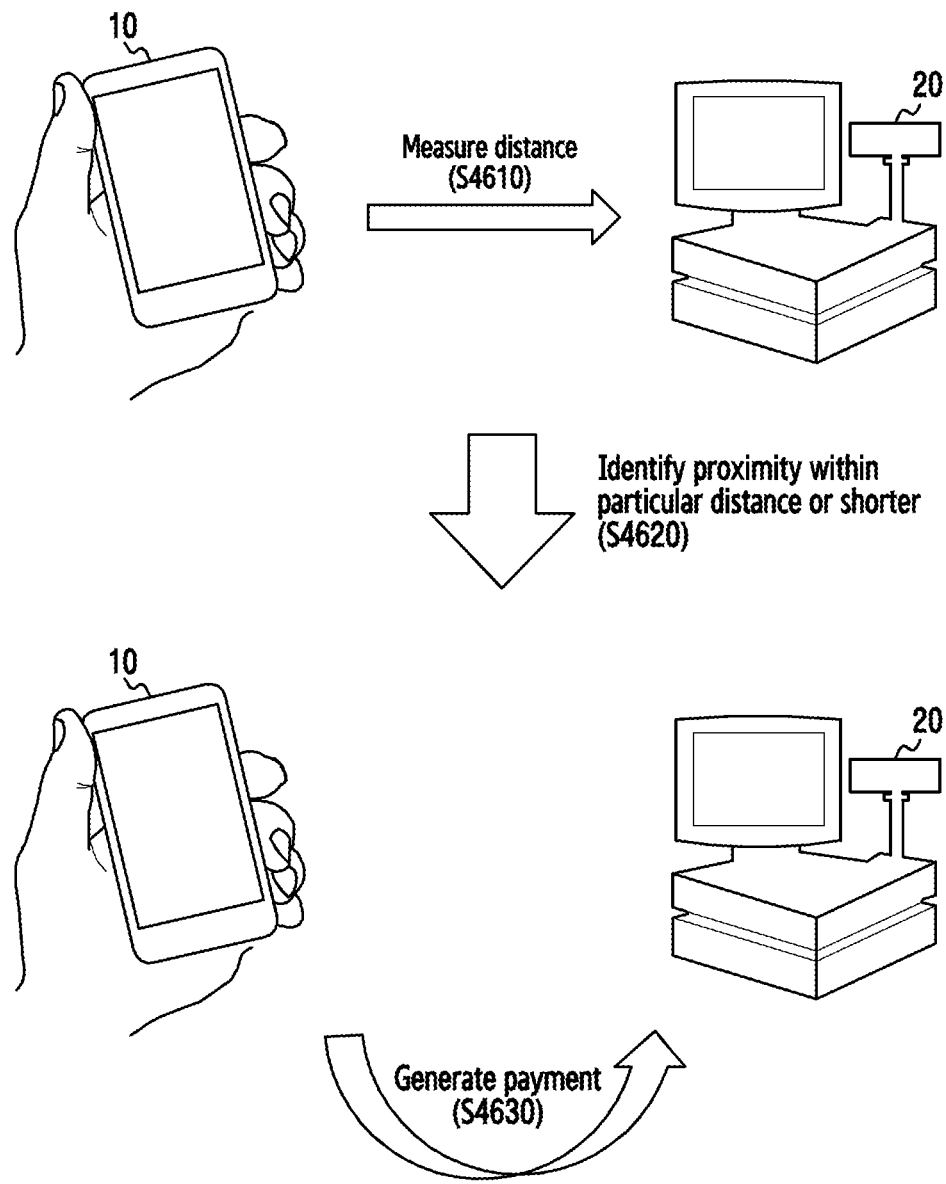

Referring to FIG. 46, the user device 10 measures a distance between the user device 10 and the POS terminal 20 in S4670. When the distance between the user device 10 and the POS terminal 20 is equal to or smaller than a particular distance, that is, when it is identified that the user device 10 becomes close to the POS terminal 20 in S4620, the user device 10 transfers a payment request to the POS terminal 20 in S4630. The example corresponds to an example of providing a payment service based on accurate proximity.

Figure 47:
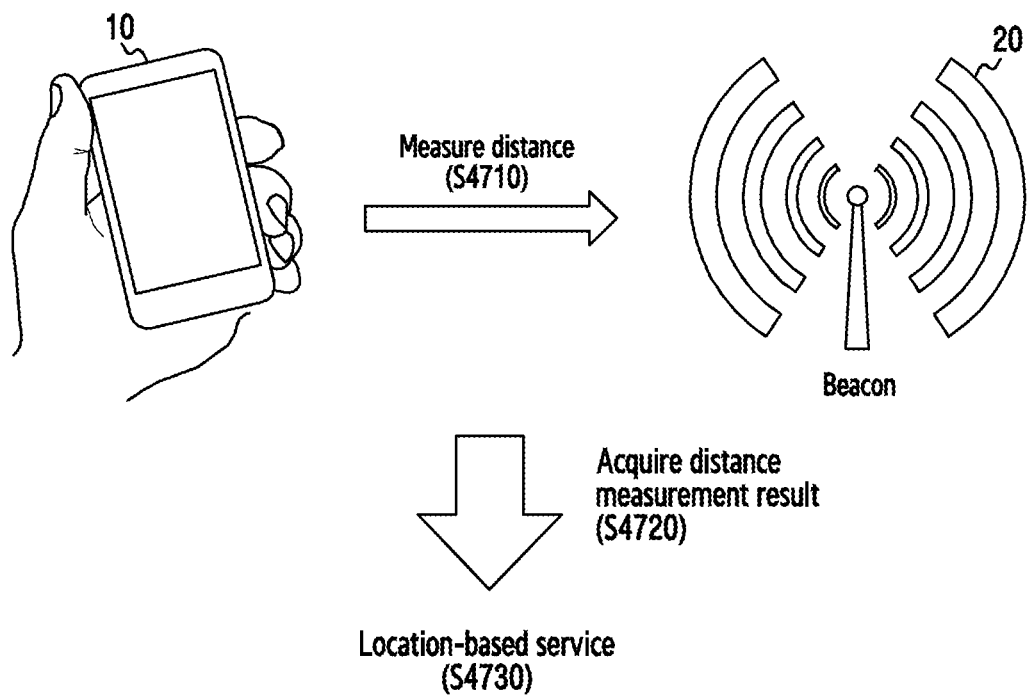

Referring to FIG. 47, the user device 10 measures a distance between the user device 10 and the beacon terminal 20 in S4710. A distance measurement result between the user device 10 and the beacon terminal 20 is acquired in S4720. The acquired distance measurement result is used for various location-based services in S4730. The example corresponds to an example of performing various location-based services through accurate geofencing on the basis of accurate distance measurement with the beacon terminal.

Figure 48:
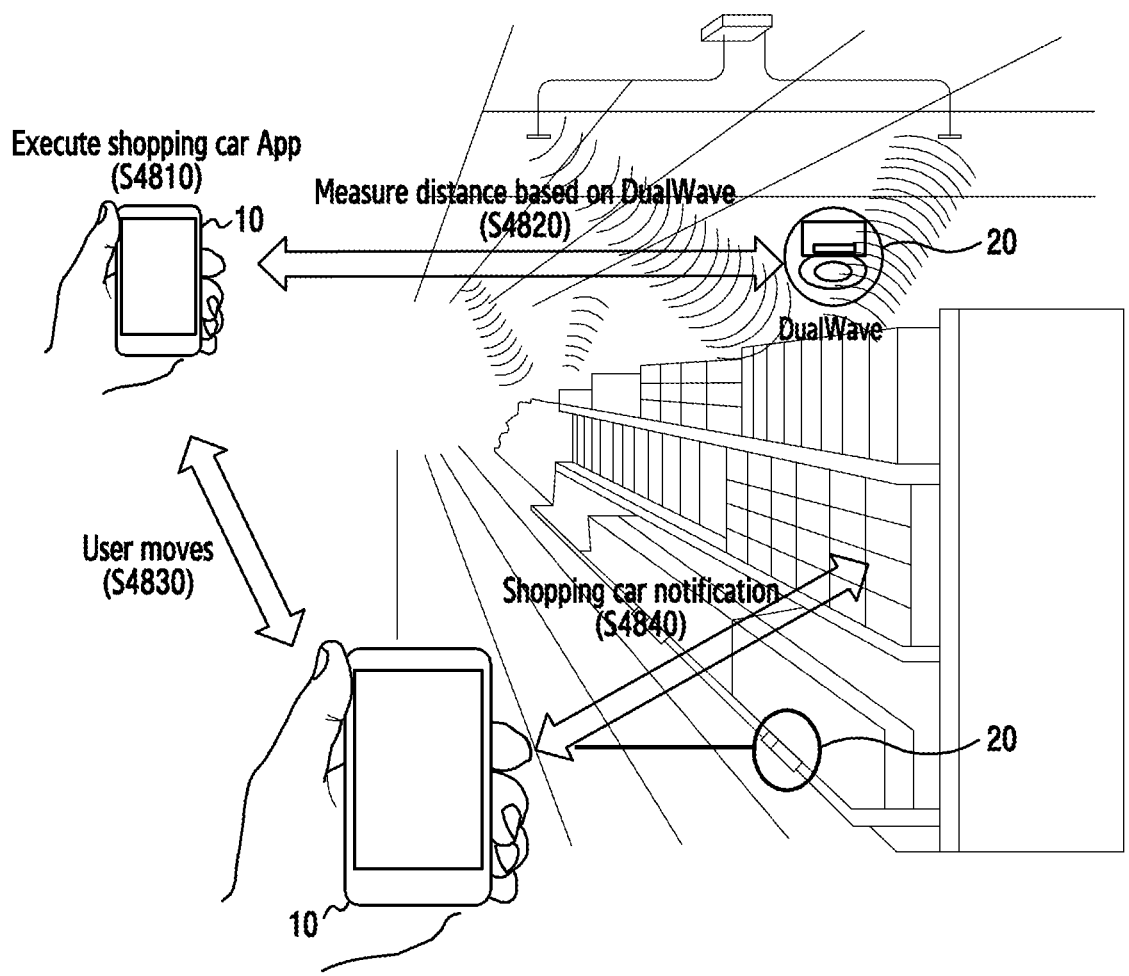

Referring to FIG. 48, the user executes a shopping cart application of the user device 10 in S4810. The device 20 installed at every showcase in the mart and the user device 10 periodically measures a distance therebetween in S4820. As the user moves in S4830, the distance between the user device 10 and the device 20 changes. As the distance between the user device 10 and the device 20 is measured, the device 20 determines whether the user is closer to a product in the shopping cart and generates a notification when the user becomes close to the product in the shopping art in S4840. The example corresponds to an example of performing an accurate advertisement based on a distance measurement result between the device 20 installed in the mart and the user device 10.

Figure 49:
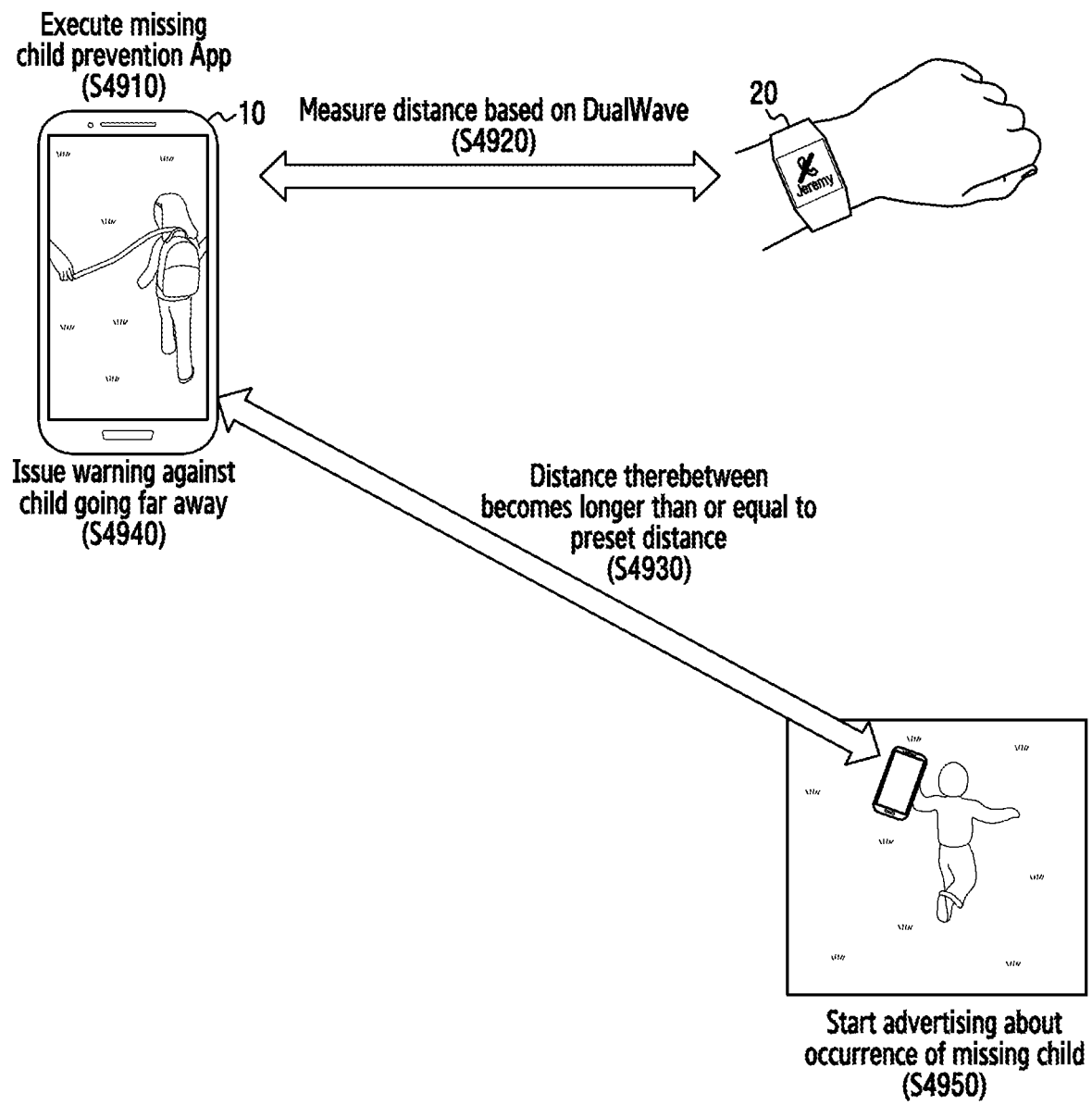

Referring to FIG. 49, the user executes a missing child prevention application in the user device 10 in S4910. The user device 10 periodically measures a distance between the wearable device 20 worn on the child and the user device 10 in S4920. The distance between the user device 10 and the wearable device 20 may become longer than or equal to a preset value in S4930. In this case, the wearable device 20 advertises the fact of the occurrence of a missing child and the user device 10 issues a warning against the child going far away. A packet informing of the fact of the generation of the missing child may include Uniform Resource Locator (URL) information on the Internet. Through the URL information, a photo of the child can be identified and it can be identified who the child is, and another user device having received the packet informing of the fact of the generation of the missing child may inform the parent user device 10 of a location of the missing child based on the URL. The example corresponds to an example of performing missing child prevention based on a distance measurement result between the user device 10 and the wearable device 20.

Figure 50:
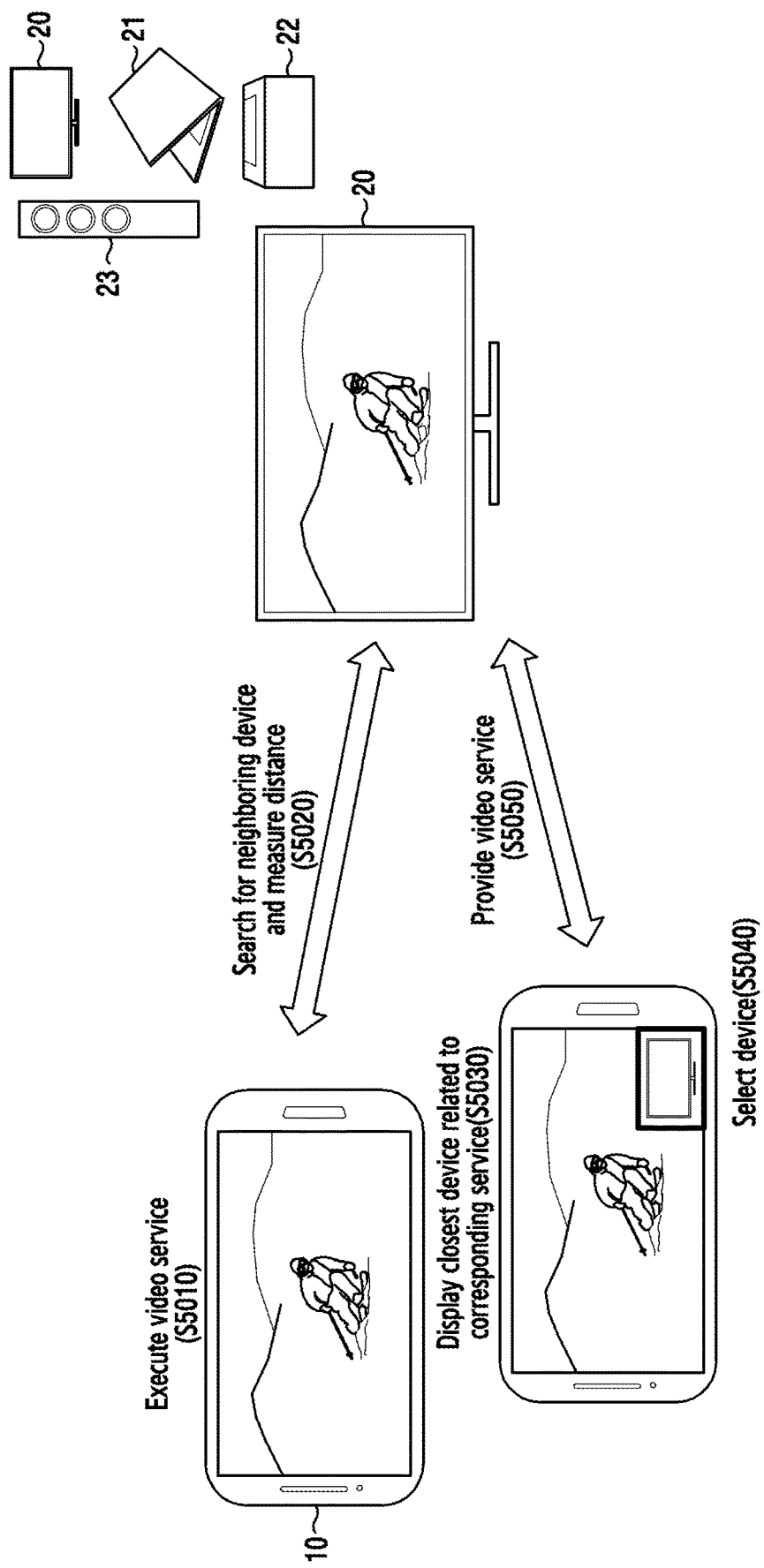

Referring to FIG. 50, the user executes a video service through the user device 10 in S5010. The user device 10 searches for neighboring devices 20 to 23 and measures distances to the neighboring devices 20 to 23 in S5020. The user device 10 displays a closest device related to a corresponding video service based on a distance measurement result in S5030. When the user selects the TV 20 in S5040, the user device 10 makes a video service, which has been executed in the user device 10, executed in the TV 20 in S5050.

As described above, the first electronic device and the second electronic device perform various types of local interactions based on a precise distance recognition result measured by a wireless distance measurement scheme according to embodiments of the present disclosure. The local interaction may be largely classified into contents sharing, user authentication, local grouping, and simple device connection (easy pairing).

Figure 51A:
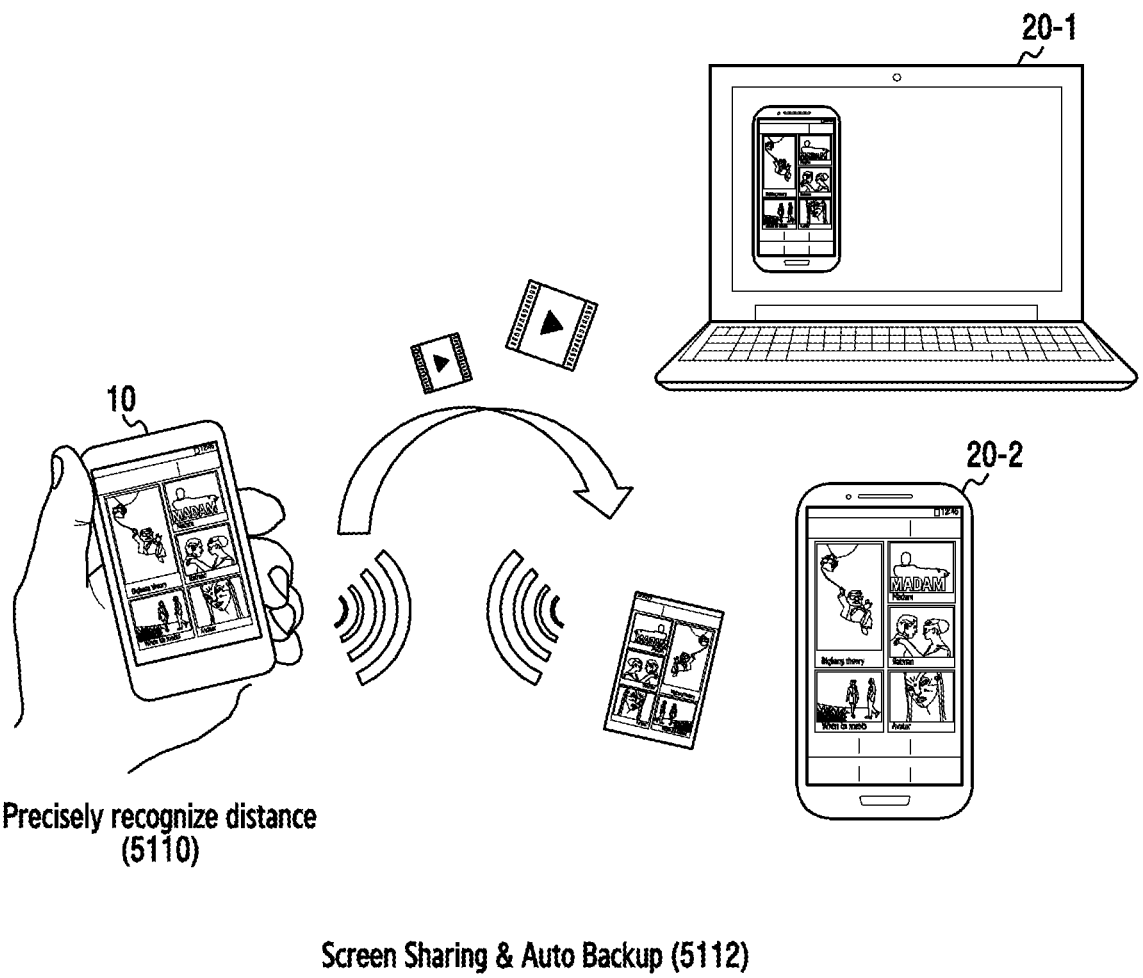

The contents sharing may include a case (FIG. 51A) where the screen is shared and a case (FIG. 51B) where music is shared. Referring to FIG. 51A, according to a proximity operation of the first electronic device 10 (for example, a smart phone) to the second electronic device 20-1 or 20-2 (for example, a note PC or a smart phone), contents (for example, videos) are transmitted to the second electronic device 20-1 or 20-2 and automatically reproduced. When it is determined that the first electronic device 10 is close to the second electronic device 20-1 or 20-2 within a predetermined distance based on a precise distance recognition result 5110, the first electronic device 10 shares its own screen with the second electronic device 20-1 or 20-2 (screen sharing) as indicated by a reference numeral 5112. Further, the first electronic device 10 may automatically back up its own scree to the second electronic device 20-1 or 20-2 as indicated by a reference numeral 5112.

Figure 51B:
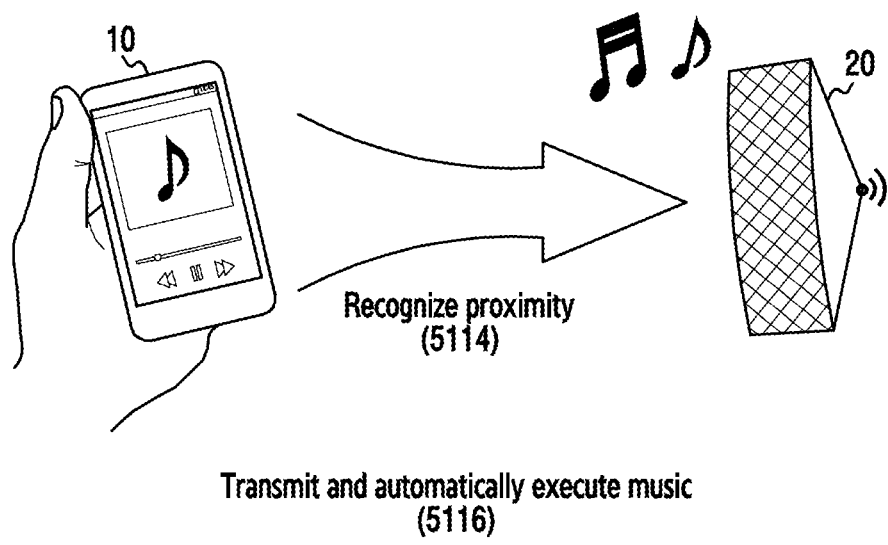

Referring to FIG. 51B, according to a proximity operation of the first electronic device 10 (for example, a smart phone) to the second electronic device 20 (for example, a speaker), contents (for example, music) are transmitted to the second electronic device 20 and automatically executed. When it is determined that the first electronic device 10 is close to the second electronic device 20 within a predetermined distance based on a precise distance recognition result 5114, the first electronic device 10 transmits its own music to the second electronic device 20 to automatically execute the music as indicated by a reference numeral 5116.

The user authentication includes a safe and easy user authentication based on a precise distance recognition result such as a case (FIG. 52A) of a PC auto login and a case (FIG. 52B) of an auto unlock.

Figure 52A:
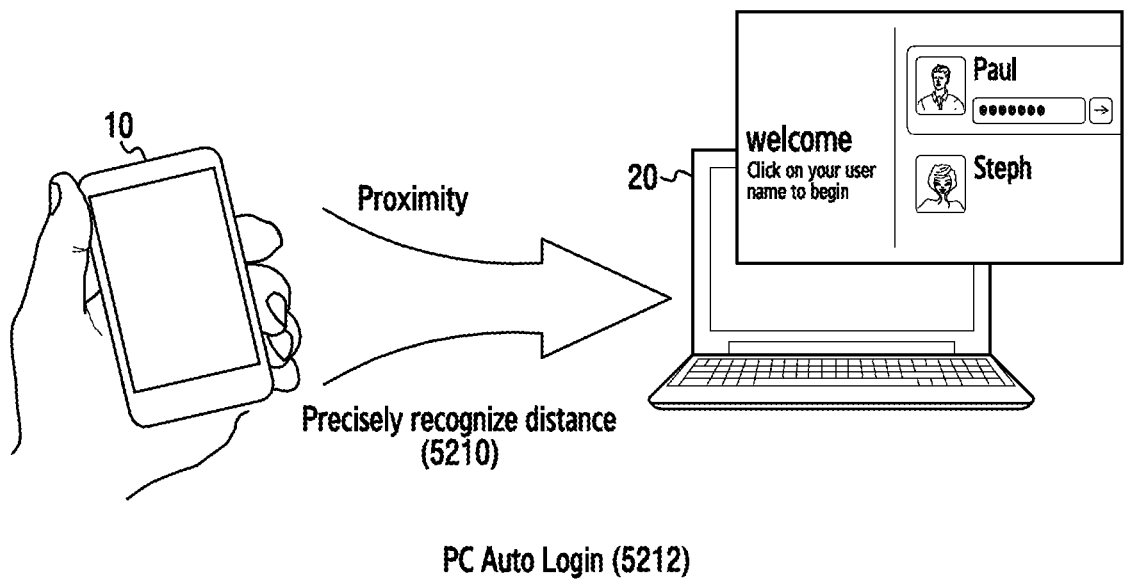

Referring to FIG. 52A, when it is determined that the first electronic device 10 (for example, a smart phone) is close to the second electronic device 20 (for example, a note PC) within a predetermined distance based on a precise distance recognition result 5210, the second electronic device 20 automatically performs a logon process as indicated by a reference numeral 5212.

Figure 52B:
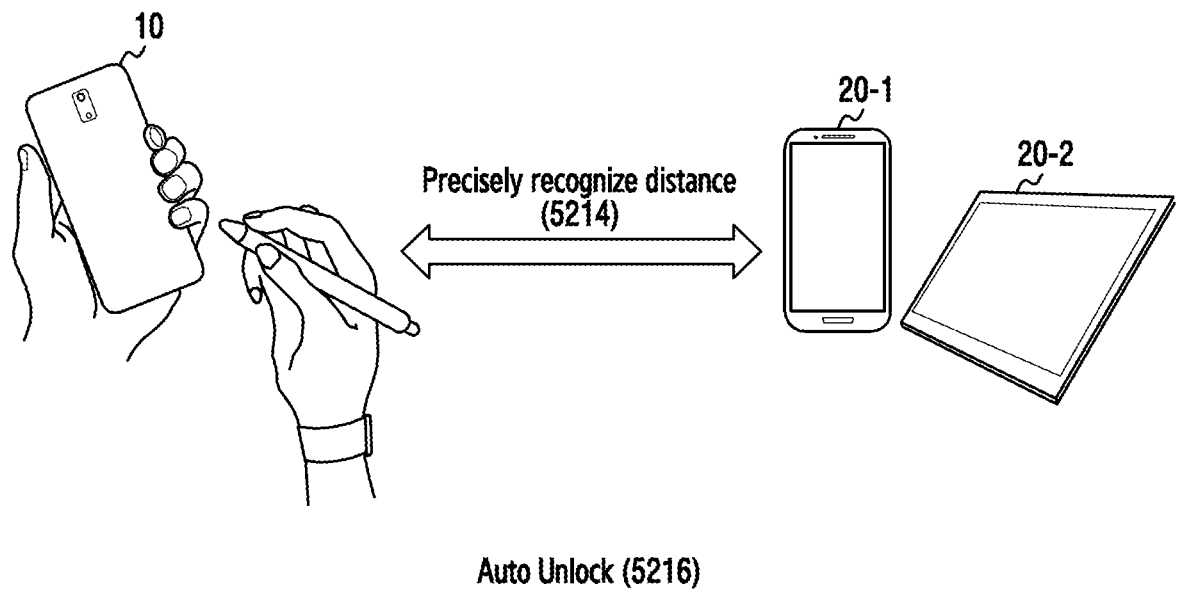

Referring to FIG. 52B, when it is determined that the first electronic device 10 (for example, a smart phone) is close to the second electronic device (for example, a smart phone or tablet) 20-1 or 20-2 within a predetermined distance based on a precise distance recognition result 5214, the second electronic device 20 automatically performs an unlock process as indicated by a reference numeral 5216.

Figure 53:
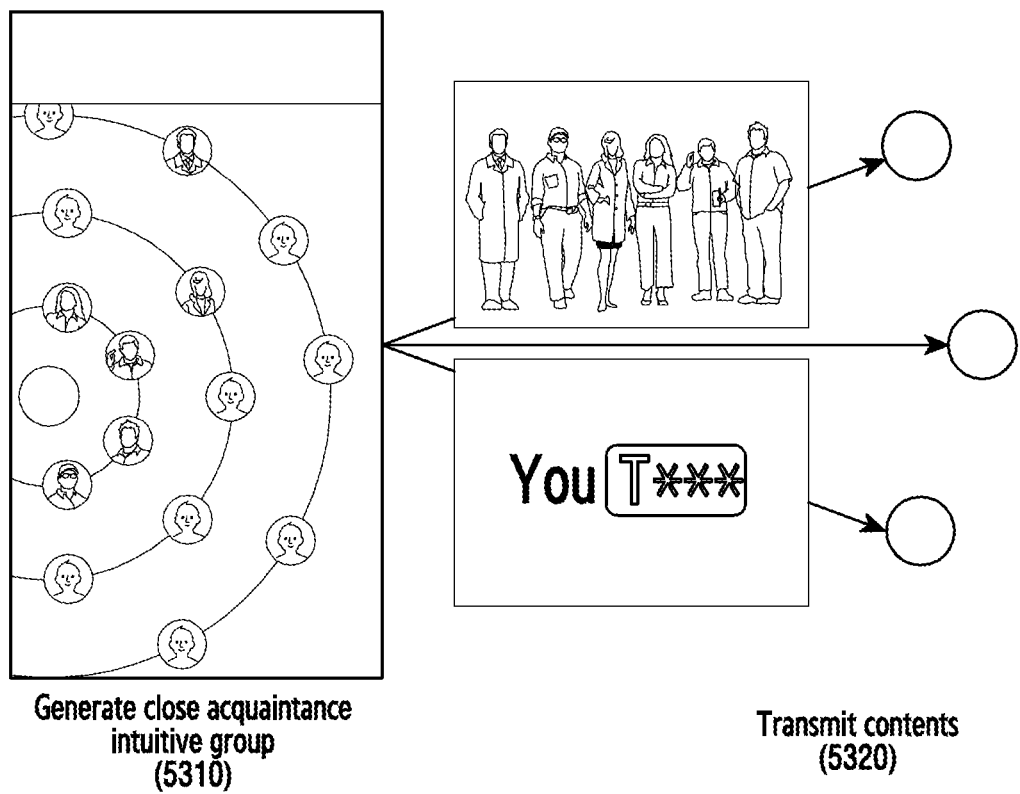
Figure 54:
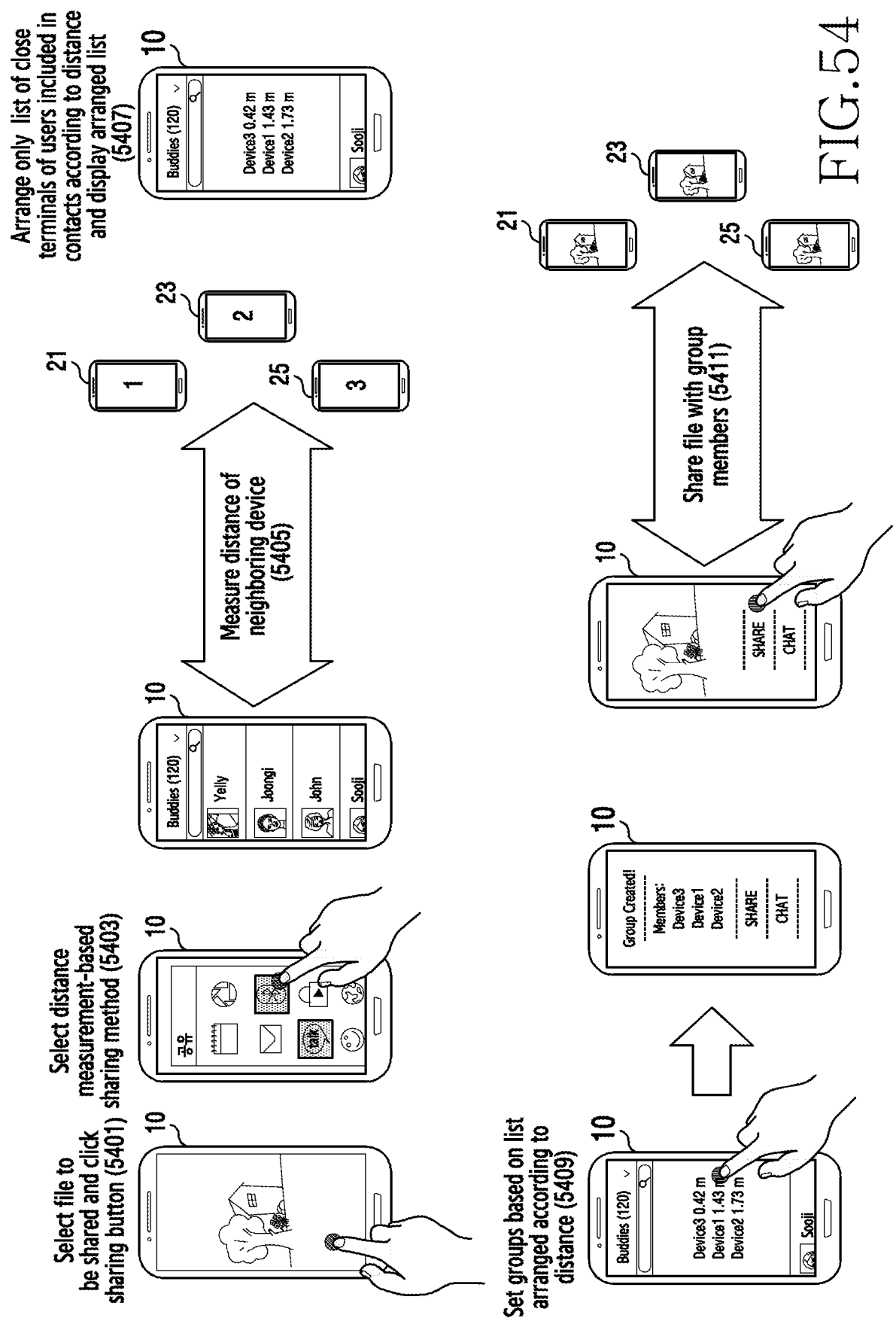

The local grouping includes a case where, when the user inputs only an intention to share a particular service into the electronic device, acquaintances are automatically grasped and the service is automatically shared with other electronic devices through the grouping. Referring to FIG. 53, groups for acquaintances close to the electronic device are automatically generated as indicated by a reference numeral 5310, and contents (for example, photos and URLs) are automatically transmitted to the acquaintances as indicated by a reference numeral 5320. For example, groups for acquaintances located in a particular region such as an office or a conference room may be automatically generated. Referring to FIG. 54, the user of the first electronic device 10 may select a file to be shared with users of neighboring devices and click a sharing button to be displayed on the display of the first electronic device 10 as indicated by a reference numeral 5401. Further, the user of the first electronic device 10 may select a distance measurement-based sharing method from various sharing methods as indicated by a reference numeral 5403 and measure distances between the first electronic device 10 and the neighboring devices based on a distance measurement scheme as indicated by a reference numeral 5405. Here, one of the plurality of distance measurement schemes described up to now may be determined as the distance measurement scheme may be determined.

Further, the first electronic device 10 may display a contact list included in the first electronic device 10 and arrange neighboring devices corresponding to users included in the list according to the distance as indicated by a reference numeral 5407. For example, according to an order of the distance closer to the first electronic device 10, the first electronic device 10 may sequentially display a third device 25 spaced apart from the first electronic device 10 by a distance of 0.42 m, a first device 21 spaced apart by a distance of 1.43 m, and a second device 23 spaced apart by a distance of 1.73 m. Further, the first electronic device 10 may group the lists that have been arranged according to the distance and displayed as indicated by a reference numeral 5409 and the user of the first electronic device 10 may share the file with members included in the groups as indicated by a reference numeral 5411.

The simple device connection (easy pairing) includes cases (FIG. 55A and FIG. 55B) where devices are automatically connected without user settings.

Figure 55A:
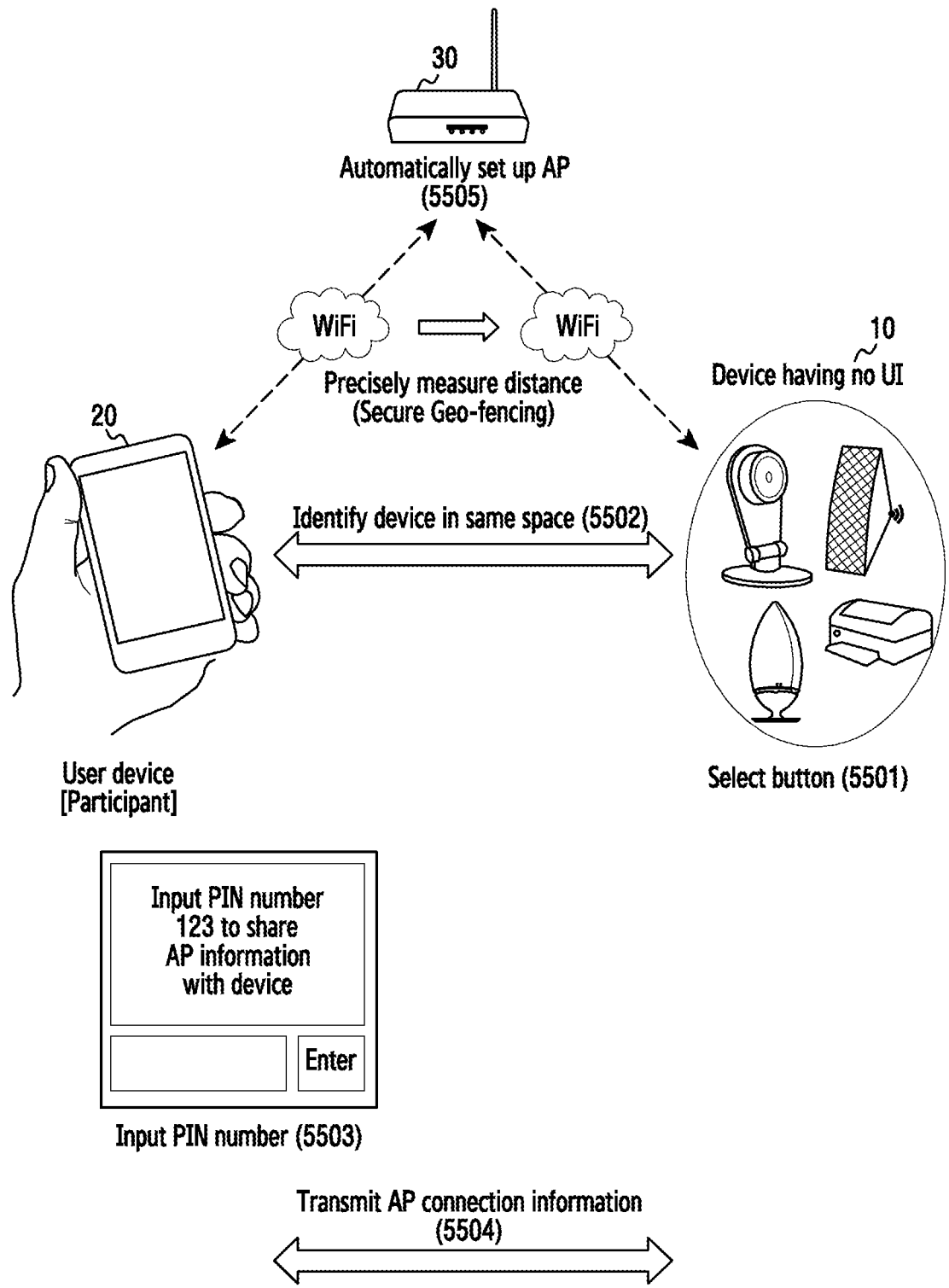

Referring to FIG. 55A, when the user selects a button (or turns on power) in the device 10 having no User Interface (UI) to connect to an Access Point (AP) 30 as indicated by a reference numeral 5501, the device 10 searches for and identifies another device existing in the same space as indicated by a reference numeral 5502. When the user inputs a particular code (for example, a PIN code) in the user device 20 to share AP information as indicated by a reference numeral 5503, the user device 20 transmits the AP information of the device 20 to the device 10 (for example, a TV). The device 10 automatically sets up the AP 30 based on the AP information received from the user device 20 as indicated by a reference numeral 5505.

Figure 55B:
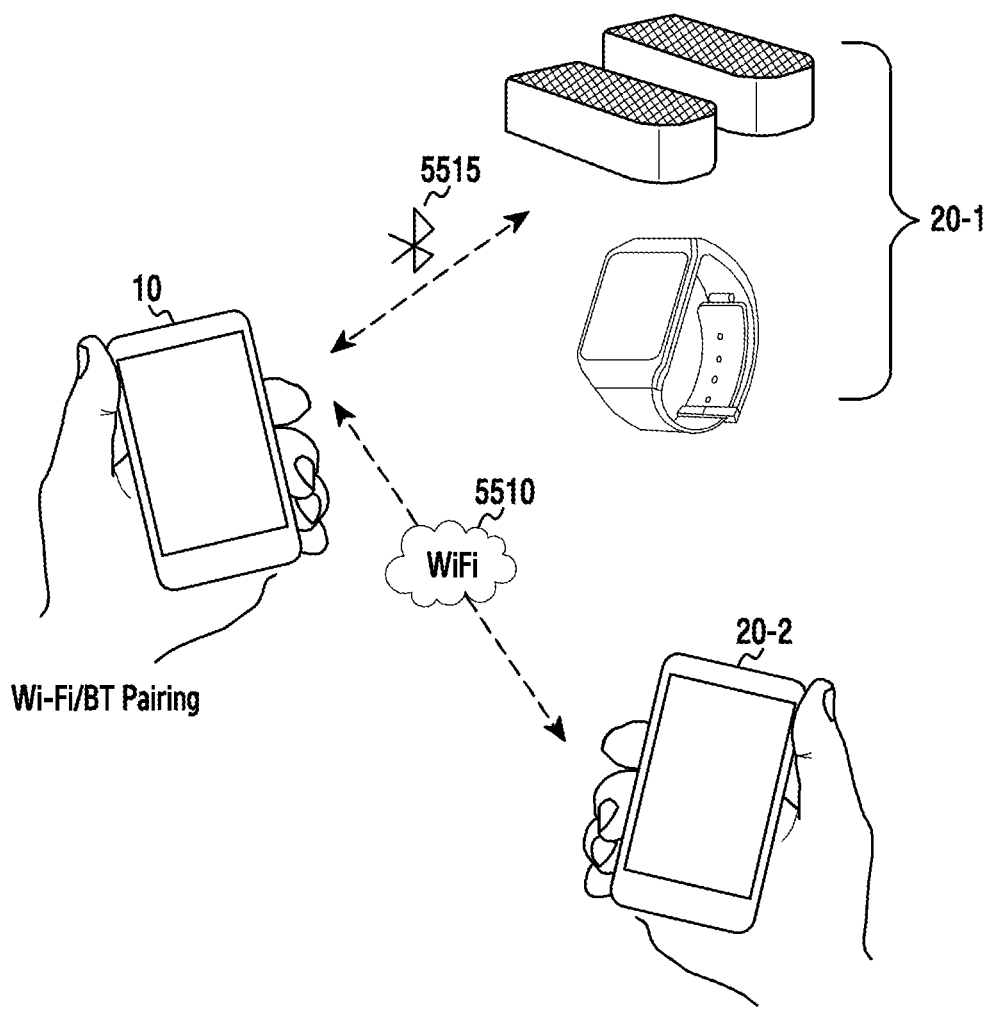

Referring to FIG. 55B, the simple device connection (easy pairing) includes a Bluetooth (BT) connection 5515 and a Wi-Fi connection 5510 between the device 10 and the device 20-1.

Figure 56A:
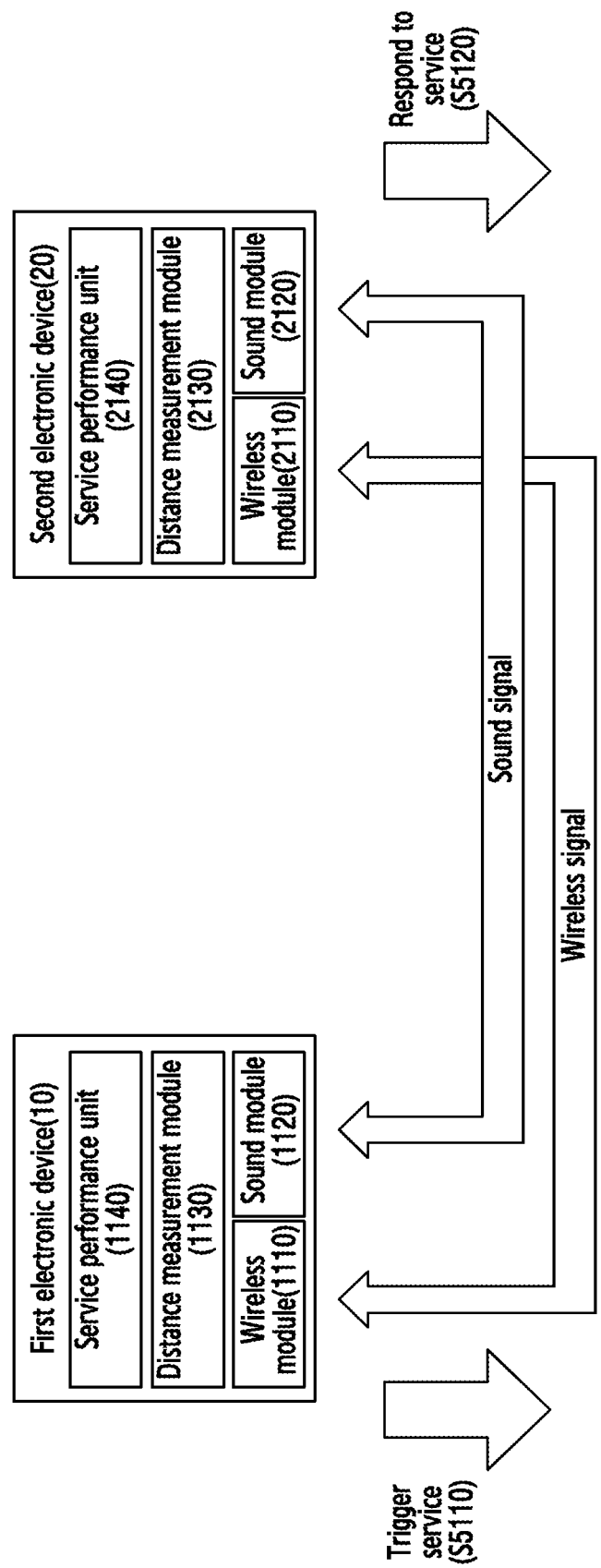
FIGS. 56A and 56B are block diagrams illustrating a system for a wireless distance measurement operation according to embodiments of the present disclosure.
Figure 56B:
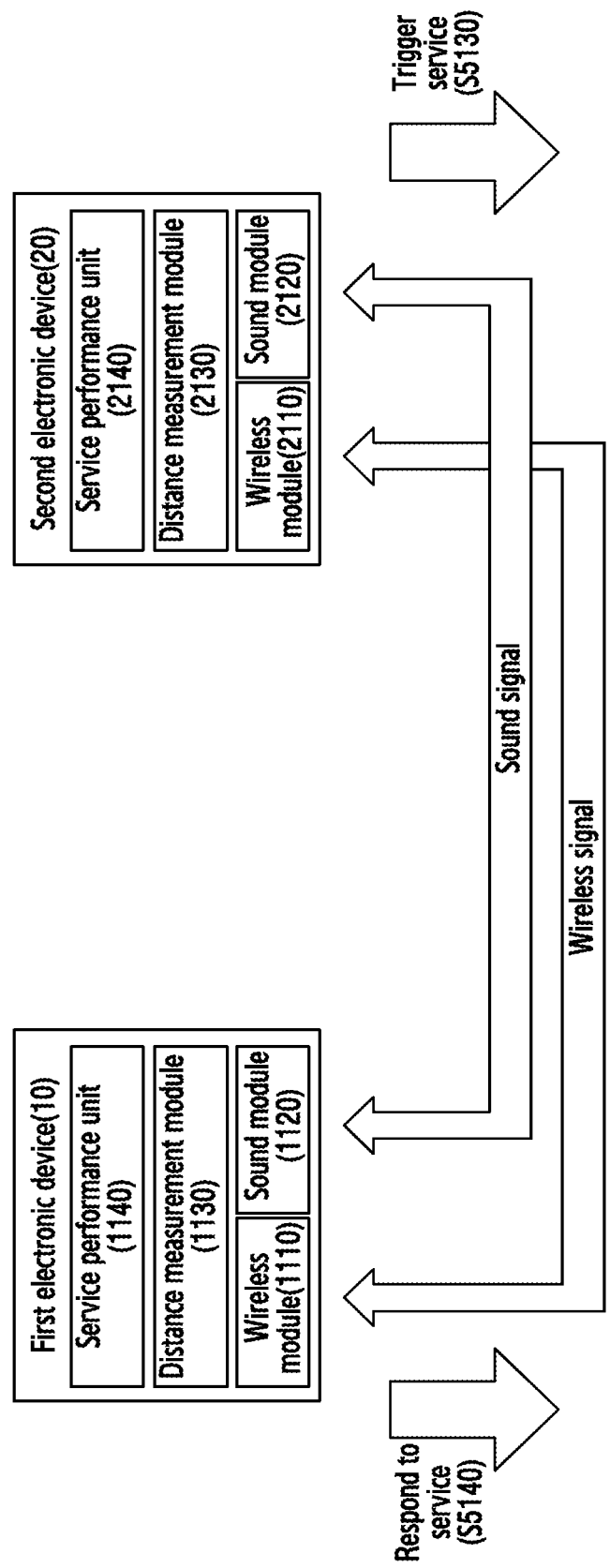

FIGS. 56A and 56B are block diagrams illustrating a system for a wireless distance measurement operation according to embodiments of the present disclosure. The figures correspond to a wireless distance measurement operation performed between the first electronic device 10 and the second electronic device 20. Here, the illustrated matters are only for an example for describing the present disclosure and should be not construed to limit the protection range of the present disclosure since modified embodiments can be made.

Referring to FIGS. 56A and 56B, the first electronic device 10 includes a wireless module 1110, a sound module 1120, a distance measurement module 1130, and a service performance unit 1140. The wireless module 1110 transmits a wireless signal to the outside (for example, the second electronic device 20) and receives a wireless signal from the outside. For example, the wireless module 1110 transmits a low power Bluetooth Signal to the second electronic device 20 and receives a low power Bluetooth signal from the second electronic device 20. The sound module 1120 transmits a sound signal to the outside (for example, the second electronic device 20) through a speaker (not shown) and receives a sound signal from the outside through a microphone (not shown). The distance measurement module 1130 performs an operation of measuring a distance between the first electronic device 10 and the second electronic device 20 based on a wireless signal transmitted/received through the wireless module 1110 and a sound signal transmitted/received through the sound module 1120. The distance measurement module 1130 performs the wireless distance measurement operation according to one of the various embodiments illustrated in FIGS. 5 to 31. The service performance unit 1140 makes a control to perform various services through the first electronic device 10. Particularly, the service performance unit 1140 makes a control to perform a service linked to the second electronic device 20 based on a result measured by the distance measurement module 1130. For example, the service performance unit 1140 makes a control to perform the services illustrated in FIGS. 32 to 50.

The second electronic device 20 includes a wireless module 2110, a sound module 2120, a distance measurement module 2130, and a service performance unit 2140. The wireless module 2110 transmits a wireless signal to the outside (for example, the first electronic device 10) and receives a wireless signal from the outside. For example, the wireless module 2110 transmits a low power Bluetooth Signal to the first electronic device 10 and receives a low power Bluetooth signal from the first electronic device 10. The sound module 2120 transmits a sound signal to the outside (for example, the first electronic device 10) through a speaker (not shown) and receives a sound signal from the outside through a microphone (not shown). The distance measurement module 2130 performs an operation of measuring a distance between the first electronic device 10 and the second electronic device 20 based on a wireless signal transmitted/received through the wireless module 2110 and a sound signal transmitted/received through the sound module 2120. The distance measurement module 2130 performs the wireless distance measurement operation according to one of the various embodiments illustrated in FIGS. 5 to 31. The service performance unit 2140 makes a control to perform various services through the second electronic device 20. Particularly, the service performance unit 2140 makes a control to perform a service linked to the first electronic device 10 based on a result measured by the distance measurement module 2130. For example, the service performance unit 2140 makes a control to perform the services illustrated in FIGS. 32 to 50.

The service performance unit 1140 of the first electronic device 10 and the service performance unit 2140 of the second electronic device 20 interwork with each other to perform a service. At this time, the service performance units 1140 and 2140 perform the service based on the distance measurement result generated by the distance measurement modules 1130 and 2130, respectively. According to an embodiment, as illustrated in FIG. 51A, the service performance unit 1140 of the first electronic device 10 triggers a service in S5110, and the service performance unit 2140 of the second electronic device 20 responds to the service in S5120, and thus an interworking between the electronic devices may be performed. According to another embodiment, as illustrated in FIG. 51B, the service performance unit 2140 of the second electronic device 20 triggers the service in S5130 and the service performance unit 1140 of the first electronic device 10 responds to the service in S5140, and thus an interworking between the electronic devices may be performed.

Figure 57:
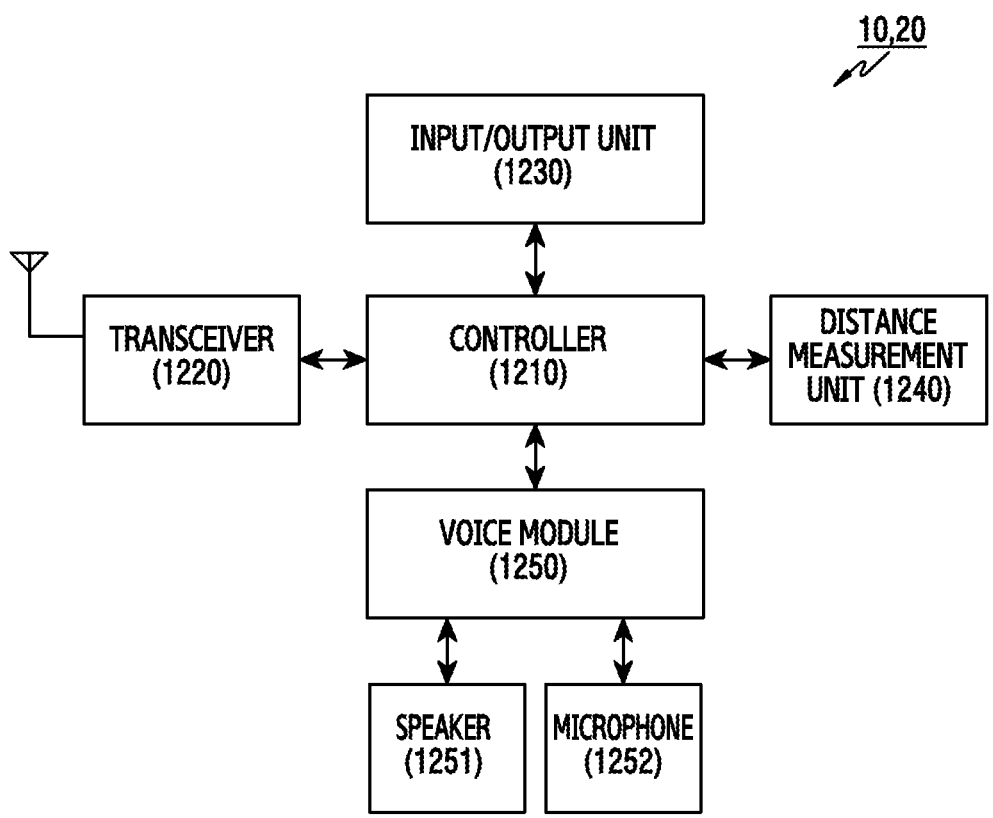
FIG. 57 is a block diagram illustrating an electronic device for a wireless distance measurement operation according to embodiments of the present disclosure.

FIG. 57 is a block diagram schematically illustrating an electronic device for a wireless distance measurement operation according to embodiments of the present disclosure.

The figures simplify the configuration of the first electronic device 10 or the second electronic device 20 illustrated in FIGS. 56A and 56B in connection with embodiments of the present disclosure. Here, the illustrated matters are only for an example for describing the present disclosure and should be not construed to limit the protection range of the present disclosure since modified embodiments can be made.

Referring to FIG. 57, the electronic devices 10 and 20 include a controller 1210, a transceiver 1220, an input/output unit 1230, a distance measurement unit 1240, a sound module 1250, a speaker 1251, and a microphone 1252.

The transceiver 1220 generates a wireless signal, transmits the generated wireless signal to the outside through an antenna, and processes a wireless signal received from the outside. According to an embodiment, the transceiver 1220 may transmit and receive a low power wireless signal such as a Bluetooth signal. The sound module 1250 generates a sound signal, transmits the generated signal through the speaker 1251, and processes a sound signal received through the microphone 1252. The speaker 1251 transmits the sound signal generated by the sound module 1250 to the outside. The microphone 1252 receives the sound signal from the outside.

The input/output unit 1230 is for an interface between the electronic device and the user and includes an input unit and a display.

The distance measurement unit 1240 performs a wireless distance measurement operation according to embodiments of the present disclosure based on the wireless signal transmitted and received through the transceiver 1220 and the sound signal transmitted and received through the sound module 1250. The distance measurement unit 1240 may perform the wireless distance measurement operation according to one of the various embodiments illustrated in FIGS. 5 to 31.

The controller 1210 controls the operation of each of the elements included in the electronic devices 10 and 20. Particularly, the controller 1210 makes a control to perform a measurement operation according to one distance measurement scheme of the various wireless distance measurement schemes by controlling the distance measurement unit 1240. Further, the controller 1210 performs negotiations for distance measurement with another electronic device and exchanges signaling related to the distance measurement. Further, the controller 1210 makes a control to perform a service interworking between electronic devices having measured the distance based on the distance measurement result. For example, the controller 1210 may make a control to interwork services between the electronic devices as illustrated in FIGS. 32 to 50.

When the electronic device illustrated in FIG. 57 is the first electronic device that initiates the distance measurement, the controller 1210 of the first electronic device negotiates with the second electronic device, and the distance measurement unit 1240 measures a distance between the first electronic device and the second electronic device according to one measurement scheme selected from a plurality of measurement schemes based on a result of the negotiations with the second electronic device.

The controller 1210 may further perform an operation for an interworking between the first electronic device and the second electronic device based on the measurement result.

According to an embodiment, the controller 1210 provides data related to the service performed in the first electronic device to the second electronic device, so that the first electronic device and the second electronic device may interwork with each other.

According to an embodiment, the controller 110 may receive data related to the service performed in the second electronic device, so that the first electronic device and the second electronic device may interwork with each other.

According to an embodiment, the controller 1210 performs an operation of negotiating with the second electronic device including a process of exchanging characteristics between the first and second electronic devices.

According to an embodiment, the controller 1210 selects one measurement scheme from a plurality of measurement schemes based on at least one of the characteristics of the first and second electronic devices, a distance measurement type, and a distance measurement scenario.

According to an embodiment, the characteristics of the first and second electronic devices include a type of the electronic device, whether a microphone/speaker is installed and the number of microphones/speakers, a type of wireless connectivity, and the existence or non-existence of a power source.

According to an embodiment, the distance measurement type includes at least one of a 1:1 distance measurement, a 1:n distance measurement, a one time distance measurement, and a periodic distance measurement.

According to an embodiment, the distance measurement scenario includes at least one of TV screen mirroring, speaker music streaming, room speaker installation, TV/home theater settings, a payment trigger service, and a location-based service.

According to an embodiment, the controller 1210 performs an operation of negotiating with the second electronic device that further includes a process of transferring a distance measurement-related parameter to the second electronic device. According to an embodiment, the distance measurement-related parameter includes at least one of a distance measurement period, a distance measurement start offset, the number of available speakers/microphones, a required measurement accuracy, a required distance measurement time, a sound signal recording time, identification information of the first electronic device, and a sound signal generation scheme.

According to an embodiment, the selected distance measurement scheme includes a scheme of measuring a distance between the first electronic device and the second electronic device based on at least one wireless signal and at least one sound signal generated by the first electronic device.

According to an embodiment, the distance measurement unit 1240 transmits the wireless signal to the second electronic device and the sound signal to the second electronic device. In response to the transmission of the wireless signal and the sound signal, the second electronic device measures the distance between the first electronic device and the second electronic device based on reception of the wireless signal and reception of the sound signal.

According to another embodiment, the distance measurement unit 1240 transmits the wireless signal to the second electronic device and the sound signal to the second electronic device. In response to the transmission of the wireless signal and the sound signal, the second electronic device measures the distance and a direction between the first electronic device and the second electronic device based on the reception of the wireless signal and the reception of the sound signal through a plurality of microphones.

According to another embodiment, the distance measurement unit 1240 transmits the wireless signal to the second electronic device and the sound signal to the second electronic device through the plurality of speakers. In response to the transmission of the wireless signal and the sound signal, the second electronic device measures the distance and the direction between the first electronic device and the second electronic device based on the reception of the wireless signal and the reception of the sound signal through the plurality of speakers.

According to another embodiment, the distance measurement unit 1240 transmits the wireless signal to the second electronic device and periodically transmits the sound signal to the second electronic device. In response to the transmission of the wireless signal and the sound signal, the second electronic device measures the distance between the first electronic device and the second electronic device and a distance change based on the reception of the wireless signal and the periodic reception of the sound signal.

According to another embodiment, the selected measurement scheme includes a scheme of measuring the distance between the first electronic device and the second electronic device based on one of the wireless signal and the sound signal generated by the first electronic device.

According to an embodiment, the distance measurement unit 1240 transmits the sound signal to the second electronic device and receives the wireless signal corresponding to the sound signal from the second electronic device. In response to the transmission and the reception, the second electronic device measures the distance between the first electronic device and the second electronic device based on the reception of the sound signal and the transmission of the wireless signal.

According to another embodiment, the distance measurement unit 1240 transmits the wireless signal to the second electronic device, receives the sound signal corresponding to the wireless signal from the second electronic device, and measures the distance between the first electronic device and the second electronic device based on the transmission of the wireless signal and the reception of the sound signal.

According to another embodiment, the distance measurement unit 1240 periodically transmits the sound signal to the second electronic device. In response to the transmission of the sound signal, the second electronic device measures a change of the distance between the first electronic device and the second electronic device based on the periodic reception of the sound signal.

According to an embodiment, the first and second electronic devices include at least one of a portable electronic device having a wireless access function, a media device, a wearable electronic device, a POS device, and a beacon device.

According to an embodiment, the wireless signal includes a low power wireless signal.

When the electronic device illustrated in FIG. 57 is the second electronic device corresponding to the first electronic device that initiates the distance measurement, the controller 1210 of the second electronic device negotiates with the first electronic device, and the distance measurement unit 1240 measures the distance between the first electronic device and the second electronic device according to one measurement scheme selected by the first electronic device from a plurality of measurement schemes based on a result of the negotiations with the second electronic device.

The controller 1210 may further perform an operation for an interworking between the first electronic device and the second electronic device based on the measurement result.

According to an embodiment, the controller 1210 provides data related to the service performed in the second electronic device to the first electronic device, so that the first electronic device and the second electronic device may interwork with each other.

According to another embodiment, the controller 1210 may receive data related to the service performed in the first electronic device, so that the first electronic device and the second electronic device may interwork with each other.

According to an embodiment, the controller 1210 performs an operation of negotiating with the first electronic device including a process of exchanging characteristics between the first and second electronic devices.

According to an embodiment, the controller 1210 selects one measurement scheme from a plurality of measurement schemes based on at least one of the characteristics of the first and second electronic devices, a distance measurement type, and a distance measurement scenario.

According to an embodiment, the characteristics of the first and second electronic devices include at least one of a type of the electronic device, whether a microphone/speaker is installed and the number of microphones/speakers, a type of wireless connectivity, and the existence or non-existence of a power source.

According to an embodiment, the distance measurement type includes at least one of a 1:1 distance measurement, a 1:n distance measurement, a one time distance measurement, and a periodic distance measurement.

According to an embodiment, the distance measurement scenario includes at least one of TV screen mirroring, speaker music streaming, room speaker installation, TV/home theater settings, a payment trigger service, and a location-based service.

According to an embodiment, the controller 1210 performs an operation of negotiating with the first electronic device that further includes a process of receiving a distance measurement-related parameter from the first electronic device. According to an embodiment, the distance measurement-related parameter includes at least one of a distance measurement period, a distance measurement start offset, the number of available speakers/microphones, a required measurement accuracy, a required distance measurement time, a sound signal recording time, identification information of the first electronic device, and a sound signal generation scheme.

According to an embodiment, the selected measurement scheme includes a scheme of measuring the distance between the first electronic device and the second electronic device based on at least one wireless signal and at least sound signal generated by the first electronic device.

According to an embodiment, the distance measurement unit 1240 receives the wireless signal from the first electronic device, receives the sound signal from the first electronic device, and measures the distance between the first electronic device and the second electronic device based on the reception of the wireless signal and the reception of the sound signal.

According to another embodiment, the distance measurement unit 1240 receives the wireless signal from the first electronic device, receives the sound signal from the first electronic device, and measures the distance and a direction between the first electronic device and the second electronic device based on the reception of the wireless signal and the reception of the sound signal through a plurality of microphones.

According to another embodiment, the distance measurement unit 1240 receives the wireless signal from the second electronic device, receives the sound signal from the second electronic device through a plurality of speakers, and measures the distance and the direction between the first electronic device and the second electronic device based on the reception of the wireless signal and the reception of the sound signal through the plurality of speakers.

According to another embodiment, the distance measurement unit 1240 receives the wireless signal from the first electronic device, periodically receives the sound signal from the first electronic device, and measures the distance between the first electronic device and the second electronic device and a distance change based on the reception of the wireless signal and the periodic reception of the sound signal.

According to another embodiment, the selected measurement scheme includes a scheme of measuring the distance between the first electronic device and the second electronic device based on one of the wireless signal and the sound signal generated by the first electronic device.

According to an embodiment, the distance measurement unit 1240 receives the sound signal from the first electronic device, transmits the wireless signal corresponding to the sound signal to the first electronic device, and measures the distance between the first electronic device and the second electronic device based on the reception of the sound signal and the transmission of the wireless signal.

According to another embodiment, the distance measurement unit 1240 receives the wireless signal from the first electronic device and transmits the sound signal corresponding to the wireless signal to the first electronic device. In response to the reception and the transmission, the first electronic device measures the distance between the first electronic device and the second electronic device based on the transmission of the wireless signal and the reception of the sound signal.

According to another embodiment, the distance measurement unit 1240 periodically receives the sound signal from the first electronic device and measures the change of the distance between the first electronic device and the second electronic device based on the periodic reception of the sound signal.

According to an embodiment, the first and second electronic devices include at least one of a portable electronic device having a wireless access function, a media device, a wearable electronic device, a POS device, and a beacon device.

According to an embodiment, the wireless signal includes a signal of a low power wireless communication scheme such as a Bluetooth Low Energy (BLE) signal.

FIG. 58 is a block diagram illustrating an electronic device in detail for a wireless distance measurement operation according to embodiments of the present disclosure. The figures illustrate in detail the configuration of the first electronic device 10 or the second electronic device 20 illustrated in FIG. 56A and FIG. 56B. Here, the illustrated matters are only for an example for describing the present disclosure and should be not construed to limit the protection range of the present disclosure since modified embodiments can be made.

Referring to FIG. 58, the electronic device may include one or more Application Processors (APs) 1310, a communication module 1320, a Subscriber Identifier Module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The AP 1310 may control a plurality of hardware or software elements connected to the AP 1310 by driving an operating system or an application program and process various types of data including multimedia data and perform calculations. The AP 1310 may be implemented as, for example, a system on chip (SoC). According to an embodiment, the AP 1310 may further include a graphic processing unit (GPU) (not shown).

The communication module 1320 may perform data transmission/reception in communication between the electronic device and other electronic devices connected through a network. According to an embodiment, the communication module 1320 may include a cellular module 1321, a Wi-Fi (Wireless Fidelity) module 1323, a Bluetooth (BT) module 1325, a GPS module 1327, a Near Field Communication (NFC) module 1328, and an RF module 1329.

The cellular module 1321 may provide a sound call, a video call, a Short Message Service (SMS), or an Internet service through a communication network (e.g., LTE, LTE-A, CDMA, WCDMA, UMTS, WiBro, OR GSM). Further, the cellular module 1321 may identify and authenticate an electronic device within a communication network using, for example, a subscriber identification module. According to an embodiment, the cellular module 1321 may perform at least a part of functions that may be provided by the AP 1310. For example, the cellular module 1321 may perform at least some of the multimedia control functions.

According to an embodiment, the cellular module 1321 may include a CP. Furthermore, the cellular module 1321 may be implemented as, for example, an SoC. According to an embodiment, the AP 1310 may be implemented to include at least one some of the aforementioned elements (for example, the cellular module 1321).

According to an embodiment, the AP 1310 or the cellular module 1321 (for example, CP) may load instructions or data received from a non-volatile memory or at least of the other elements connected to the AP 1310 or the cellular module 1321 (for example, CP) in the non-volatile memory and process the loaded instructions or data. Furthermore, the AP 1310 or the cellular module 1321 may store, in a non-volatile memory, data received from or generated by at least one of other component elements.

The Wi-Fi module 1323, the BT module 1325, the GPS module 1327, and the NFC module 1328 may include, for example, a processor for processing data transmitted/received through a corresponding module. According to an embodiment, at least some (for example, two or more) of the cellular module 1321, the Wi-Fi module 1323, the BT module 1325, the GPS module 1327, and the NFC module 1328 may be included in a single integrated chip (IC) or IC package. For example, at least some (for example, the CP corresponding to the cellular module 1321 and the Wi-Fi processor corresponding to the Wi-Fi module 1323) of the processors corresponding to the cellular module 1321, the Wi-Fi module 1323, the BT module 1325, the GPS module 1327, and the NFC module 228 may be implemented as one SoC.

The RF module 1329 may transmit/receive data, for example, an RF signal. Although not illustrated, the RF module 1329 may, for example, include a transceiver, a power amp module (PAM), a frequency filter, a low noise amplifier (LNA), or the like. Furthermore, the RF module 1329 may further include a component for transmitting/receiving electronic waves over a free air space in wireless communication, for example, a conductor, a conducting wire or the like. According to an embodiment, at least one of the cellular module 1321, the Wi-Fi module 1323, the BT module 1325, the GPS module 1327, and the NFC module 1328 may transmit and receive the RF signal through a separate RF module.

The SIM card 1324 may be a card including a subscriber identification module, and may be inserted into a slot formed in a particular portion of the electronic device. The SIM card 1324 may include unique identification information (for example, an Integrated Circuit Card IDentifier (ICCID)) or subscriber information (for example, an International Mobile Subscriber IDentity (IMSI)).

The memory 1330 may include an internal memory 1332 or an external memory 1334. The embedded memory 1332 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 1332 may be a Solid State Drive (SSD). The external memory 1334 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 1334 may be functionally connected to the electronic device through various interfaces. According to an embodiment, the electronic device may further include a storage device (or a storage medium) such as hard drive.

The sensor module 1340 may measure a physical quantity or may sense an operating state of the electronic device 100, and may convert the measured or sensed information to an electrical signal. The sensor module 1340 may include at least one of, for example, a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 840H (for example, a Red/Green/Blue (RGB) sensor), a bio-sensor 13401, a temperature/humidity sensor 1340J, an illumination sensor 1340K, and an Ultra Violet (UV) sensor 1340M. Additionally or alternatively, the sensor module 1340 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor (not illustrated), and the like. The sensor module 1340 may further include a control circuit for controlling one or more sensors included therein.

The input device 1350 may include a touch panel 1352, a (digital) pen sensor 1354, a key 1356, or an ultrasonic input device 1358. The touch panel 1352 may recognize a touch input through at least one of, for example, a capacitive type, a resistive type, an infrared type, and an ultrasonic type. Further, the touch panel 1352 may further include a control circuit. In the case of the capacitive type, physical contact or proximity recognition is possible. The touch panel 1352 may further include a tactile layer. In this event, the touch panel 1352 may provide a tactile response to the user.

The (digital) pen sensor 1354 may be implemented, for example, using a method that is the same as or similar to receiving a user's touch input, or using a separate recognition sheet. The key 1356 may include, for example, a physical button, an optical key, or a keypad. The ultrasonic input device 1358 is a device capable of identifying data by detecting an acoustic wave with a microphone (for example, a microphone 1388) of the electronic device through an input unit generating an ultrasonic signal, and may perform wireless recognition. According to an embodiment, the electronic device may receive a user input from an external device (for example, a computer or a server) connected to the communication module 1320 by using the communication module 1320.

The display 1360 may include a panel 1362, a hologram device 1364 or a projector 1366. The panel 1362 may be, for example, a Liquid Crystal Display (LCD) and an Active Matrix Organic Light Emitting Diode (AM-OLED) display, and the like. The panel 1362 may be implemented so as to be, for example, flexible, transparent, or wearable. The panel 1362 may include the touch panel 1352 and one module. The hologram device 1364 may show a stereoscopic image in the air by using interference of light. The projector 1366 may project light onto a screen to display an image. The screen may be located, for example, inside or outside the electronic device. According to an embodiment, the display 1360 may further include a control circuit for controlling the panel 1362, the hologram device 1364, or the projector 1366.

The interface 1370 may include, for example, a High-Definition Multimedia Interface (HDMI) 1372, a Universal Serial Bus (USB) 1374, an optical interface 1376, or a D-subminiature (D-sub) 1378. Additionally or alternatively, the interface 1370 may include, for example, a mobile high-definition link (MHL) interface, a secure digital (SD) card/multi-media card (MMC) interface, or an infrared data association (IrDA) standard interface.

The audio module 1380 may bilaterally convert a sound and an electronic signal. The audio module 1380 may process sound information input or output through, for example, the speaker 1382, the receiver 1384, the earphones 1386, the microphone 1388 or the like.

The camera module 1391 is a device that can take still and moving images, and according to an embodiment, may include one or more image sensors (for example, a front sensor or a rear sensor, not shown), a lens (not shown), an image signal processor (ISP) (not shown), or a flash (for example, an LED or a xenon lamp, not shown).

The power management module 1395 may manage power of the electronic device. Although not illustrated, the power management module 1395 may include, for example, a Power Management Integrated Circuit (PMIC), a charger Integrated Circuit (IC), or a battery or fuel gauge.

The PMIC may be mounted, for example, in integrated circuits or SoC semiconductors. The charging methods may be classified into wired charging and wireless charging. The charger IC may charge a battery and prevent inflow of excessive voltage or excessive current from a charger. According to an embodiment, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, a rectifier or the like may be added for the wireless charging.

The battery gauge may measure, for example, a remaining quantity of the battery 1396, or a voltage, a current, or a temperature during charging. The battery 1396 may store or generate electricity and supply power to the electronic device by using the stored or generated electricity. The battery 1396 may include, for example, a rechargeable battery or a solar battery.

The indicator 1397 may display a specific status of the electronic device 201 or a part (for example, the AP 1310) of electronic device, for example, a booting status, a message status, a charging status, and the like. The motor 1398 can convert an electrical signal into a mechanical vibration.

Although not illustrated, the electronic device may include a processing device (for example, a GPU) for supporting a mobile TV. The processing device for supporting the mobile TV may process media data according to standards, for example, a digital multimedia broadcasting (DMB), a digital video broadcasting (DVB), a media flow, or the like.

Each of the above described elements of the electronic device according to various embodiments of the present disclosure may be formed of one or more components, and the name of a corresponding element may vary according to the type of an electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

As described above, according to embodiments of the present disclosure, wireless devices for distance measurement negotiate with each other, select the best distance measurement scheme from a plurality of distance measurement schemes, and measure a distance between the wireless devices by using a wireless signal and a sound signal in a wireless communication system. The embodiments of the present disclosure have an effect of accurately measuring the distance between the wireless devices within an effective error range according to a distance measurement scheme most suitable for a distance measurement intention in consideration of characteristics between the wireless devices. Further, the embodiments of the present disclosure have an effect of performing the following operations according to a user's intention based on a result of the measurement of the distance between the wireless devices.

According to embodiments of the present disclosure, wireless devices for distance measurement in a wireless communication system negotiate with each other, select the best distance measurement scheme from a plurality of distance measurement schemes, and measure a distance between the wireless devices by using a wireless signal and a sound signal. The embodiments of the present disclosure have an effect of accurately measuring the distance between the wireless devices within an effective error range according to a distance measurement scheme most suitable for a distance measurement intention in consideration of characteristics between the wireless devices. Further, the embodiments of the present disclosure have an effect of performing the following operations according to a user's intention based on a result of the measurement of the distance between the wireless devices.

Embodiments of the present disclosure have the advantageous effect that the range between wireless devices can be measured using the most suitable range measurement method for range measurement purposes by considering the characteristics between the wireless devices.

Although the present disclosure has been described by the restricted embodiments and the drawings as described above, the present invention is not limited to the aforementioned embodiments, and various modifications and alterations can be made from the descriptions by those skilled in the art to which the present invention pertains. The operations according to embodiments of the present disclosure may be implemented by a single processor. In this case, program instructions for performing various computer-implemented operations may be stored in a computer-readable medium. The computer readable medium may include a program command, a data file, a data structure, and the like independently or in combination. The program command may be things specially designed and configured for the present invention, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When all or some of the base stations or relays as described in the present disclosure are implemented by a computer program, a computer-readable recording medium in which the computer program is stored also falls within the scope of the present invention. Therefore, the scope of the present invention should not be defined as being limited to the embodiments, but should be defined by the appended claims and equivalents thereof.

The invention claimed is:

1. A method for operating a first electronic device in a wireless communication system, the method comprising:
   receiving, from a second electronic device, a wireless signal;
   receiving, from the second electronic device, a first sound signal;
   receiving, from the second electronic device a second sound signal, wherein the second sound signal is transmitted when a time period elapses after the first sound signal is transmitted; and
   determining a change amount distance between the first electronic device and the second electronic device based on a first distance and a second distance,
   wherein the first distance is determined based on a reception time of the wireless signal and a reception time of the first signal, and
   wherein the second distance is determined based on the reception time of the first signal, a reception time of the second signal, and the time period.

2. The method of claim 1, further comprising:
   exchanging characteristics with the second electronic device,
   wherein the characteristics include at least one of whether a microphone/speaker is installed, a number of microphones/speakers, a type of wireless connectivity regarding the wireless signal, or whether a power source that may continuously transmit the wireless signal exists.

3. The method of claim 2, further comprising:
   transmitting, to the second electronic device, at least one parameter for measuring the distance,
   wherein the at least one parameter includes at least one of a distance measurement period, a distance measurement start offset, a number of available speakers/microphones, a required measurement accuracy, a required measurement time, a sound signal recording time, identification information of the first electronic device, or a generation scheme of the sound signals.

4. The method of claim 1, further comprising:
   determining the distance between the first electronic device and the second electronic device based on the reception time of the wireless signal and a reception time of one of sound signals that are transmitted periodically.

5. The method of claim 1, further comprising:
negotiating with the second electronic device;
identifying a measurement scheme among a plurality of measurement schemes using a wireless signal and at least one of sound signals, based on a result of the negotiation with the second electronic device;
determining a distance between the first electronic device and the second electronic device based on the identified measurement scheme; and
performing a distance-based service for the second electronic device when the determined distance is within a threshold,
wherein the measurement scheme is identified based on an application for the distance-based service.

6. An apparatus of a first electronic device in a wireless communication system, the first electronic device comprising:
at least one transceiver; and
at least one processor operatively coupled to the at least one transceiver;
wherein the at least one processor is configured to:
receive, from a second electronic device, a wireless signal,
receive, from the second electronic device, a first sound signal,
receive, from the second electronic device, a second sound signal, wherein the second sound signal is transmitted when a time period elapses after the first sound signal is transmitted, and
determine a change amount of a distance between the first electronic device and the second electronic device based on a first distance and a second distance,
wherein the first distance is determined based on a reception time of the wireless signal and a reception time of the first signal, and
wherein the second distance is determined based on the reception time of the first signal, a reception time of the second signal, and the time period.

7. The apparatus of claim 6,
wherein the at least one transceiver is further configured to exchange characteristics with the second electronic device, and
wherein the characteristics include at least one of whether a microphone/speaker is installed, a number of microphones/speakers, a type of wireless connectivity regarding the wireless signal, or whether a power source that may continuously transmit the wireless signal exists.

8. The apparatus of claim 7,
wherein the at least one transceiver is further configured to transmit, to the second electronic device, at least one parameter for measuring the distance, and
wherein the at least one parameter includes at least one of a distance measurement period, a distance measurement start offset, a number of available speakers/microphones, a required measurement accuracy, a required measurement time, a sound signal recording time, identification information of the first electronic device, or a generation scheme of the sound signal.

9. The apparatus of claim 6,
wherein the at least one processor is further configured to determine the distance between the first electronic device and the second electronic device based on a reception time of the wireless signal and one of sound signals that are transmitted periodically.

10. The apparatus of claim 9,
wherein the at least one processor is further configured to:
negotiate with the second electronic device;
identify a measurement scheme among a plurality of measurement schemes using a wireless signal and at least one of sound signals, based on a result of the negotiation with the second electronic device;
determine a distance between the first electronic device and the second electronic device based on the identified measurement scheme; and
perform a distance-based service for the second electronic device when the determined distance is within a threshold, and
wherein the measurement scheme is identified based on an application for the distance-based service.

11. An apparatus of a second electronic device in a wireless communication system, the second electronic device comprising:
at least one transceiver; and
at least one processor operatively coupled to the at least one transceiver,
wherein the at least one processor is configured to:
transmit, to a first electronic device, a wireless signal,
transmit, to the first electronic device, a first sound signal,
transmit, to the first electronic device, a second sound signal when a time period elapses after the first sound signal is transmitted, and
receive, from the first electronic device, feedback information for indicating a change amount of a distance between the first electronic device and the second electronic device determined based on a first distance and a second distance,
wherein the first distance is determined based on a reception time of the wireless signal and a reception time of the first signal, and
wherein the second distance is determined based on the reception time of the first signal, a reception time of the second signal, and the time period.

12. The apparatus of claim 11,
wherein the at least one transceiver is further configured to transmit, to the first electronic device, a wireless signal before the transmission of the sound signals, and
wherein the distance between the first electronic device and the second electronic device is determined based on a reception time of one of the sound signals and a reception time of the wireless signal.

* * * * *